(12) United States Patent
Hunstable

(10) Patent No.: US 11,967,866 B2
(45) Date of Patent: Apr. 23, 2024

(54) SYSTEM AND METHOD FOR CONTROLLING A MULTI-TUNNEL ELECTRIC MACHINE

(71) Applicant: Linear Labs, Inc., Fort Worth, TX (US)

(72) Inventor: Fred E. Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 461 days.

(21) Appl. No.: 17/375,863

(22) Filed: Jul. 14, 2021

(65) Prior Publication Data

US 2022/0006340 A1 Jan. 6, 2022

Related U.S. Application Data

(63) Continuation of application No. PCT/US2020/013966, filed on Jan. 16, 2020.

(60) Provisional application No. 62/804,102, filed on Feb. 11, 2019, provisional application No. 62/801,237, filed on Feb. 5, 2019, provisional application No. 62/793,359, filed on Jan. 16, 2019.

(51) Int. Cl.
| | |
|---|---|
| *H02K 3/04* | (2006.01) |
| *H02K 1/02* | (2006.01) |
| *H02K 1/14* | (2006.01) |
| *H02K 1/17* | (2006.01) |
| *H02K 1/276* | (2022.01) |
| *H02K 1/278* | (2022.01) |
| *H02K 3/12* | (2006.01) |
| *H02K 21/24* | (2006.01) |

(52) U.S. Cl.
CPC ............. *H02K 1/278* (2013.01); *H02K 1/02* (2013.01); *H02K 1/2773* (2013.01); *H02K 3/12* (2013.01); *H02K 21/24* (2013.01); *H02K 1/148* (2013.01); *H02K 1/17* (2013.01); *H02K 3/04* (2013.01); *H02K 2213/03* (2013.01)

(58) Field of Classification Search
CPC ............. H02K 1/17; H02K 1/148; H02K 3/04
See application file for complete search history.

(56) References Cited

U.S. PATENT DOCUMENTS

| | | | | |
|---|---|---|---|---|
| 2016/0020652 A1* | 1/2016 | Hunstable | ............... | H02P 25/18 310/177 |
| 2016/0380496 A1* | 12/2016 | Hunstable | .............. | H02K 21/26 310/179 |
| 2017/0237325 A1* | 8/2017 | Hunstable | .............. | H02K 21/22 310/156.43 |

FOREIGN PATENT DOCUMENTS

WO WO-2016164818 A1 * 10/2016 ............. H02K 1/145

* cited by examiner

*Primary Examiner* — Gary A Nash

(57) ABSTRACT

Disclosed are various embodiments for a new and improved multi-tunnel motor and controller for an electric motor, where the motor controller is able to dynamically modify the number of phases and pole count of the electric machine in order to reduce the torque output and increase speed.

17 Claims, 49 Drawing Sheets

SYSTEM AND METHOD FOR CONTROLLING A MULTI-TUNNEL ELECTRIC MACHINE

RELATED APPLICATIONS

This application is a continuation of International Application No. PCT/US2020/013966, filed Jan. 16, 2020, which claims priority to: U.S. provisional application Ser. No. 62/793,359 entitled "A Circumferential Flux Electric Machine with an Electronic Transmission" filed on Jan. 16, 2019; U.S. provisional application Ser. No. 62/801,237 entitled "A Circumferential Flux Electric Machine with an Electronic Transmission" filed on Feb. 5, 2019; and U.S. provisional application Ser. No. 62/804,102 entitled "A Circumferential Flux Electric Machine with an Electronic Transmission" filed on Feb. 11, 2019. The disclosures of which are all incorporated by reference for all purposes.

This application is also commonly owned with the following U.S. patent applications: U.S. patent application Ser. No. 15/657,173, entitled "An Improved Multi-Tunnel Electric Motor/Generator," filed Jul. 23, 2017, which is a Continuation of U.S. patent application Ser. No. 15/492,529, entitled "An Improved Multi-Tunnel Electric Motor/Generator," filed Apr. 20, 2017, which is a Continuation-in-Part of PCT International application serial number PCT/US2016/026776, entitled "An Improved Multi-Tunnel Electric Motor/Generator," filed on Apr. 8, 2016, which claims the benefit of U.S. provisional patent application Ser. No. 62/173,349 entitled "Multi-Tunnel Electric Motor/Generator," filed on Jun. 9, 2015; U.S. provisional patent application Ser. No. 62/167,412 entitled "Multi-Tunnel Electric Motor/Generator," filed on May 28, 2015; and U.S. provisional patent application Ser. No. 62/144,654 entitled "Multi-Tunnel Electric Motor/Generator," filed on Apr. 8, 2015, and said U.S. patent application Ser. No. 15/492,529, is also a Continuation-in-Part of U.S. patent application Ser. No. 14/866,788, entitled "Brushless Electric Motor/Generator," filed on Sep. 25, 2015, which claims the benefit of U.S. provisional patent application Ser. No. 62/056,389, entitled "DC Electric Motor/Generator with Enhanced Permanent Magnet Flux Densities," filed on Sep. 26, 2014; U.S. provisional patent application Ser. No. 62/055,309, entitled "DC Electric Motor/Generator with Enhanced Permanent Magnet Flux Densities," filed on Sep. 25, 2014; and U.S. provisional patent application Ser. No. 62/055,306, entitled "DC Electric Motor/Generator with Enhanced Permanent Magnet Flux Densities," filed on Sep. 25, 2014; and which is a Continuation-in-Part of U.S. patent application Ser. No. 13/848,048, entitled "DC Electric Motor/Generator with Enhanced Permanent Magnet Flux Densities," filed on Mar. 20, 2013, which claims the benefit of U.S. provisional patent application Ser. No. 61/613,022, entitled "Electric Motor/Generator," filed Mar. 20, 2012; U.S. patent application Ser. No. 15/413,228, entitled "Brushless Electric Motor/Generator," filed on Jan. 23, 2017; U.S. patent application Ser. No. 14/866,787, entitled "Brushed Electric Motor/Generator," filed on Sep. 25, 2015; U.S. patent application Ser. No. 14/304,232, entitled "Brushless Electric Motor/Generator," filed on Jan. 29, 2015; U.S. patent application Ser. No. 14/490,656, entitled "DC Electric Motor/Generator with Enhanced Permanent Magnetic Flux Densities," filed on Sep. 18, 2014, the disclosures of which are hereby incorporated by reference for all purposes.

TECHNICAL FIELD

The invention relates in general to a new and improved electric electrical machine, and in particular to an improved system and method for producing rotary motion from an electro-magnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

In a conventional electric motor, a central core of tightly wrapped current carrying material creates magnetic poles (known as the rotor) spins or rotates at high speed between the fixed poles of a magnet (known as the stator) when an electric current is applied. The central core is typically coupled to a shaft which will also rotate with the rotor. The shaft may then be used to drive gears and wheels in a rotary machine and/or convert rotational motion into motion in a straight line. In many applications there is a need for a high torque output at relatively low revolutions per minute (RPM) or wattages, then as RPMs increase, the torque can be decreased. In electric vehicle applications, low speed operation often requires constant torque operation at less than the base speed for moving heavy loads, traversing rough terrain, or inclines such as hills. For instance, high torque may be required for local trash pickup when the trucks are moving slowly from house to house, but there is less need for high torque when the truck is in on the highway at higher speeds. Similarly, construction vehicles and tractors may have a need for high torque during earth moving and plowing, but low torque when the vehicles are in transport mode or moving along a street. Conveyor motors may need a high torque when they first start and lower torque after they have reached their operational speed.

In many cases, high speed operation requires double or triple the base speed for cruising on level roads or developed industrial sites. In this high-speed mode, torque requirements are low and constant power operation is desired. In constant power operation the available torque is inversely proportional to the speed. Constant power mode in an electric motor equipped with a mechanism that controls back emf provides an operation that is similar to shifting gear ratios in a conventional mechanical transmission of a vehicle, that is, higher speeds are traded for lower available torque by changing gear ratios.

Thus, there is a need for motors to generate high torque in one mode, and relatively lower torque in another mode once higher speeds have been reached. An electric motor that is able to shift from constant torque mode to constant power mode with speed extending beyond the base speed can be utilized as a magnetic variable transmission. Conventionally, this may be accomplished through a transmission device. However, transmission devices result in inefficiencies and additional costs. What is needed is an electric motor that can switch between a high torque low speed configuration and a low torque high speed configuration.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Conventional power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

In most conventional electric motors, both linear and rotating, enough power of the proper polarity must be pulsed at the right time to supply an opposing (or attracting) force at each pole segment to produce a particular torque. In conventional electric motors at any given instant only a portion of the coil pole pieces is actively supplying torque.

With conventional electric motors, a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces, and RPM. However, the electrical current is a sinusoidal output which inherently has losses similar to that of conventional electric motors.

Specifically, the pulsed time varying magnetic fields produces undesired effects and losses, i.e. iron hysteresis losses, counter-electromotive forces (EMF), inductive kickback, eddy currents, inrush currents, torque ripple, heat losses, cogging, brush losses, high wear in brushed designs, commutation losses and magnetic buffeting of permanent magnets. In many instances, complex controllers are used in place of mechanical commutation to address some of these effects.

Additionally, in motors or generators, some form of energy drives the rotation and/or movement of the rotor. As energy becomes scarcer and more expensive, what is needed are more efficient electric motors and generators to reduce energy consumption, and hence costs.

SUMMARY

In response to these and other problems, there is presented various embodiments disclosed in this application, including methods and systems of increasing flux density by permanent magnet manipulation using multiple magnetic tunnels. Disclosed are various embodiments for a electrical machine comprising: a plurality of coils radially positioned about a coil assembly, a plurality of magnetic tunnels forming a relative rotational path for the coil assembly, wherein the all of plurality of magnets forming each magnetic tunnel have like poles facing inward toward the interior of the magnetic tunnel or facing outward away from the interior of the magnetic tunnel such that each magnetic field of any magnetic tunnel is of an opposite polarity to the magnetic field of an adjacent magnetic tunnel.

These and other features, and advantages, will be more clearly understood from the following detailed description taken in conjunction with the accompanying drawings. It is important to note the drawings are not intended to represent the only aspects of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Electrical Machine Element and Back-Iron Circuit

Figure 1:
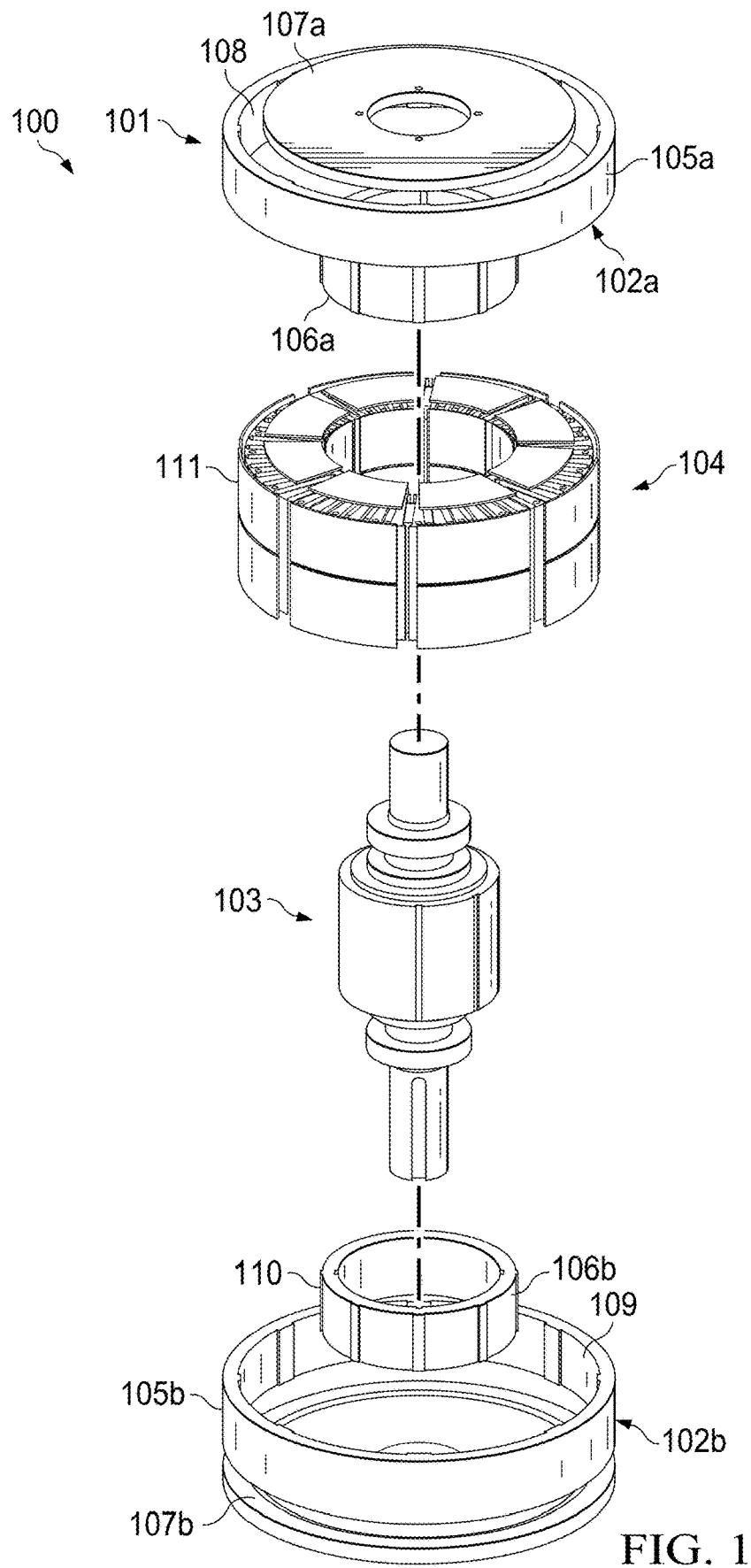
FIG. 1 is an exploded view of one embodiment of an electrical machine component according to certain aspects of the present disclosure.

FIG. 1 is an exploded isometric view of an electrical machine 100 illustrating a first portion 102a of a back-iron circuit 101, a second portion 102b of the back-iron circuit 101, a rotor hub 103, and a magnetic disc assembly 104104. Embodiments of the electrical machine 100 are also known as the Hunstable Electric Turbine, or "HET."

The back-iron circuit 101 is theoretically optional. It serves to position and strengthen magnetic elements (described below) and constrain the magnetic circuit to limit reluctance by removing or reducing the return air path. The first portion 102a of the back-iron circuit 101 comprises a first outer cylindrical wall 105a made of a suitable back iron material as described below. When the electrical machine 100 is assembled, a first inner cylindrical wall 106a is concentrically positioned within the first outer cylindrical wall 105a. A first flat side wall 107a which is also made of back iron material is positioned longitudinally next to the first outer cylindrical wall 1 and the first inner cylindrical wall 106a.

A second portion of the back-iron circuit includes a second inner cylinder wall 106b concentrically positioned within a second outer cylindrical wall 105b (when the electrical machine 100 is assembled). A second flat side wall 107b of back iron material is positioned longitudinally next to the second outer cylindrical wall 105b and the second inner cylindrical wall 106b. In certain embodiments, the second inner cylinder wall 106b and second outer cylinder wall 105b have a plurality of longitudinal grooves sized to accept and support a plurality of magnets as described below with respect to FIG. 1B.

For purposes of this application the term "back iron" may refer to iron, an iron alloy, any ferrous compound or alloy, such as stainless steel, any nickel or cobalt alloy, laminated steel, laminated silicon steel, or any laminated metal comprising laminated sheets of such material, or a sintered specialty magnetic powder. In some embodiments, the ring core 504 may be hollow or have passages defined therein to allow for liquid or air cooling.

In certain embodiments, there is a radial gap 108 between the first outer wall 105a and the first side wall 107a. The radial gap 108 allows for the passage of a support structure, control wires and electrical conductors (not shown) into the magnetic disc assembly 104 as well as for heat dissipation and/or a thermal control medium. In other embodiments, the gap 108 may be defined within the first outer wall 105a or between the first outer wall 105a and the second outer wall 105b. In yet other embodiments, the gap 108 may be located in other locations to optimize performance.

A plurality of inner longitudinal grooves 109 are defined and radially spaced around an inner surface of the first outer cylinder wall 105a (not visible in FIG. 1) and the second outer cylinder wall 105b. Similarly, a plurality of outer longitudinal grooves 110 are defined and radially spaced around an outer surface of the first inner cylinder wall 106a and the second inner wall 106b.

As will be described in detail below, a plurality of outer magnets forming a portion of an outer magnetic wall 203a (from the magnetic disc 104 discussed below) are sized to fit within the plurality of inner longitudinal grooves 109 and outer longitudinal grooves 110.

When the electrical machine 100 is assembled, the first portion 102a of the back-iron circuit 101 and the second portion 102b of the back-iron circuit physically support and surround the magnetic disc 104. The first inner wall 106a and second inner wall 106b also radially surrounds and is radially coupled to the rotor hub 103. In certain embodiments, the rotor hub 103 positions and structurally supports certain components of the back-iron circuit 101 (which in turn, supports the magnetic components of the magnetic disc 104).

Magnetic Disc Assembly

Figure 2A:
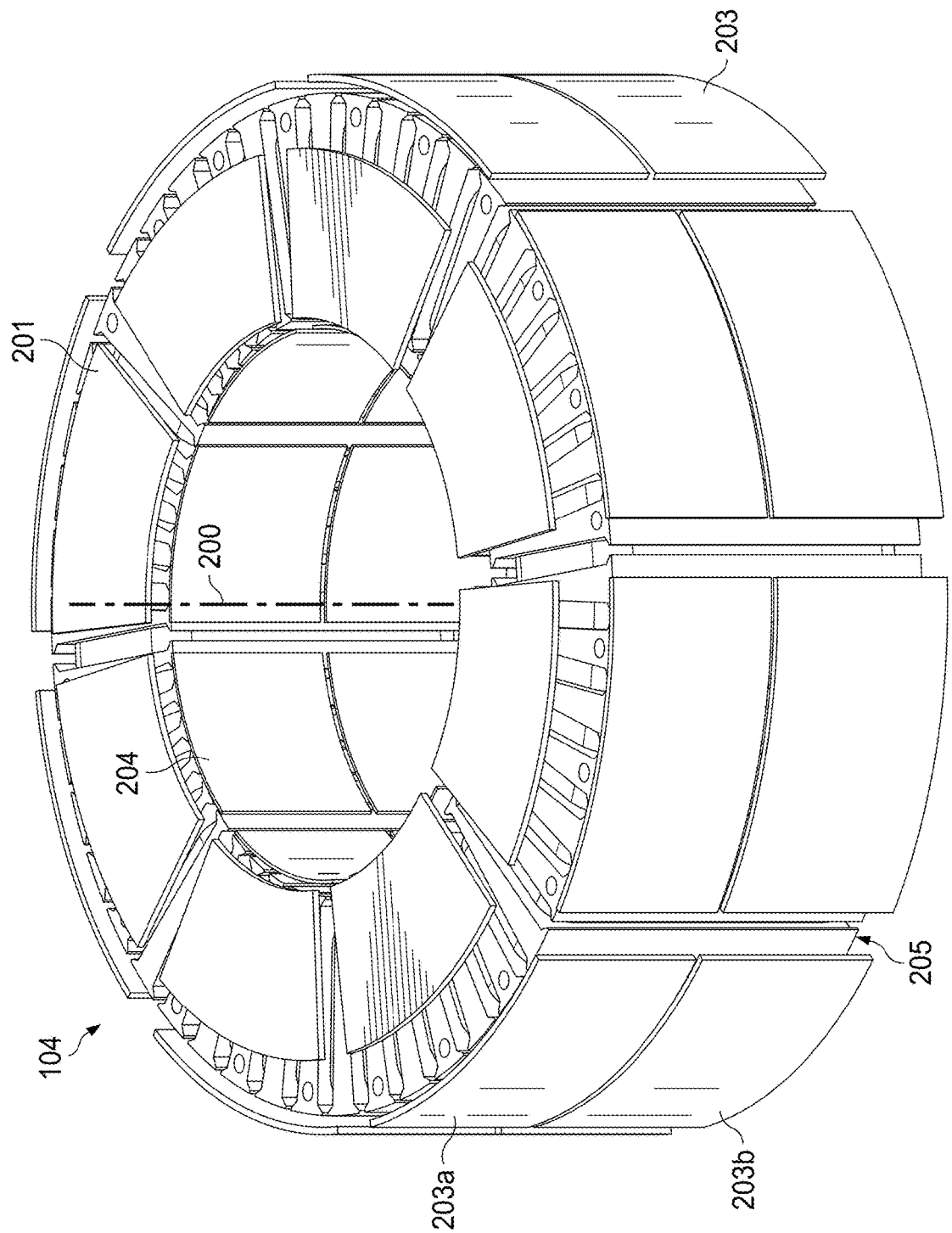
FIG. 2A is a detailed isometric view of a magnetic cylinder/stator element or magnetic cylinder/rotor element of the electrical machine component illustrated in FIG. 1.
Figure 2B:
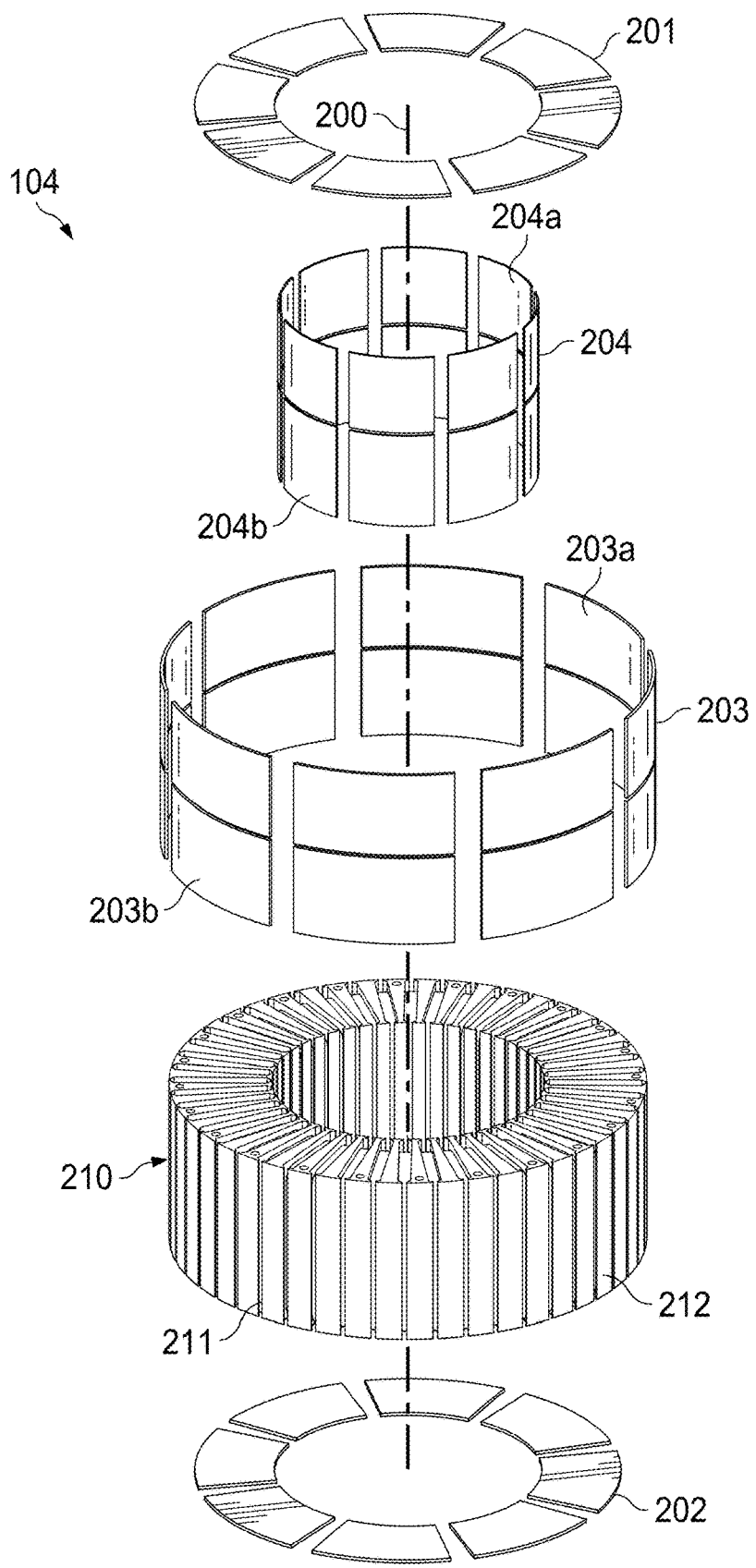
FIG. 2B is an exploded view of the magnetic cylinder/stator element or the magnetic cylinder/rotor element of FIG. 2A.

FIG. 2A is a detailed isometric view of the assembled magnetic disc 104 of FIG. 1. FIG. 2B is an exploded view of the magnetic disc 104. In the embodiment illustrated in FIGS. 2A and 2B, with respect to a longitudinal axis 200, there is a top or first axial or side wall of magnets 201. Similarly, there is a bottom or second axial or side wall of magnets 4202. An outer cylindrical wall of magnets 203 is longitudinally positioned between the first axial or side wall 201 and the second axial or side wall of magnets 4202. In certain embodiments, the outer cylindrical wall of magnets 203 comprises two pluralities of magnets 203a and 203b which are sized to couple with the back-iron walls 105a and 105b, as described above with respect to FIG. 1.

An inner cylindrical wall of magnets 204 is also longitudinally positioned between the first axial or side wall 201 and the second axial or side wall of magnets 4102 and concentrically positioned within the outer cylindrical wall of magnets 203. In certain embodiments, the inner cylindrical wall of magnets 204 comprises two pluralities of magnets 204a and 204b which are sized to couple with the back-iron walls 106a and 106b, as described above in reference to FIG. 1.

In certain embodiments, the magnets forming the axial side walls 201-4202 and cylindrical walls 203-204 discussed herein may be made of out any suitable magnetic material, such as: neodymium, Alnico alloys, ceramic permanent magnets, electromagnets or Halbach Arrays. The exact number of magnets or electromagnets will be dependent on the required magnetic field strength or mechanical configuration. The illustrated embodiment is only one way of arranging the magnets, based on certain commercially available magnets. Other arrangements are possible—especially if magnets are manufactured for this specific purpose.

Coil Assembly

As illustrated in FIG. 2B, when the electrical machine 100 is assembled, a coil assembly 210 is concentrically positioned between the outer cylinder wall 203 and the inner cylinder wall 204. The coil assembly 210 is also longitudinally positioned between the first axial side wall 201 and the second axial side wall 4202. In certain embodiments, the coil assembly 210 may be a stator. In yet other embodiments, the coil assembly 210 may be a rotor.

The coil assembly 210 comprises a coil assembly support 211, which in one embodiment, may be a portion of a stator used in conjunction with a rotor formed by the magnetic axial walls 201-4202 and magnetic longitudinal walls 203-204 and the back iron circuit portions 102a and 102b discussed above in reference to FIGS. 1 through 2B. In certain embodiments, the coil assembly support 211 comprises a cylindrical or ring core (not shown) or yolk coupled to a plurality of teeth 212 radially spaced about the ring core.

In certain embodiments, the ring core and teeth 212 may be made out of iron or back iron materials (discussed above) so that it will act as a magnetic flux force concentrator.

In yet other embodiments, the coil assembly support 211 may be made from a composite material which would allow it to be sculptured to allow for cooling and wiring from inside. The composite material may be formed of a "soft magnetic" material (one which will produce a magnetic field when current is applied to adjoining coils). Soft magnetic materials are those materials which are easily magnetized or demagnetized. Examples of soft magnetic materials are iron and low-carbon steels, iron-silicon alloys, iron-aluminum-silicon alloys, nickel-iron alloys, iron-cobalt alloys, ferrites, and amorphous alloys.

In certain embodiments, a wiring connection (not shown) can also be formed in the shape of a "plug" for coupling to the stator teeth. Thus, certain teeth of the plurality of teeth 212 may have holes for such plugs (or wires) defined on one side for attachment to a structural support in embodiments where the coil assembly 210 acts as a stator.

Coils or Coil Windings

Figure 2C:
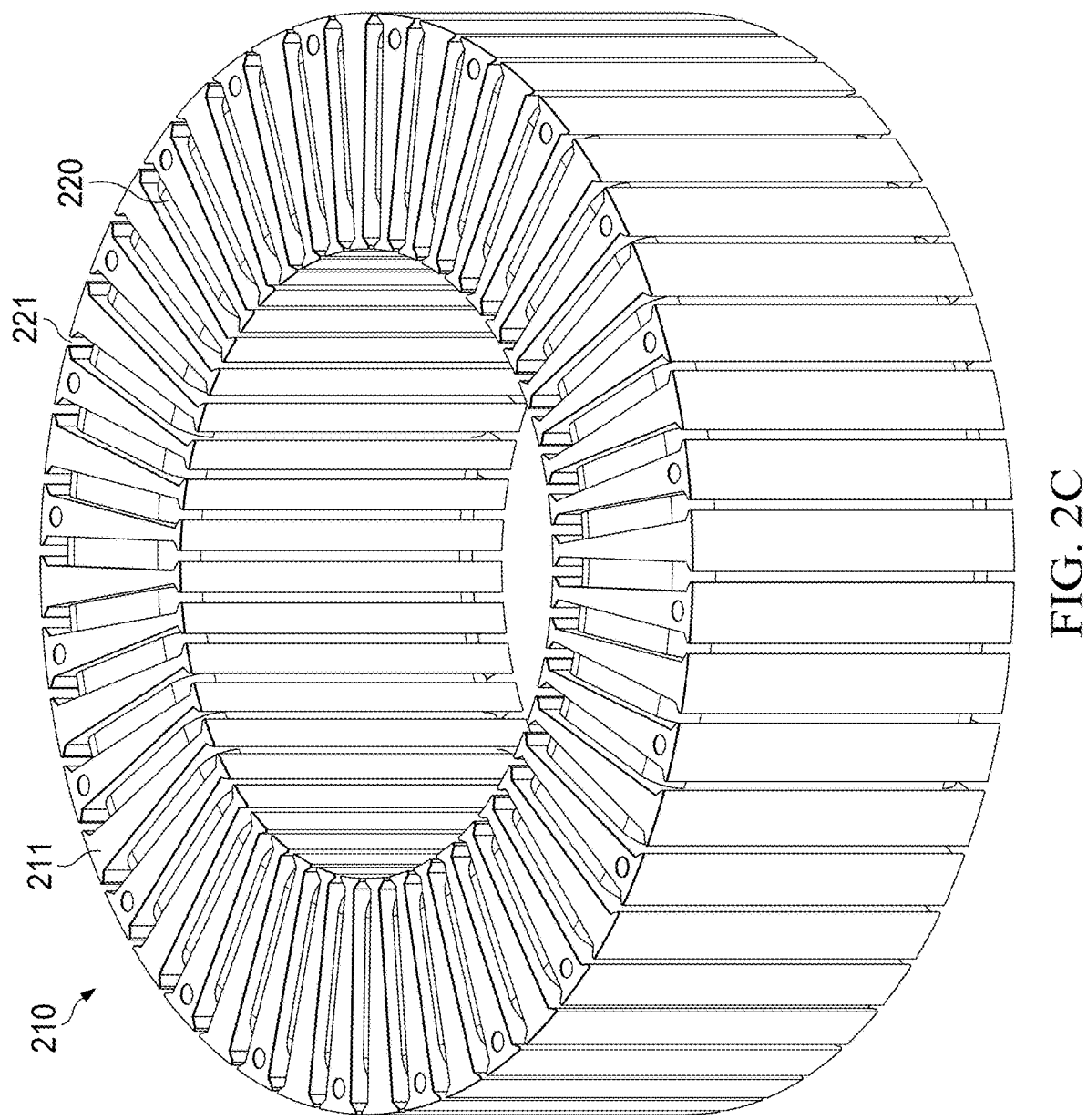
FIG. 2C is an isometric view of a coil assembly.

FIG. 2C is a detail isometric drawing of the coil assembly 210. The teeth 212 supported by the core ring form radial slots 221 within the coil assembly support structure 211. A plurality of coils or coil windings 220 may be positioned radially about the ring core and within the slots 221.

Each individual coil 220 in the coil assembly 210 may be made from a conductive material, such as copper (or a similar alloy) wire and may be constructed using conventional winding techniques known in the art. In certain embodiments, concentrated windings may be used. In certain embodiments, the individual coils 220 may be essentially cylindrical or rectangular in shape being wound around the ring core having a center opening sized to allow the individual coil 220 to surround and be secured to the ring core. Thus, in such embodiments, the winding does not overlap.

By positioning the individual coils 220 within the slots 221 defined by the teeth 211, the coils are surrounded by the more substantial heat sink capabilities of the teeth which, in certain embodiments, can incorporate cooling passages directly into the material forming the teeth. This allows much higher current densities than conventional electric motor geometries. Additionally, positioning the plurality of coils 220 within the slots 221 and between teeth 212 reduces the air gap between the coils. By reducing the air gap, the coil assembly 210 can contribute to the overall torque produced by the motor or generator.

The number of individual coils 220 can be any number that will physically fit within the desired volume and of a conductor length and size that produces the desired electrical or mechanical output as known in the art. In yet other embodiments, the coils 220 may be essentially one continuous coil, similar to a Gramma Ring as is known in the art.

The windings of each coil 220 are generally configured such that they remain transverse or perpendicular to the direction of the relative movement of the magnets (e.g. the rotor) comprising the coil assembly 210 and parallel with the longitudinal axis 200. In other words, the coil windings are positioned such that their sides are parallel with the longitudinal axis 200 and their ends are radially perpendicular to the longitudinal axis. As will be explained below, the coil windings are also transverse with respect to the magnetic flux produced by the individual magnets of the rotor at their interior face. Consequently, the entire coil winding or windings may be used to generate movement (in motor mode) or voltage (in generator mode).

Because the coil windings are surrounded by the magnetic fields, there are no passive or overlapped end-windings. This results in a high utilization of copper and a compact stator. The result is higher flux density than in conventional electric motors which equates to a higher force. With a coil surround by magnets on all sides, all the coil and the copper are involved in the energy conversion process. So, there is no or little wasted copper or no end windings found in prior art motors.

The Magnetic Cylinder

Figure 2D:
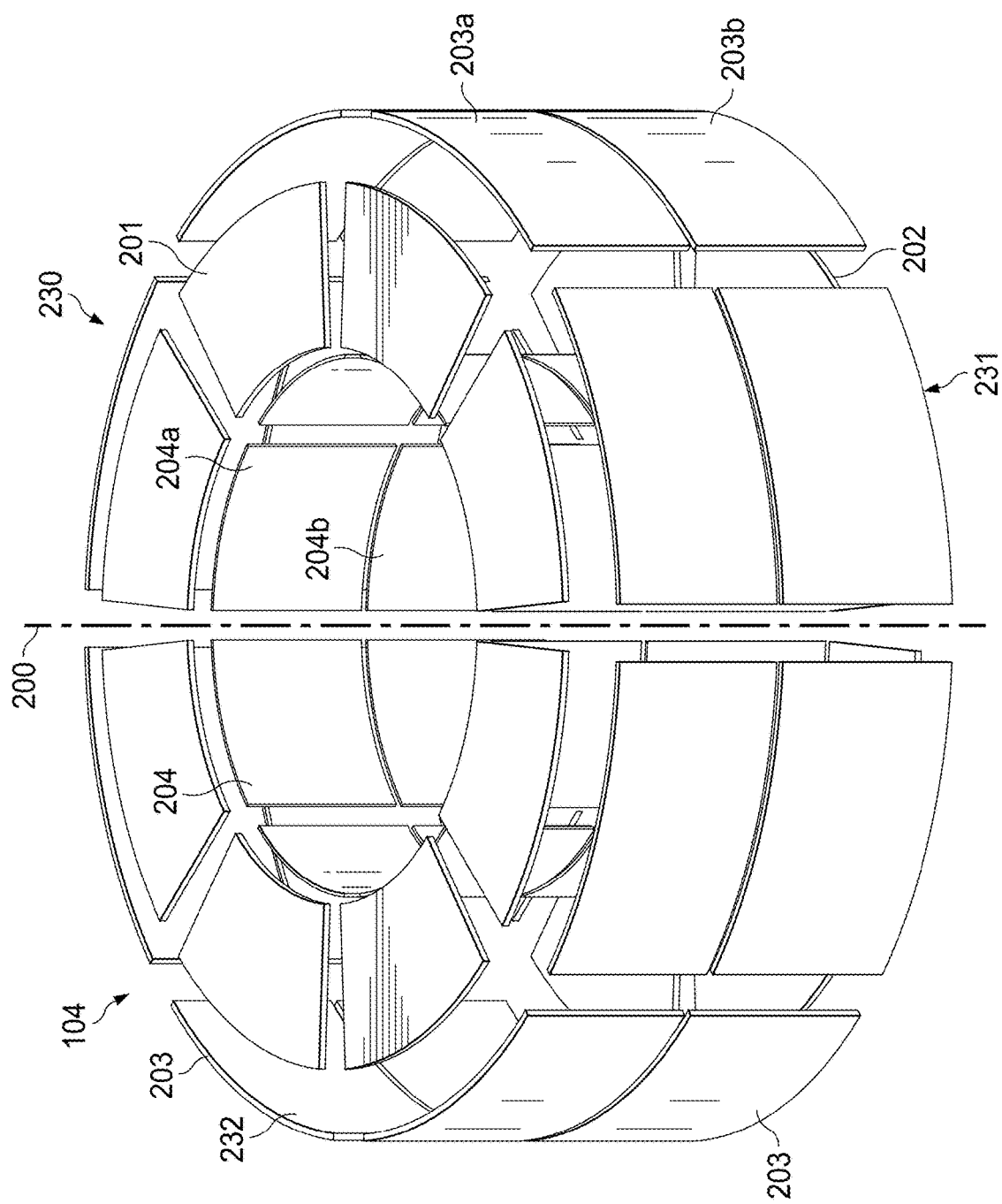
FIG. 2D illustrates one embodiment of a toroidal magnetic cylinder.

FIG. 2D is an isometric view of the magnetic disc assembly 104 (FIG. 1) with the coil assembly 210 removed for clarity. The magnets of the magnetic disc assembly 104 form a toroidal magnetic cylinder 230 defining one or more toroidal magnetic tunnels 232 positioned about the longitudinal axis 200. As described previously, the toroidal magnetic cylinder 230 includes: the top axial or side wall of magnets 201, the bottom or second axial or side wall of magnets 4102, the outer cylindrical wall 203 of magnets positioned longitudinally between the first side wall 201 of magnets and the second side wall 4202 of magnets; and the inner cylindrical wall 204 of magnets positioned concentrically within the outer cylindrical wall 203 of magnets. In certain embodiments, the outer cylindrical wall 203 may be formed by two pluralities of magnets 203a and 203b, where each plurality of magnets is sized to couple with the back-iron circuit walls 105a and 105b, respectively. Similarly, in certain embodiments, the inner cylindrical wall 204 may be formed by two pluralities of magnets 204a and 204b, where each plurality of magnets is sized to couple with the back-iron circuit walls 106a and 106b, respectively.

Note that in the illustrative embodiment of FIG. 2D, there are eight radial "slices" or magnetic tunnel segments 231 forming a complete toroidal magnetic cylinder 230. However, the exact number of segments depends on the size, performance characteristics, and other design factors. Each magnetic tunnel may also be thought of a pole region of like magnetic polarity for the motor. The number of tunnels can vary. For instance, in an eight-pole motor, each pole region represents 45 degrees of rotation. In contrast, in a four-pole motor, each pole region represents 90 degrees of rotation.

Figure 3:
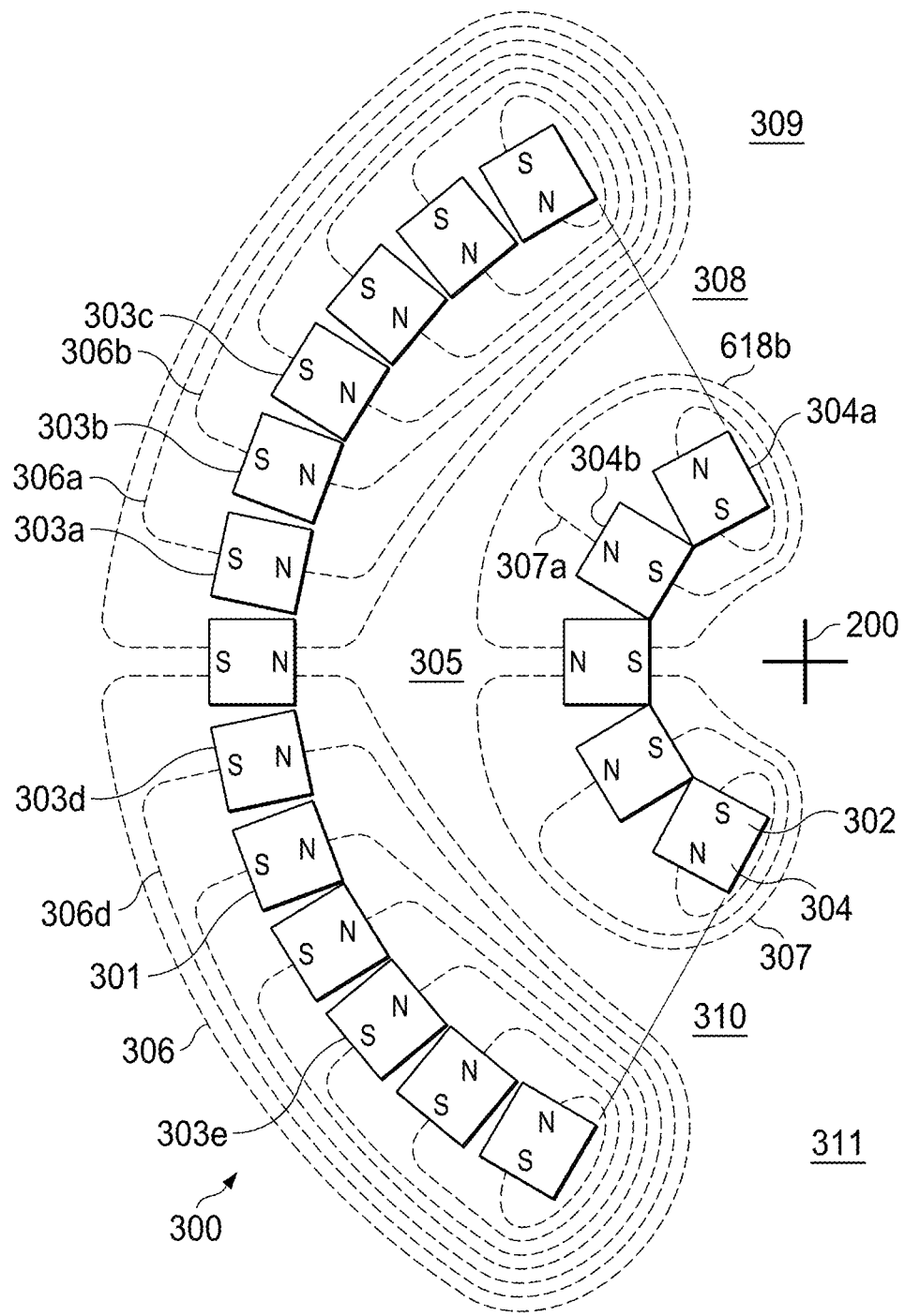
FIG. 3 illustrates a conceptual two-dimensional radial segment of a toroidal magnetic cylinder.
Figure 6:
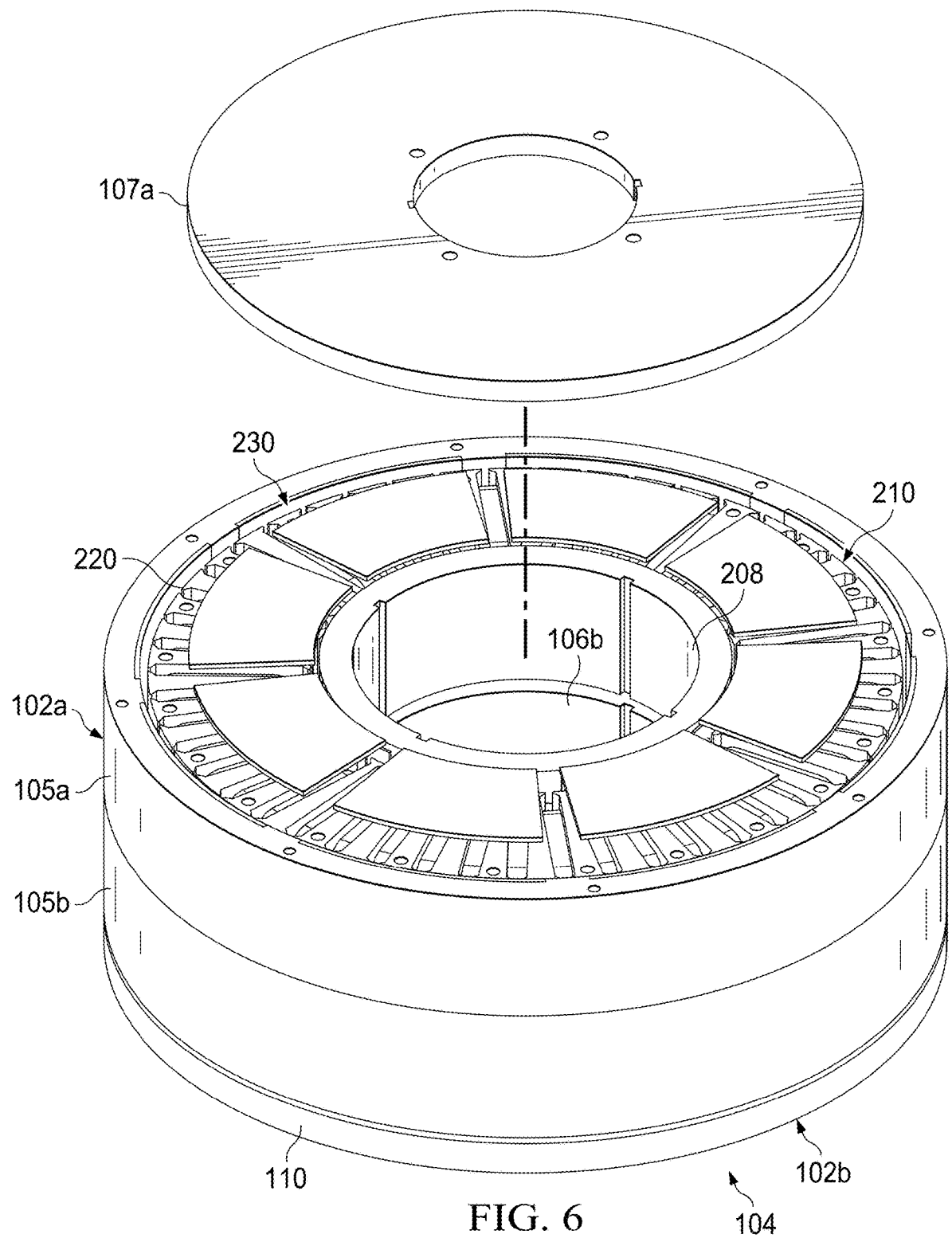
FIG. 6 illustrates the magnetic cylinder of FIG. 5 coupled to a back-iron circuit with a portion of the side back iron circuit positioned in an exploded view for clarity.

FIG. 3 is a cross-sectional conceptual view of one embodiment of a radial "slice" 300 of a magnetic cylinder which is conceptually similar to the radial segment 231 of the toroidal magnetic cylinder 230 of FIG. 2D above. FIG. 3 conceptually illustrates the flow of the flux lines in one embodiment of a magnetic tunnel or partial magnetic cylinder 300. In certain embodiments, the partial magnetic cylinder 300 comprises an outer curved wall 301 and an inner curved wall 302. The outer curved wall 301 and inner curved wall 302 may be made with a plurality of magnets. In a lateral section view, such as illustrated in FIG. 6, it can be seen that the outer curved wall 301 is comprised of a plurality of magnets 303, comprising individual magnets, such as magnets 303a, 303b, 303c, etc. Similarly, the inner curved wall 302 may be comprised with a plurality of magnets 304, comprising individual magnets 304a, 304b, etc. It should be noted that only one polarity of the magnets is utilized within (or facing into) the magnetic cylinder portion 300. For instance, in the illustrative embodiment of FIG. 3, the north poles of the magnets 303 are each pointing radially towards the center or longitudinal axis 200 (which is coming out of the page in FIG. 3). On the other hand, the north poles of the magnets 304 each point radially away from the longitudinal axis 200 and towards an interior cavity or tunnel 305 of the partial magnetic cylinder 300.

When the plurality of magnets 303 and 304 are arranged into the outer wall 301 and inner wall 302 to form a partial cylinder 300, the density of the magnetic flux forces will form particular patterns as represented in a conceptual manner by the flux lines 306 illustrated in FIG. 3. The actual shape, direction, and orientation of the flux lines 306 depend on factors such as the use of an interior retaining ring, a center core, a back-iron circuit, material composition and/or configuration.

To generally illustrate this magnetic arrangement, the flux line 306a (or flux lines) from the magnet 303a of the exterior wall 301 tends to flow from the north pole (interior face) of the magnet in a perpendicular manner from the face of the magnet into and through the interior tunnel 305 of the partial cylinder 300, exiting through the open end 308 into the open area 309, then flow around the exterior of the partial cylinder 300, and back to an exterior face of the magnet 303a containing its south pole.

Similarly, the flux line 306b from the magnet 303b of the exterior wall 301 tends to flow from the north pole of the magnet in a perpendicular manner from the face of the magnet into and through the interior tunnel 305 of the partial cylinder 300, exiting through the open end 308 into the open space 309, then flow around the exterior of the cylinder 300, and back to the face of the magnet 303b containing its south pole. Although only a few flux lines 306 are illustrated for purposes of clarity, each successive magnet in the "top portion" of the plurality of magnets will produce similar flux lines. Thus, the magnetic flux forces for each successive magnet in the plurality of magnets 303 tend to follow these illustrative flux lines or patterns for each successive magnetic disc in the plurality of magnets 303 until the magnets at the open ends 308 or 310 of the partial magnetic cylinder 300 are reached.

As illustrated, the magnet 303a is positioned circumferentially adjacent to the magnet 303b. In turn, another magnet 303c is positioned circumferentially adjacent to the magnet 303b. Additional magnets in the group 303 may be positioned circumferentially adjacent to others until the open end 308 is reached. The flux lines 306 generated from the adjacent magnetic poles in the magnetic group 303 are concentrated at the open ends of the tunnel segment where they turn back towards an exterior face of the respective magnet.

Magnets in the "bottom portion" of the plurality of magnets 303, such as magnet 303d tend to generate flux lines 306d from the magnet 303d on the exterior wall 301 which tends to flow from the north pole (interior face) of the magnet in a perpendicular manner from the face into and through the interior tunnel 305 of the partial cylinder 300, exiting through an open end 310 into the open space, then flow around the exterior of the partial cylinder 300, and back to an exterior face of the magnet 303d containing its south pole. Although only a few flux lines on the opposing side of the partial cylinder 300 are illustrated for purposes of clarity, each successive or magnet in the plurality of magnets will produce similar flux lines which will also be concentrated at the opening 310 as described above. In embodiments with an iron core, the flux lines will generally flow in a similar manner but will tend to flow through the core and be concentrated within the core. Thus, in certain embodiments, the core may act as a flux concentrator.

The interior magnetic wall 302 also produces flux forces, which also may be illustrated by flux lines, such as exemplary flux lines 307. For instance, the flux line 307a from the magnet 304a on the interior wall 302 tends to flow from interior face (e.g., the north pole) in a perpendicular manner from the face of the magnet, into and through the interior tunnel 305 of the partial cylinder 300, out the open end 308 (or open end 310) and into the open space 309, then around the interior wall 604 to the face of the magnet 304a containing its south pole.

The magnetic flux forces for each successive magnet in the plurality of magnets 304 tend to follow these illustrative flux lines or patterns 307 for each successive magnet in the plurality of magnets 304 until the open ends 308 or 310 of the partial magnetic cylinder 300 are reached. Thus, the flux forces produced by the magnets of the interior wall 604 of the partial cylinder 300 have an unobstructed path to exit through one of the open ends of the partial cylinder and return to its opposing pole on the exterior or interior of the cylinder.

As discussed above, the magnetic flux lines 306 and 307 will tend to develop a concentrating effect and the configuration of the exterior magnetic cylinder manipulates the flux lines 306 and 307 of the magnets in the partial magnetic cylinder 300 such that most or all of the flux lines 306 and 307 flow out of the open ends 308 and 310 of the partial cylinder.

The partial magnetic cylinder 300 is a simplified two-dimensional section illustration of a three-dimensional magnetic arrangement concept. The three-dimensional arrangement also has magnetic top and bottom magnetic walls with their north magnetic poles facing the interior of the tunnel 605 (not shown). Additionally, similar results can be obtained by replacing the plurality of magnets 303 with a single curved plate magnet magnetized in a similar manner (e.g., a north pole is formed on the interior face and a south pole is formed on an exterior face). Similarly, the plurality of magnets 304 may be replaced with a single curved plate magnet having its north pole on the surface facing the interior tunnel 624 and the south pole on the surface facing towards the longitudinal axis 200.

Figure 4A:
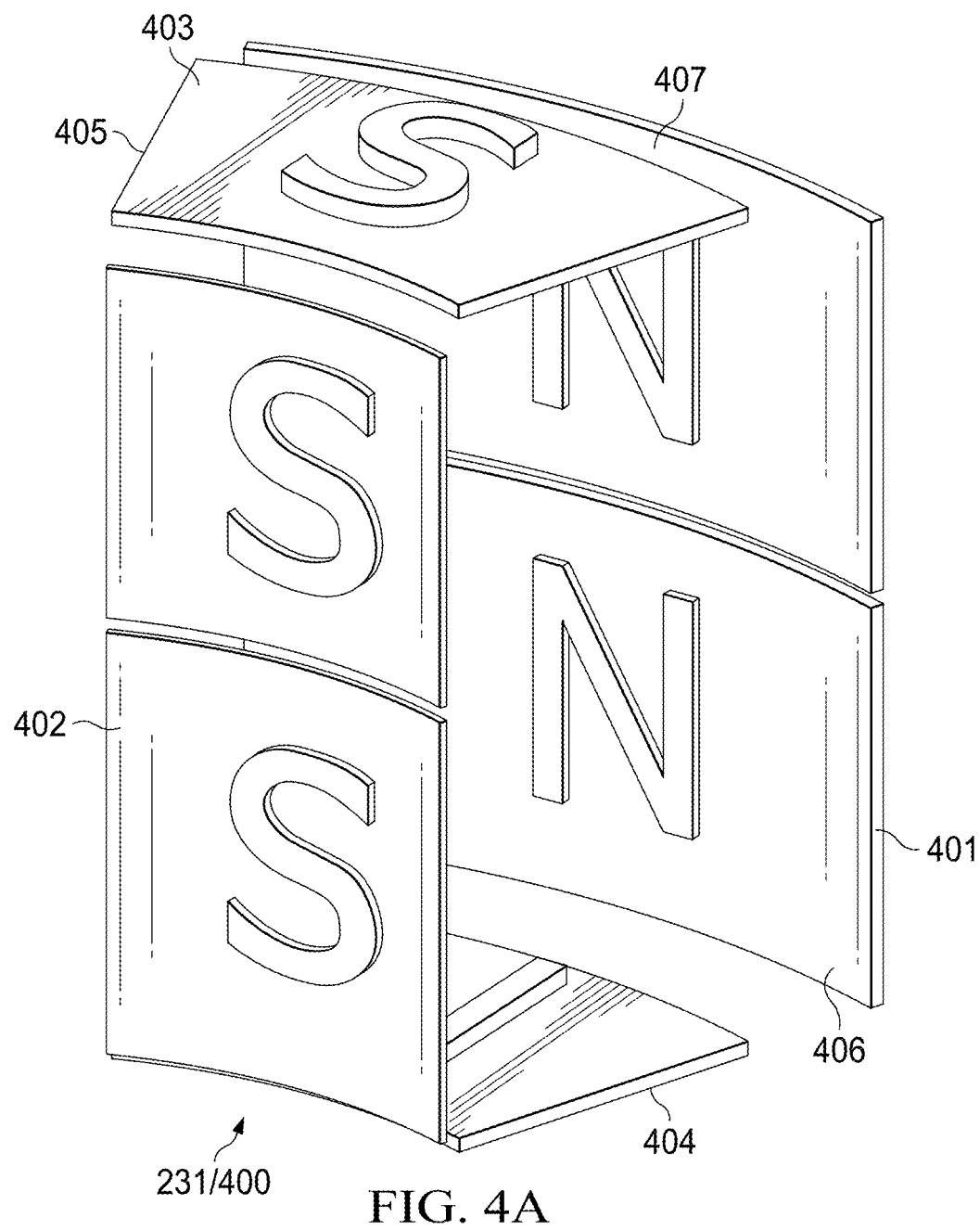
FIG. 4A is a detailed isometric view of one embodiment of a radial portion or radial segment of the toroidal magnetic cylinder illustrated in FIG. 2D.

For instance, FIG. 4A is a detailed perspective view of a portion or segment 400 of the toroidal magnetic cylinder 230

(see FIG. 2D). The radial segment 400 is conceptually similar to the partial magnetic cylinder 300 discussed in reference to FIG. 3 because the radial segment 400 has an outer curved magnetic wall 401 and an inner curved magnetic wall 402. In addition to the curved or cylindrical magnetic walls 401 and 402, there are also magnetic axial or lateral walls 403 and 404 which in this illustrated embodiment may be made of wedge-shaped plate magnets.

The magnetic poles of the magnets forming the outer cylindrical wall 401 and the inner cylindrical wall 402 have their magnetic poles orientated radially pointing towards the longitudinal axis 200 (see FIG. 2D). In contrast, the magnetic poles of the magnets forming the top or first axial wall 403 and the bottom or second axial wall 404 have their magnetic poles orientated or aligned parallel with the longitudinal axis 200. The individual magnets in the magnetic walls 403, 404, 401, and 402 all have their similar or "like" (e.g. north) magnetic poles orientated either towards or away from the interior of the tunnel 407 of the toroidal magnetic cylinder 230 to form a "closed" magnetic tunnel 407. The closed magnetic tunnel 407 runs circumferentially from the open end or exit 405 to the open end or exit 406 (similar to the tunnel 305 and open ends 308 and 310 discussed above with reference to FIG. 3).

For purposes of this disclosure and to illustrate the orientation of magnetic poles at the surfaces of the magnets forming the radial segment 400, the top axial wall 403 is labeled with an "S" on its exterior top face to indicate that in this particular configuration, the south pole of the magnet (or magnets) forming the top axial wall 403 faces away from the tunnel 407. Thus, the north pole of the magnet 403 faces towards the tunnel segment 407. Similarly, the lower axial or side wall 404 is labeled with a "N" on its interior side face to indicate that the north pole of the magnet forming the side wall 404 is facing towards the tunnel segment 407 (however, in this view the "N" is partially obscured). The two magnets forming the outer longitudinal wall 401 are labeled with an "N" on their interior surfaces to indicate that their north magnetic poles face the interior of the magnetic tunnel 407. In contrast, the two magnets forming the inner longitudinal wall 402 are labeled with an "S" on their exterior surfaces to indicate that their south poles are facing away from the tunnel 407. Thus, their north poles face towards the tunnel 407.

Figure 4B:
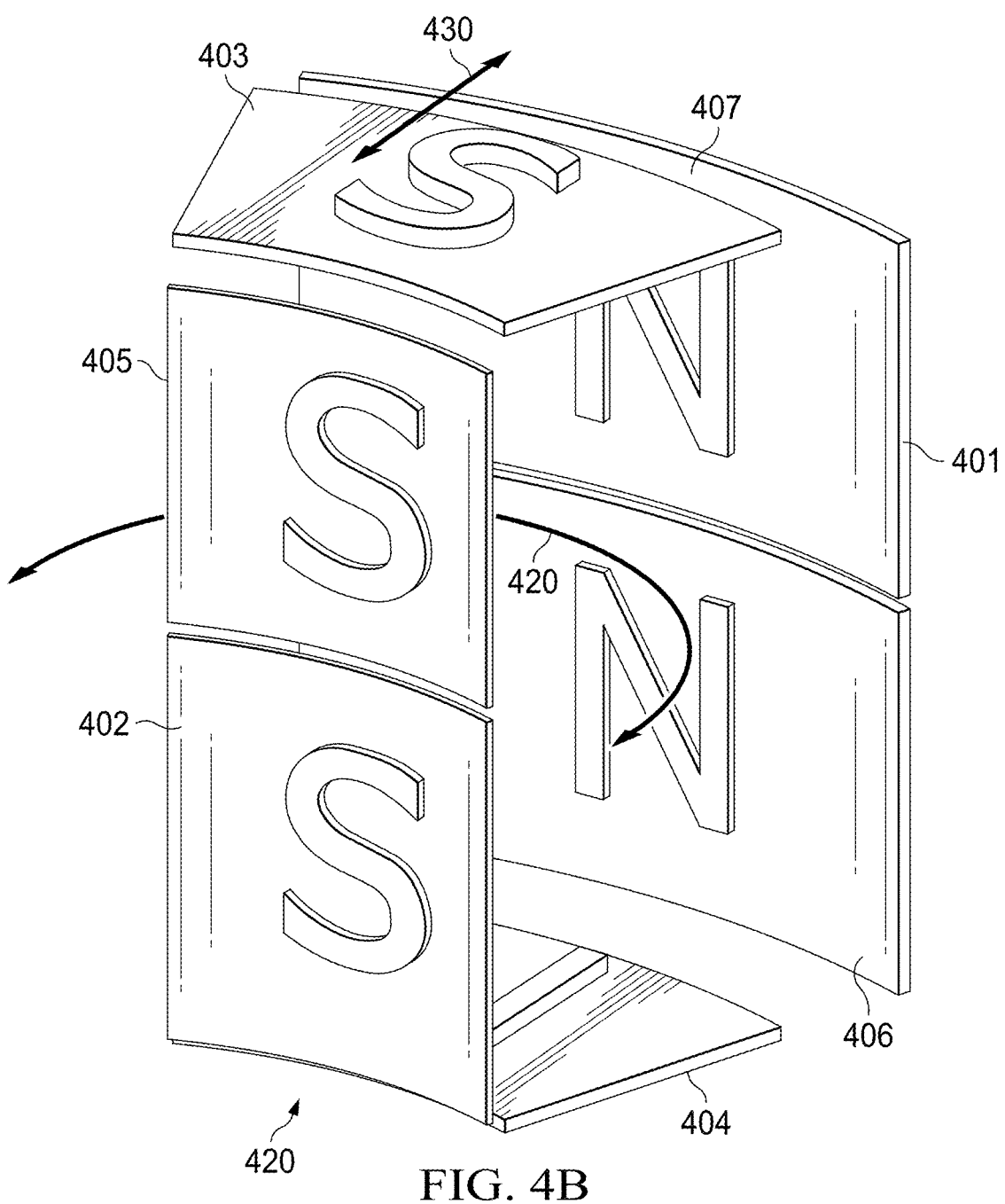
FIG. 4B is a detailed isometric view of one embodiment of the radial portion or radial segment illustrated in FIG. 4A with the addition of direction arrows.

In this illustrative embodiment of the radial segment 400, all the magnets of the walls 403, 404, 401 and 402 have their north poles facing towards the interior or tunnel 407. So, the radial segment 400 has an NNNN magnetic pole configuration. Thus, the magnetic forces which tend to repel each other—forcing the magnetic flux circumferentially along the tunnel 407 in a circumferential direction and out the tunnel exits 405 and 406 similar to that described above in reference to FIG. 3. FIG. 4B is an illustration of the radial segment 400, but with the addition of directional arrows. Arrow 420 illustrates a circumferential direction and the arrow 430 illustrates a radial direction.

The term "closed magnetic tunnel" as used in this disclosure refers to using an arrangement of the magnets forming a tunnel that "forces" or "bends" the majority of the magnetic flux "out of plane" or circumferentially through the tunnel or interior cavity then out through one of the openings 405 or 406 as illustrated by the circumferential arrow 410 of FIG. 4B. In contrast, if the magnetic tunnel were not magnetically "closed," the flux forces would generally flow in a radial manner in the direction of the radial or lateral arrow 430 (or in a plane represented by the arrow 430). Conventional electric motors usually allow flux forces to flow in a radial direction as illustrated by the arrow 430.

Figure 4C:
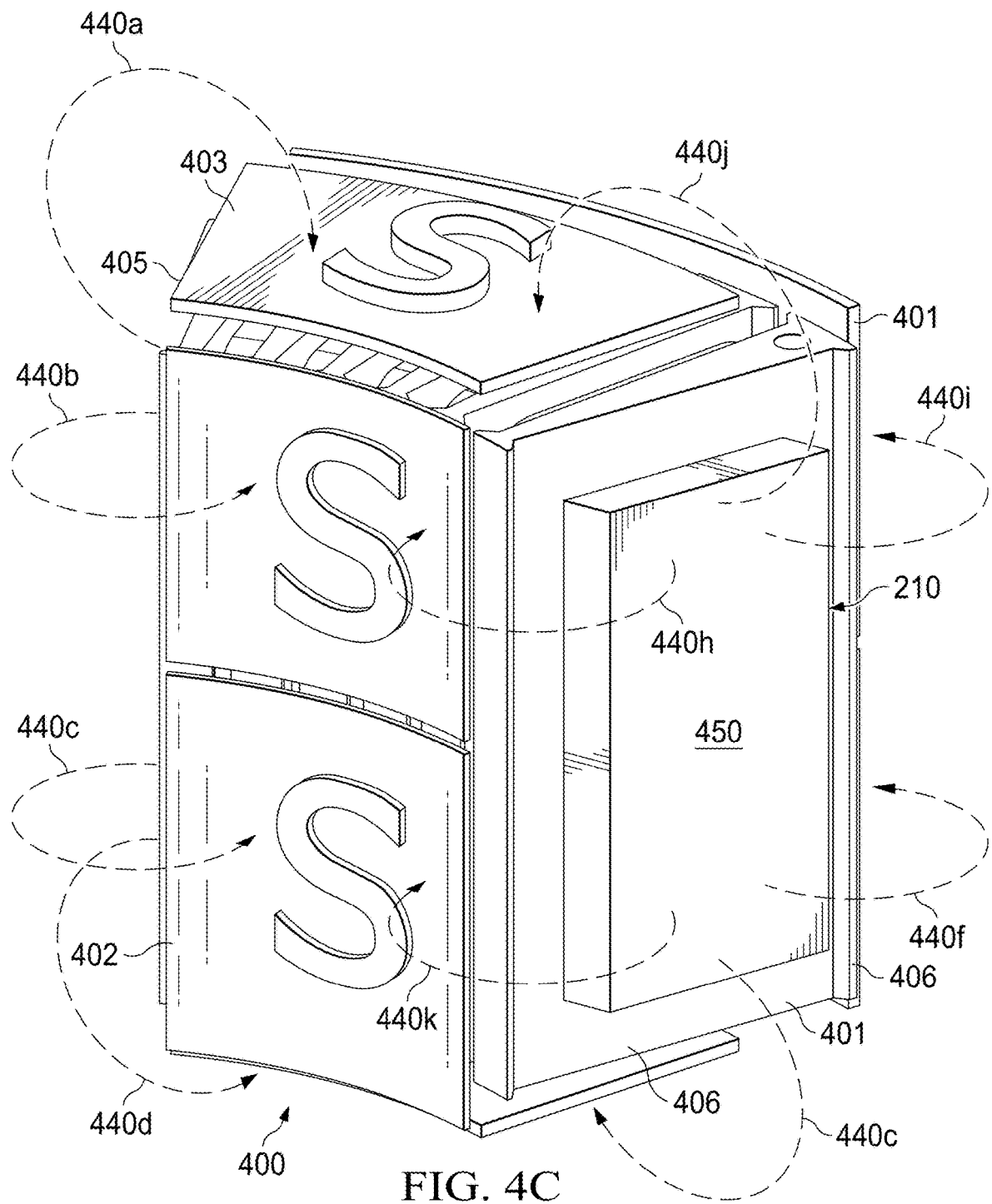
FIG. 4C is a detailed isometric view of one embodiment of the radial portion or radial segment illustrated in FIG. 4A with the addition of a portion of a coil assembly illustrated in FIG. 2C.

Turning now to FIG. 4C, there is illustrated an isometric view of radial segment 400 with a portion of the coil assembly 210 positioned within the interior of the segment or tunnel 407 (FIG. 4B). The rest of the coil assembly 210 has been removed for clarity. In an un-energized state, the magnetic flux tends to flow from the north poles of the magnetic walls 403, 404, 401 and 402 into the coil assembly 210 and to the coil core 450. Because of opposing magnetic forces, the magnetic flux continues to flow circumferentially through the coil core 450 until the flux reaches an opening (for instance, open end 406) of the tunnel 407. The flux then bends back around an open end (e.g. open end 406) of the radial segment 400 to an exterior face of the respective magnetic wall containing a south pole. Arrows 440 of FIG. 4C are meant to illustrate the three-dimensional flux path as the flux reaches an open end 405 or 406 of the radial segment and bends back around to an exterior face (or in this case, the south pole) of the appropriate magnetic wall. Thus, the radial segment 400 generates a flux field which is conceptually similar to the flux fields 306 and 307 discussed above in reference to FIG. 3 (In situations where a radial segment 400 is adjacent to another radial segment of an opposite magnetic polarity configuration, the flux lines could extend into the adjacent partial toroidal magnetic cylinder).

In certain embodiments, the core 450/coil assembly 210 may generate its own magnetic field fluxes as current is introduced into the coils 220 (not shown in FIG. 4C). The majority of magnetic field fluxes are also constrained and channeled to interact with the magnetic flux generated from the magnetic tunnel (e.g., from permanent magnets) in a similar manner to that described above. Thus, all portions of the core 450 and coil assembly 210 may interact with the flux lines of the magnetic tunnel 407 to allow full utilization of the flux lines and all forces working together in the direction of motion.

As opposed to "pancake style" or axial flux electric motor, in certain embodiments, the longitudinal length or "width" of the outer walls 401 and 402 are greater than the radial or lateral depth (or length) of the side walls 403 and 404 as illustrated in FIG. 4C. This exemplary geometric proportion results in greater torque generation along the interface of the outer wall 401 and coil assembly 210. In certain alternate embodiments, the thickness of the magnets comprising the outer wall 401 may also be increased to increase the generation of torque. In any event, the contribution to torque from the outer wall 401 and the inner wall 402 may be greater than the contribution from the side walls 403 and 404 due to the geometry of the cross-section of the radial segment 400 and the varying radius of the components.

Although the core, coil assembly, and magnetic radial segments are illustrated in cross-section as rectangular, any cross-sectional shape may be used depending on the design and performance requirements for a particular motor or generator. In certain embodiments, there is more magnetic material positioned in or along an outer wall (such as the magnetic wall 401) along the longitudinal direction than magnetic material positioned in or along a radial wall (such as the axial or side walls 403 or 404). For instance, if the magnets forming the magnetic walls are all the same thickness, the length of the outer wall in the longitudinal direction is greater than the length of the axial or side walls in the radial direction. In alternative embodiments, the length of the magnets forming the outer magnetic wall may be the same or shorter than the length of the magnets forming the axial or side walls.

The unique configurations illustrated in FIG. 4C also leads to several unique properties. For instance, an individual coil 220 and core portion 450 will tend to move out of the tunnel 407 on its own accord (e.g. with no power applied). The natural tendency of this configuration is for the coil 220 to follow the flux lines to the nearest exit 405 or 406. Conversely if a current is applied the coil 220, the coil 220 will move though the entirety of the magnetic tunnel depending on polarity of the power applied. The encapsulation of the coil 220 in the magnetic flux of the magnetic tunnel 407 also allows all magnetic fields to be used to generate motor or electric power. Cogging effects can be reduced as the coil will tend to travel out of the tunnel when no current applied. This also means that the coil 220 does not have to be pulsed with an opposing magnetic field at any point while in the magnetic tunnel 232. Additionally, the coil 220 will travel through the entire magnetic tunnel 232 length with a single DC pulse of the correct polarity. Non-sinusoidal torque or voltage is generated throughout the duration of time that the coil 220 is under the influence of the magnetic tunnel 232 and alternating polarities are not required for this effect to occur.

Figure 5:
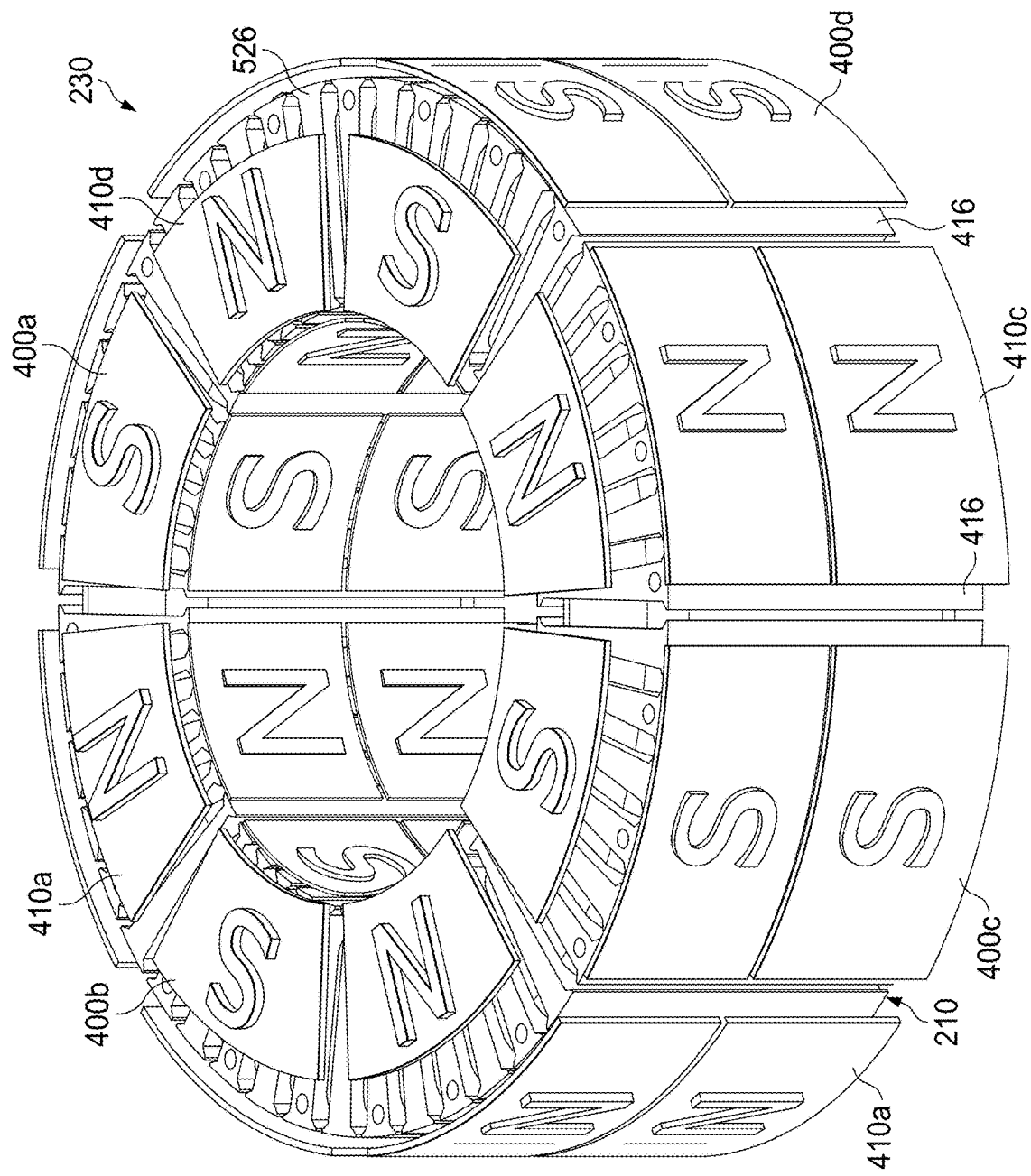
FIG. 5 illustrates one embodiment of the coil assembly of FIG. 2C positioned within the toroidal magnetic cylinder of FIG. 2D.
Figure 7:
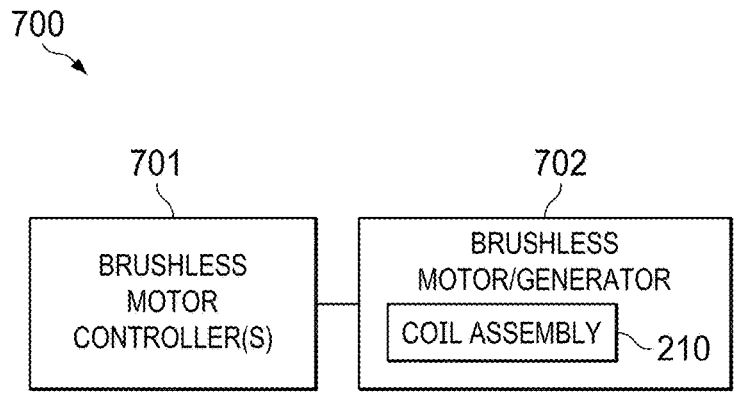
FIG. 7 is a diagram of one embodiment of a system having a brushless motor controller and an electric electrical machine.

FIG. 5 is an illustrative embodiment of the toroidal magnetic cylinder 230 that comprises eight radial segments where four radial segments 400 are interspersed between the four radial segments 410. The four radial segments 400 are identical to the radial segments 410 except that the magnetic pole orientation of the magnets has been reversed. So, in the radial segment 400, all of the interior facing magnetic poles are north forming a NNNN magnetic tunnel configuration as illustrated in FIG. 7. In contrast, in the radial segment 410, all of the interior facing magnetic poles are south forming a SSSS magnetic tunnel configuration. Thus, the tunnels radial segments 410 generate flux fields which are of an opposite polarity to the flux fields generated by the radial segments 400. In traditional motor terminology, each radial segment is a motor magnet pole. Therefore, each radial segment is a three-dimensional magnetic pole which can create a three-dimensional symmetric magnetic field. Alternating the segments then produces a sinusoidal field.

With regard to the toroidal magnetic cylinder 230, each magnetic or radial segment (e.g. radial segments 400 or 410) has their respective magnetic configuration (NNNN or SSSS) of like magnetic polarities reversed for each adjacent radial segment. Although, an eight-segment toroidal magnetic cylinder 230 is illustrated in FIG. 5, in other embodiments, two, four, six, ten, etc. segments may be used. The number of segments selected for any given application may be based on engineering design parameters and the particular performance characteristics for an individual application. The scope of this invention specifically includes and contemplates multiple segments having an opposite polarity to the adjacent partial toroidal magnetic cylinders. For simplicity and illustrative purposes, an eight-segment toroidal magnetic cylinder is described herein. However, this design choice is in no way meant to limit the choice or number of segments for any multi-segment toroidal magnetic cylinder.

As described above, in certain embodiments, the individual magnets forming the toroidal magnetic cylinder 230 couple to various components of the back iron circuit 102. The back iron circuit 102 may be used to channel part of the magnetic flux path.

Defining the Flux Path with the Back-Iron Circuit

FIG. 6 is an isometric view illustrating the coil assembly 210 positioned within the toroidal magnetic cylinder 230 which is coupled to and surrounded by the back-iron circuit 101. The first flat side wall 107a has been repositioned in an exploded view for clarity. As described above, in the illustrative embodiment, the back-iron circuit 101 may include a first side or axial wall 107a and the second side or axial wall 107b. In this embodiment, the first outer cylindrical wall 105a and the second outer cylindrical wall 105b forms and couples to and surrounds the outer magnetic walls 401a and 401b of the toroidal magnetic cylinder 230, respectively (see FIG. 2D). The first inner cylindrical wall 106a and the second inner cylindrical wall 106b is coupled to and surrounded by the inner wall magnets 402a-402b of the toroidal magnetic cylinder 230 (see FIG. 2D). Thus, the entire back iron circuit 102 includes the inner cylindrical walls 106a and 106b, the outer cylindrical walls 105a and 105b, and the side or axial walls 107a and 107b as illustrated in FIG. 1. In certain embodiments, the back-iron circuit 101 combined with the toroidal magnetic cylinder 230 may form a rotor (or a stator depending on the motor configuration). In certain embodiments, the back-iron circuit 101 may be used to channel part of the magnetic flux path. The back-iron material channels the magnetic flux produced by the toroidal magnetic cylinder 230 through the back-iron material (as opposed to air) to reduce the reluctance of the magnetic circuit. In certain embodiments, therefore, the amount or thickness of the magnets forming the toroidal magnetic cylinder (if permanent magnets are used) may be reduced when using the appropriately designed back iron circuit.

Applying Mechanical Torque or Current

In "motor" mode, current is induced in the coils 220, which will cause electromotive forces to move the coil assembly 210 relative to the toroidal magnetic cylinder 230 or vice versa. In "generator" mode, on the other hand, the movement of the coil assembly 210 relative to the toroidal magnetic cylinder 230 will cause current to be generated in the individual coils 220 to produce a DC current as the individual coils move through each tunnel or radial segment 400 or 410.

In order to maintain the generated torque and/or power the individual coils 220 in the coil assembly 210 may be selectively energized or activated by way of a switching or brushless motor controller (not shown). The individual coils 220 in the coil assembly 210 may be electrically, physically, and communicatively coupled to switching or brushless motor controller which selectively and operatively provides electrical current to the individual coils in a conventional manner.

For instance, the brushless motor controller may cause current to flow within an individual coil 220 when the individual coil is within a magnetic tunnel segment 400 with a NNNN magnetic pole configuration as illustrated in FIG. 7D. On the other hand, when the same individual coil rotates into an adjacent magnetic tunnel segment 410 with a SSSS magnetic pole configuration, the brushless motor controller causes the current within the individual coil 220 to flow in a direction opposite to that when the coil was in the NNNN magnetic pole segment 410 so that the generated magnetic force is in the same direction as coil rotates from one adjacent magnetic segment to the other.

As discussed above, the individual coils 220 may use toroidal winding without end windings and in some embodiments, the individual coils may be connected to each other in series. In other embodiments, a multi-phasic winding arrangement such as six phase, three phase, etc. winding connection may be used where the proper coils 220 are connected together to form a branch of each phase. For instance, two adjacent coils may be phase A coils, the next two adjacent coils may be phase B coils, and the next two adjacent coils may be phase C coils. This three-phase configuration would then repeat for all individual coils 220 within the coil assembly 210. In one embodiment, there are eight (8) pairs of adjacent phase A coils for a total of 16 phase A coils. Similarly, there are eight (8) pairs of adjacent phase B coils for a total of 16 phase B coils, and there are eight (8) pairs of adjacent phase C coils for a total of 16 phase C coils. Thus, in such an embodiment, there are 48 individual coils.

When the coils are energized, the multi-phasic winding can produce a rotating magnetomotive force in the air gap around the coil assembly 210. The rotating magnetomotive force interacts with the magnetic field generated by the toroidal magnetic tunnel 430, which in turn produces torque on all sides of the coil assembly 210 and relative movement between the coil assembly and the toroidal magnetic tunnel.

In such embodiments, the individual coils 220 may be connected to a brushless motor controller (not shown) to be activated by a controller or in a similar manner known in the art. For each phase, the brushless motor controller can apply forward current, reverse current, or no current. In operation, the brushless motor controller applies current to the phases in a sequence that continuously imparts torque to turn the magnetic toroidal tunnel in a desired direction (relative to the coil assembly) in motor mode. In certain embodiments, the brushless motor controller can decode the rotor position from signals from position sensors or can infer the rotor position based on back-emf produced by each phase. In certain embodiments, two brushless motor controllers may be used. In other embodiments, a single brushless motor controller may be used. The brushless motor controller(s) controls the application of current of the proper polarity for the proper amount of time at the right time and controls the voltage/current for speed control. Regardless, the brushless motor controllers allow for a switching action and a varying voltage action.

In other embodiments, a brushed electrical machine may be used. In such embodiments, one or more commutators (not shown) may be used and positioned, for instance, within the rotor hub 300 (see FIG. 1). In certain embodiments, the number of brushes used may equal the number of toroidal magnetic segments used in the design of the particular electrical machine. For instance, if eight toroidal magnetic segments are used, then eight brushes may be used. The individual coils 220 in the coil assembly 210 may be connected in series having toroidal wound windings. In a brushed design in motor mode, a simplified reverse switching circuit is all that is necessary to switch the current direction as the coils enter and exit the respective toroidal magnetic segment.

By way of example, in the embodiment illustrated in FIGS. 5 and 6, there are 48 coils which may be positioned in a coil assembly of an electric motor having eight magnetic "tunnels" or motor poles. Thus, each magnetic tunnel surrounds 6 of the 48 coils as will be explained below. Optimum torque may be achieved when all six coils are energized sequentially and for the full duration that each coil is within the tunnel segment. Unlike conventional machines, the coil pole pitch is not dependent on any magnet pole piece width to function. The result is that, compared to conventional motors, the electrical machine 100 generates approximately two times the torque density, three times the power density, and two times the output for a given motor size.

In a conventional motor, the magnet pole face and the coil pole face are basically the same size. So, the coil approaches the magnet pole face, one has a short period of time to make use of the magnetic attraction. This results in a limited pulse. Conventional AC motors, used in vehicles or an industrial machine, typically use a three-phase sinusoidal power supply. And the three phases are 120 electrical degrees apart or about 60 degrees mechanical degrees apart. The pulses fire for only short period of time, then they advance to the next one. This means at any one point, one only has one set of coils, one phase, producing peak torque. Other sets of coils fire a sequential pattern to create a rotating magnetic field. So, phase A fires, then phase B fires, then phase C fires. In other words, basically two of the coils are off and only one of them is on at any given time. So, your output torque is an average or an RMS value for the three phases. In contrast, certain embodiments of the electrical machine 100, two or more of the coils can fire at the same time.

Because of the geometry of the electrical machine 100, when a single coil is energized as it enters the pole region it may remain energized and thus will produce torque the entirety of its travel through the pole region. In other words, an energized coil will move completely through a magnetic tunnel or like polarity region on a single DC pulse (approximately 45 degrees when using 8 tunnels). The coil will then change polarity as it moves through the next tunnel or polarity region. Thus, in the example illustrated in FIGS. 5 and 6, the energized coil will change polarity eight times during a single rotation. A conventional switching mechanism (not shown) may be used to change current direction in the coils as they move from one magnetic tunnel to another. Of course, if the coil assembly is the stator, the coils do not actually move, but the magnets move relative to the coils. In this specification, movement is relative and may refer to either the coil physically moving or the magnets physically moving.

In another embodiment, not shown, there may be four motor poles or tunnels. In this embodiment the current in the coil would change its polarity four times as the coil moves through four tunnels of approximately 90 degrees each as explained above.

In sum, the windings are placed in an axial/radial direction in multiple slots 221 (e.g. 48 slots) which can form a single phase or multi-phase winding. The radial/axial placement of the windings may create a maximum force in the direction of motion for all four sides of the windings. Current direction or polarization determines direction of travel. In other words, a particular direction of current in a coil determines the direction of rotation. Thus, individual coils/phases can be energized to slow or boost rotation. This allows for precise braking or positioning of rotor—including forward, reverse, and regenerative braking.

A Brushless Motor Controller for an Electric Electrical Machine

FIG. 7 is a block diagram of one embodiment of a system 700 that includes one or more brushless motor controllers 701 and a brushless motor or generator 702. The brushless electrical machine 702 may be similar or identical to the brushless electrical machine 100 described in previous embodiments. Accordingly, in some embodiments the brushless electrical machine 702 includes a coil assembly 210 that is similar or identical to the coil assembly 210 described above. For purposes of explanation, like parts will be numbered as in previous embodiments. It is understood that the brushless motor controller 701 and the methods described herein may be applied to other configurations of electric motors and/or generators.

The brushless motor controller 701 may be configured to manage the application of current to the phases in a sequence that continuously impacts torque to turn the magnetic toroidal tunnel in a desired direction (relative to the coil assembly) in motor mode. The brushless motor controller 701 controls the application of current of the proper polarity for the proper amount of time at the right time and controls the voltage/current for speed control. Accordingly, the brushless motor controller 701 enables a switching action and a varying voltage action. Specifically, a brushless motor overcomes the requirements for a mechanical commutator in a conventional DC motor by reversing the motor configuration in a conventional motor, such that, the windings become the stator and the permanent magnets become part of the rotor assembly. That is, the windings are commutated in a sequence that produces a rotating magnetic field that drags the rotor assembly around and drives an attached load. The sequence is determined by the relative positions of the stator and rotor assembly. In some embodiments, the timing of the sequence is determined by Hall-effect sensors and/or the magnitude of the back electromagnetic force (BEMF) generated by the rotating rotor assembly.

In some embodiments, the brushless motor controller 701 may be designed to work regardless of the constraints of a particular winding assembly 210 to achieve the desired system performance. Accordingly, in some embodiments, the brushless motor controller 701 may be highly configurable to allow the brushless motor controller 701 to adapt to a variety of brushless motor 702 configurations and system constraints. For example, the brushless controller 701 may be configured or programmed with motor parameters and system parameters including the maximum current, maximum speed, maximum speed, number of poles, and operation voltage, and the like.

In some embodiments, the brushless motor controller 701 is programmed with the number of poles. In the present embodiment, the number of poles is defined as the number of poles of the permanent magnet of the rotor(s), Accordingly, the number of pole pairs is defined as the number of poles of the permanent magnet of the rotor(s) divided by 2. In some instances, the number of poles may be specified on the manufacture's datasheet, motor nameplate; or the like, for the brushless motor. In some instances, the number of poles may be not be specified but can be determined experimentally by injecting a current with a power supply, which is less than the rated current of the motor, into phase A allowing the motor to settle into an initial position. By rotating the brushless motor through one revolution and counting the number of settle down positions the number of pole pairs can be determined. The number of poles is determined by multiplying the number of pole pairs by 2.

In some embodiments, the brushless motor controller 701 is programmed with the operating voltage. In the present embodiment, the operating voltage of the brushless motor may a range, where the brushless motor characteristics are substantially constant and does not adversely affect the motor life. For example, the upper voltage valve may be based, at least in part, on a value beyond which the magnetic portion of the motor saturated. In contrast, the lower valve may be based, at least in part, below which the current under rated load may increase to a value that causes excessive heating and damages the motor. In some instances, the operating voltage may be specified on the manufacture's datasheet, motor nameplate, or the like, for the brushless motor. In some embodiments, the operation voltage of the system is fixed, that is, the operating voltage is provided by a regulated supply. In certain embodiments, the operating voltage of the system is unregulated and may vary. For instance, the system may be powered by a battery and the operation voltage at the battery terminal voltage may decay as the battery discharges or drop with increasing load current because of the internal resistance of the battery. In certain embodiments, the supply voltage may be decoupled with a bulk capacitor and/or bypass capacitor. In some embodiments, motor speed is adjusted by modifying the magnitude of the operation voltage. In the present embodiment, the motor speed is adjusted by the brushless motor controller 701 modifying the PWM/duty cycle of the motor drive circuit In a MOSFET bridge. In one embodiment, the brushless motor controller 701 measures the operating voltage.

In some embodiments, the brushless motor controller 701 is programmed with the maximum current. In the present embodiment, the maximum current is defined as the steady state current consumption of the brushless motor that does not cause an increase, in heating resulting in a shorting of the motor life. In certain embodiments, the maximum current is defined for the no-load speed and/or full load speed of the brushless motor 702. In certain embodiments, the maximum current is the current consumption during startup or during acceleration. In one embodiment, the brushless motor controller 701 measures the operating current.

In some embodiments, the brushless motor controller 701 is programmed with the motor resistance. In some instances, the motor resistance may be specified on the manufacture's datasheet, motor nameplate, or the like, for the brushless motor. In some instances, the motor resistance may not be specified but can be determined experimentally by measuring the resistance across the phase terminals, for example phase A.

In some embodiments, the brushless motor controller 701 is programmed with the motor velocity constant. In the present embodiment, the motor velocity constant is defined as the motor's phase-to-phase back electromotive force (BEMF) voltage, as a function of the motor velocity and is a constant (mV/Hz). In some instances, the motor velocity constant may be specified on the manufacture's datasheet, motor nameplate, or the like, for the brushless motor. In some instances, the motor velocity constant can be determined experimentally by manually spinning the brushless motor's rotor and measuring with an oscilloscope the differential peak-to-peak voltage amplitude across any phase, for example, phase A. The BEMF corresponds to the peak-to-peak voltage amplitude x the electrical period. In certain instances, the BEMF can be estimated by measuring the maximum motor speed under no load. In this instance the BEMF can be determined by: Supply Voltage/((Motor rpm/60)/number of pole, pairs). Alternatively, the BEMF can determined by: (Supply Voltage−current×phase resistance)/((Motor rpm/60)/number of pole pairs). In systems where the motor BEMF is correctly set the enveloped of the motor phase current should be substantially constant, corresponding to current maximum acceleration, as the brushless motor controller 701 ramps up the speed of the motor over time. If the motor BEMF is set to high, the envelope of the motor phase current may ramp up over time as the speed of the motor increases. If the motor BEMF is set too low, the envelope of the motor phase current may decrease as the speed of the motor increases.

In some embodiments, the brushless motor controller 701 is programmed with the electrical time, constant of the brushless motor 702. In the present embodiment, the electrical time constant (TLR) of the brushless motor 702 is defined as the motor phase-to-phase inductance divided by the motor phase-to-phase resistance. In one embodiment, a control advance time of the system is based, at least in part, on the electrical time constant of the brushless motor.

In some embodiments, the brushless motor controller 701 is programed with the rotor inertia (kgm$^2$) or angular mass. The rotor inertia is a function of the rotor structure and/or load and is the tendency of the rotor to keep moving as a constant velocity when no drive force is applied to the motor or to remain stationary when a drive force is applied at startup. In some instances, the motor rotor inertia may be specified on the manufacture's datasheet, motor nameplate, or the like, for the brushless motor.

In some embodiments, the brushless motor constants are stored on an EEPROM, or the like, located on or within the brushless motor 702 and accessed by the brushless motor controller 701 via a data bus at startup.

In some embodiments, the brushless motor controller 701 is programed with only the motor (phase) resistance and the motor BEMF constant of the brushless motor 702 and default values are used for the other brushless motor parameters.

In some embodiments, the brushless motor controller 701 includes Initial Position Detection (IPD) to detect the rotor alignment of the brushless motor 702 at startup. Initial position detection is used in applications where reverse rotation of the rotor is unacceptable at startup. For instance, reverse rotation of the rotor and/or load is visible or would cause a vehicle to jolt/move backwards. In certain embodiments, initial position detection is implemented to allow a faster startup of the motor.

In some embodiments, the initial position of the rotor is determined with one or more sensors. For instance, the initial position of the rotor may be determined with Hall sensor(s). Alternatively, the initial position of the rotor may be determined with optical encoders, resolvers, and the like. However, these techniques increase the system complexity and decreases the system reliability, because the brushless motor must have a sensor(s) built and/or attached mechanically to the rotor. Further, interfaces and wiring must be added for excitation of the sensors and feedback signals between the brushless motor controller and the sensor(s).

In some embodiments, the position of the rotor is determined from information based on the back electromagnetic force (BEMF) generated by the rotating rotor. In some instances, the position of the rotor is determined based on a BEMF integration method. In certain instances, the position of the rotor is determined based on detecting the zero-crossing points in the BEMF. In one instance, the position of the rotor is determined based on based on a third-harmonic BEMF sensing method. In some embodiments, sensorless motor control techniques are used to increase the system reliability and eliminate the need for discrete sensor(s) and extra wiring in the system.

In some instances, the inductance of the brushless motor winding varies as a function of rotor position. In one embodiment, an inductive sense method is used to determine the initial position of the rotor at start-up. That is, the rotor position can be determined by pulsing current to the brushless motor winding and determining the corresponding inductance without causing the rotor to rotate. For example, a voltage is sequentially applied across one of the phases according to the following sequence: A, B, C, D, E, and F until the current reaches a preterminal current threshold valve. The time it takes from when the voltage is applied, until when the current threshold is reached is measured. Because this time varies as a function of the inductance in the motor windings, the state with the shortest time corresponds to the state with the minimum inductance, which occurs when the north pole of the motor is aligned with this particular driving state.

In certain embodiments, the brushless motor controller 701 is configured for align and go. For instance, where reverse rotation of the rotor and/or load at startup is not important the align and go method may be used. The align and go method forces the motor into alignment by applying a voltage across a particular motor phase to force the motor's rotor to rotate into alignment with this phase at startup.

In certain embodiments, the brushless motor controller 701 is configured to transition between IPD detection, and the like, of the rotor and BEMF detection of the rotor position. In one embodiment, a handoff threshold is implemented by the controller to avoid a startup failure. The handoff threshold may be based, at least in part, on a minimum motor speed. That is, there is a minimum speed that must be obtained by the rotor before the magnitude of the BEMF is sufficient for the controller to measure. In one embodiment, the handoff threshold is based, at least in part, on the maximum motor speed. For example, the handoff threshold may be between about 0.1 and 0.5 of the rated brushless motors' 702 speed.

In some embodiments, the brushless motor controller 701 is configured to receive an analogy input speed command proportional to the rotor speed. For instance, the magnitude an analogy voltage/current may be directly proportional to the rotor speed. In certain embodiments, the brushless motor controller 701 is configured to receive a PWM speed command. For instances, the duty cycle of the PWM signal may be directly proportional to the rotor speed. In one embodiment, the controller is configured to receive the speed commands via a data bus. For instance, the speed of the rotor may be transmitted via I$^2$C speed/data commands.

In some embodiments, the brushless motor controller 701 may be configured to measure the initial speed of the brushless motor at start-up. In one embodiment, the brushless motor controller 701 may be configured to measure the direction of rotation of the brushless motor at start-up. In certain embodiments, the brushless motor controller 701 may be programed with an initial forward speed wait threshold. In one embodiment, the brushless motor 702 may be configured to wait if the brushless motor is spinning below the initial forward speed wait threshold. In certain embodiments, the decision to wait may be base, at least in part, on the rotor inertia, which is a function of the rotor structure and/or load and is the tendency of the rotor to keep moving as a constant velocity when no drive force is applied to the motor. That is, high inertia/low friction motors will take a long time to coast down to zero speed if a reverse motor drive and/or brake function is not implemented.

In some embodiments, the system may be configured to implement a brushless motor brake function by turning on all the low-side driver MOSFETS. In certain embodiments, the brushless motor controller includes a set brake speed threshold. In one embodiment, the brushless motor controller 701 may be configured to brake, based on, at least in part, the initial forward speed, the initial forward speed wait threshold, the set brake speed threshold, the direction of rotation, or the rotor inertia. The brushless motor position may be unknown after the motor has stopped when the brake function is implemented requiring either the brushless motor controller to use either IPD or Align and Go method at start-up. After the brushless motor has stopped spinning the brushless motor start-up sequence can be initiated. In one embodiment, the system may be configured to go directly into closed loop mode by resynchronizing the spinning motor. In one embodiment, to achieve the quickest start-up time the brushless motor controller may be configured to go directly into closed loop mode if the forward speed is greater than a threshold valve. In certain embodiments, the brushless motor controller 701 may be programmed with an initial reverse speed wait threshold. In one embodiment, the brushless motor 702 may be configured to wait if the brushless motor is spinning below the initial reverse speed wait threshold. In certain embodiments, the decision to wait may be base, at least in part, on the rotor inertia. In certain embodiments, the brushless motor controller 701 may be configured to brake, based on, at least in part, the initial reverse speed threshold, the reverse speed wait threshold, the direction of rotation, and the rotor inertia. In one embodiment, the brushless motor controller 701 may be configured to brake, based on, at least in part, the initial reserve speed, the initial reverse speed wait threshold, the set brake speed threshold, the direction of rotation, or the rotor inertia. After the brushless motor has stopped spinning the brushless motor start-up sequence can be initiated.

In some embodiments, the brushless motor controller 701 may be configured to implement a brushless motor reverse drive option. In one embodiment, the system may be configured to reverse the motor drive, such that the brushless motor accelerates through zero velocity. This embodiment achieves the shortest possible spin-up time in a system where the brushless motor is spinning in the reverse direction at startup. In certain embodiments, the brushless motor controller is configured to transition between forward motor drive, reverse motor drive, and/or the brake function in real time. In one embodiment, the brushless motor controller 701 has a built-in thermal shutdown function, which shuts down the MOSFET driver when the system temperature is greater than a shutdown threshold value. In certain embodiments, the system recovers when the MOSFET driver temperature is less than a recover threshold value.

In one embodiment, the brushless motor controller 701 has built-in overcurrent protection to protect the device if the current as measured from the drive MOSFETs exceeds a shutdown threshold value. In certain embodiments, the brushless motor controller 701 places the MOSFETs into a high-impedance state until the overcurrent condition is no longer detected.

In certain embodiments, the brushless motor controller 701 determines an acceleration number, which is based, at least in part, on the motor inertia. In one embodiment, the brushless motor controller 701 is configured to determine whether the acceleration value is too high by monitoring a phase current and the motor rpm. If the brushless electrical machine 100 is not rotating and the current phase current keeps increasing, then the acceleration value is too high. In one embodiment, the brushless motor controller 701 is configured to reduce the acceleration number until a reliable startup is achieved.

In some embodiments, the brushless motor controller 701 is programmed with an acceleration current limit. In one embodiment, the acceleration current is configured by the brushless motor controller 701 to be less than the full-speed operation current. In one embodiment, the acceleration current is configured by the brushless DC controller 701 for a soft start-up. In one embodiment, the acceleration current is ramped over a period of time. In one embodiment, the acceleration current is based, at least in part, on the motor inertia value. In one embodiment the brushless motor controller configures the acceleration current to reduce/minimize acoustic noise at startup. In one embodiment, the acceleration current is greater than the current at maximum speed under full load. In certain embodiments, the brushless controller 701 configures the acceleration current to be less than the lock current limit threshold. In one embodiment, the brushless motor controller 701 is configured to restart the brushless electrical machine 100 after a period of time. For example, the brushless motor controller is configured to restart the brushless electrical machine 100 between about 1 and about 10 seconds.

In some embodiments, the brushless motor controller 701 is configured with a lock detection current threshold. The lock detection current threshold is configured to protect the brushless motor 702 and/or brushless controller when the rotor is restricted from rotating by an external force.

In some embodiments, the brushless motor controller 701 includes a dead time for the gate drive between the high-side and low-side gate drivers, wherein the dead time is enough to avoid shot through. In certain embodiments, the dead time is based, at least in part, on the supply voltage.

In some embodiments, the brushless motor controller 701 may be configured to optimize the brushless electrical machine's 100 efficiency by modifying a control advance angle. In the present embodiment, the control advance angle is defined as the difference between the phase voltage and the phase current of the brushless electrical machine 100. In some embodiments, the optimum control advance angle is determined by one or more of: adjusting the control advance angle to minimizes the supply current at a given speed, the phase current waveform being stable, and/or the motor rotor assembly spinning smoothly. In certain embodiments, the control advance angle may be increased. In one embodiment, the control advance angle may be decreased.

In some embodiments, the brushless motor controller 701 may be programmed with an anti-voltage surge function. The phase windings of the brushless electrical machine 100 are an inductive load. When current is driven through an inductive load energy is stored. In the present embodiment, the anti-voltage surge function prevents the brushless electrical machine 100 voltage from surging when the brushless electrical machine 100 is transitioning from high speed to low speed and/or from a driven state to a coasting state. For example, the brushless motor controller 701 may be configured to actively drive the low side MOSFETs when the motor driver transitions from driving the motor into a high-impedance state, corresponding to coasting. In this mode, the brushless motor controller 701 may be configured to actively drive the high side MOSFETs high, such that the inductive energy in the inductive windings where returning energy to the supply is allowed.

In some embodiments, a plurality of coils or coil windings 220 of the coil assembly 210 may be individually controllable using electronic switches and the brushless motor controller 701 may therefore energize each coil winding 220 separately. This enables the coil windings 220 to be dynamically grouped into sets to be energized by the brushless motor controller 701, and the particular set to which a coil winding 220 is assigned can be dynamically altered by the brushless motor controller 701 based on desired operational parameters. In this manner, the brushless motor controller 701 is able to use the single brushless motor 702 to dynamically achieve a multi-phasic winding by controlling when each coil winding 220 is energized.

In certain embodiments the brushless motor controller 701 may be configured to identify one or more of the coil windings that are faulty. The brushless motor controller 701 may use the ability to individually control when each coil windings 220 is energized to omit one or more of the coil windings 220 that are faulty; such that, the faulty coil winding(s) 220 are not energized.

In certain embodiments, each coil 220 of the coil assembly 210 may be individually controllable using electronic switches and the brushless motor controller 701 may therefore energize each coil 220 separately. This enables a plurality of coils to be dynamically grouped into a coil winding to be energized by the brushless motor controller 701, and the particular winding to which a coil is assigned can be dynamically altered by the brushless motor controller 701 based on the desired operational parameters. In certain embodiments, the brushless motor controller 701 may be configured to identify one or more of the individually coil(s) 220 that are faulty. The brushless motor controller 701 may use the ability to individually control each coil 220 to omit or isolate one or more of the individually controllable coil(s) 220 that are faulty from a coil winding using electronic switches. In certain embodiments, the brushless motor controller 701 may be programmed to omit one or more of the individually controllable coil(s) that are faulty and one or more coil(s) that are not faulty to balance the torque of each coil winding of the brushless electrical machine 100.

The brushless motor controller 701 may use the ability to isolate one or more of the coils or coil windings that are faulty to implement a limp mode or "limp-home mode," That is, limp-home mode may be activated by the brushless motor controller 701 when the system detects a fault with one or more of the plurality of cons 220 or coil windings that could damage the brushless electrical machine 100 and/or brushless motor controller 702. While isolating one or more faulty coils or coil windings may reduce the torque/power of the brushless motor 702 it may also allow a vehicle powered by the brushless electrical machine 100 to drive home, complete a journey, be taken to a service center, or the like. In certain embodiments, the brushless motor controller 701 may be programmed with the one or more of the individually controllable coil(s) that are faulty. For instance, during the manufacturing process, at a service center, or the like. In some embodiments, the brushless motor controller 701 may be configured to modify the energization of one or more coil windings of the brushless motor 702 to compensated for one or more faulty cons or coil windings 220. For instance, the brushless motor controller 701 may increase the duty cycle of the PWM driver signal for the coil winding containing one or more faulty cons 220. In some instances, the brushless motor controller 701 may decrease the duty cycle of the PWM driver signal for the phase winding(s) that do not contain one or more faulty coil(s) 220 to balance the torque.

In some embodiments, one or more the electronic switch(s) is a power thyristor or silicon-controlled rectifier, SCR. A power thyristor is a solid-state semiconductor device with four layers of alternating p-type doped material and n-type doped material. It functions as a bi-stable switch, which conducts when the gate of the power thyristor receives a current trigger and continues to conduct until the voltage across the power thyristor is reversed biased, or until the voltage is removed. That is, a power thyristor inherently switches off at the points of zero load current. Therefore, the current will never be interrupted in the middle of a sine wave peak, thereby preventing the large transient voltage that would otherwise occur due to the sudden collapse of the magnetic field around the inductance. Power thyristors are used for controlling alternating currents in applications where high voltages and currents are present. In certain embodiments, zero-crossover switching of the power thyristors is implemented. That is, a zero-point detector is used to avoid the adverse effects of the inductive winding back emf.

In some embodiments, one or more of the electronic switch(es) is a power metal-oxide-semiconductor field-effect transistor, MOSFET. A power MOSFET is a specific type of MOSFET having a vertical structure, rather than a planar structure of a conventional MOSFET, that is designed to handle significant higher power levels. Specifically, a power MOSFET is designed to have a lower on resistance than a conventional low power MOSFET and the oxide layer of the MOSFET gate is thicker with a higher threshold voltage. It can therefore withstand a higher input voltage than a conventional MOSFET.

In some embodiments, one or more of the electronic switches(s) is a three-terminal insulated-gate bipolar transistor, (IGBT). The IGBT is a power switching transistor which combines the advantages of Metal Oxide Semiconductor Field Effect Transistors, MOSFETS, and Bipolar Junction Transistors, (BJTs). That is, the IGBT combines the high input impedance and high switching speeds of a MOSFET, with the low saturation voltage of a bipolar transistor, making the IGBT ideal as a semiconductor switching device in motor control circuits. Specifically, the IGBT combines the insulated gate technology of the MOSFET with the output performance characteristics of a conventional bipolar transistor, such that the device offers greater power gain than the standard bipolar Junction Transistor with the higher voltage switching operation and lower input losses of a MOSFET. Further, the IGBT has a much lower on-state resistance than an equivalent MOSFET meaning that the $I^2R$ drop across the bipolar output structure for a given switching current is also much lower. These properties, lower on-state resistance and conduction losses, combined the IGBTs ability to switch high voltages at high frequencies without damage, make the IGBT ideal for driving inductive loads, such as the coil windings of brushless motors. However, unlike a MOSFET, which has bi-directional current switching capabilities, a conventional IGBT can only switch current in the forward direction. In certain embodiments, where reverse current flow is needed, an additional diode is placed in anti-parallel with the IGBT to conduct current in the reverse direction. In certain embodiments, zero-crossover switching is implemented. That is, a zero-point detector is used to avoid the adverse effects of the inductive winding back emf.

In some embodiments, one or more of the electronic switches is a power bipolar transistor, BJT. Power bipolar transistors are semiconductors in which a base n-type or p-type doped layer is sandwiched between emitter and collector layers of the opposite doped material. For example, and NPN transistor comprises two semiconductor junctions that share a thin p-doped region.

In some embodiments, one or more of the electronic switches(s) is a solid-state relay, SSR. A solid-state relay is an electronic switching device that switches on or off when a small external voltage is applied across the control terminals of the device, which in many devices, energizes an internal LED which illuminates and switches on a photo-sensitive diode. The photo-sensitive diode current turns on a back-back power thyristor, SCR, or MOSFET. The optical coupling allows the control circuit to be electrically isolated from the load.

In some embodiments, one or more of the electronic switches(s) is a solid-state relay, SSR. A solid-state relay is an electronic switching device that switches on or off when a small external voltage is applied across the control terminals of the device, which in many devices, energizes an internal LED which illuminates and switches on a photo-sensitive diode. The photo-sensitive diode current turns on a back-back power thyristor, SCR, IGBT, or MOSFET. The optical coupling allows the control circuit to be electrically isolated from the load.

Figure 8:
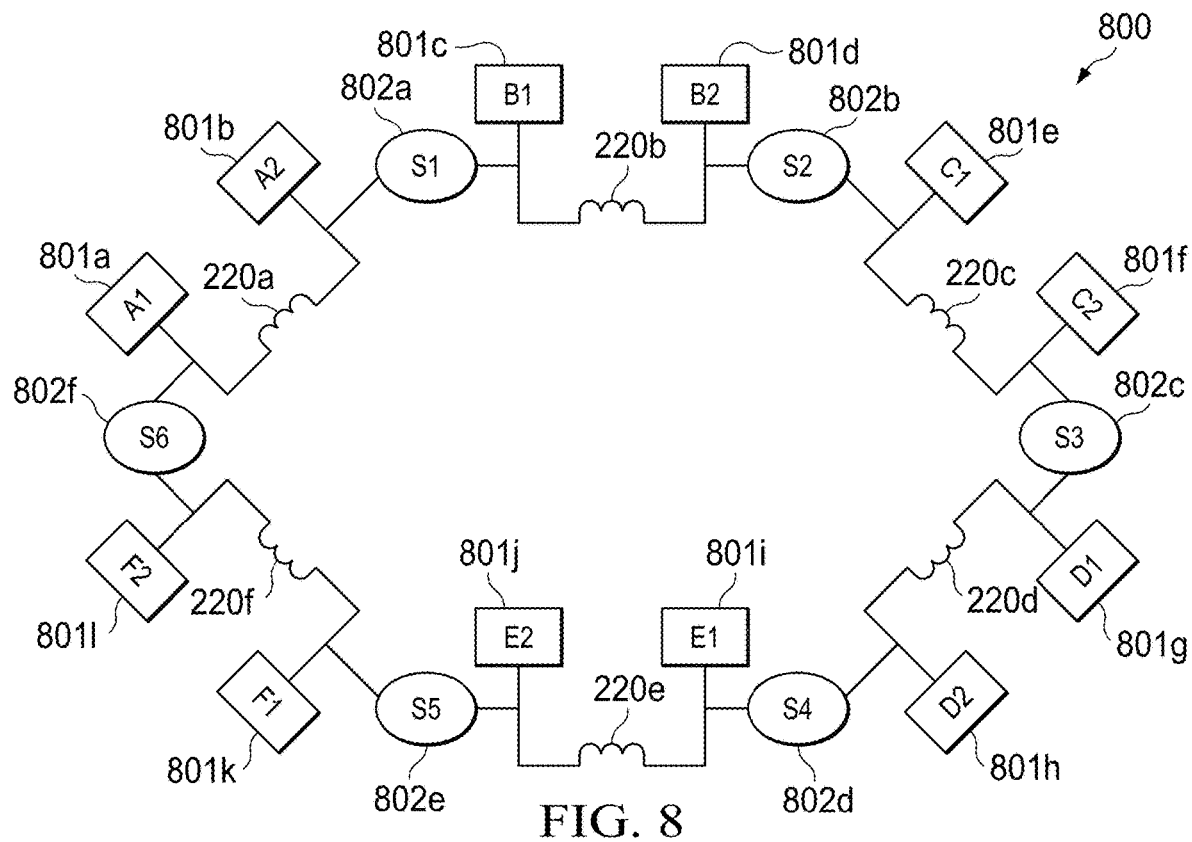
FIG. 8 is a diagram of one embodiment of a system illustrating how a brushless motor controller may be coupled to a coil assembly having six winding phases via H-bridges.

FIG. 8 illustrates one embodiment 800 of dynamically modifying the phase of brushless electrical machine 100/700 to provide multi-phasic capability. In the illustrative embodiment of FIG. 8, the coils 220 are divided into six coil windings or six phase groups A-F, with the expectation that all the coils in a phase group will be energized together. Two half-H-bridges A1, A2 (801a-801b) are connected to each end of phase A coils, two half-H-bridge B1, B2 (801c-801d) are connected to each end of the phase B coils, two half-H-bridge C1, C2 (801e-801f) are connected to each end of the phase C coils, two half-H-bridge D1, D2 (801g-801h) are connected to each end of the phase D coils, two half-H-bridge E1, E2 (801i-801j) are connected to each end of the phase E coils, and two half-H-bridge F1, F2 (801k-801l) are connected to each end of the phase F coils. Further, half-H-bridge A2 is connected to half-H-bridge B1 by electronic switch S1 (802a), half-H-bridge B2 is connected to half-H-bridge C1 by electronic switch S2(802b), half-H-bridge C2 is connected to half-H-bridge D1 by electronic switch S3 (802c), half-H-bridge D2 is connected to half-H-bridge E1 by electronic switch S4 (802d), half-H-bridge E2 is connected to half-H-bridge F1 by electronic switch S5(802e), and half-H-bridge F2 is connected to half-H-bridge A1 by electronic switch S6 (802f).

The output of each half-H-bridge 801 may be driven (switched) high, low, or configured as a high impedance output stage by the brushless motor controller 701. The, brushless motor controller 701 may control the firing sequence of the half-H-bridges 801 to emulate the 6-phase winding of a conventional motor by configuring each of the electronic switches S1 through S6 (802a-802f) to be open and driving each half-H-bridge 801 with the appropriate firing sequence. That is, six coil windings A-F emulate the six-phase windings of a conventional motor.

In another embodiment, the brushless motor controller may configure the twelve half-H-bridges and six electronic switches to emulate the 3-phase winding of a conventional motor. For instance, the brushless motor controller 701 may close electronic switches S1, S3, and S5 to connect coil winding Ain series with coil winding B, coil winding C in series with coil winding D, and coil winding E is series with coil winding F. The brushless motor controller 701 may also configures the outputs of half-H-bridges A2, B1, C2, D1, E2, and F1 to be high impedance. The brushless motor controller 701 may control the firing sequence of the half-H-bridges A1, B2, C1, D2, E1, and F2 to emulate the three-phase winding of a conventional motor.

Figure 9:
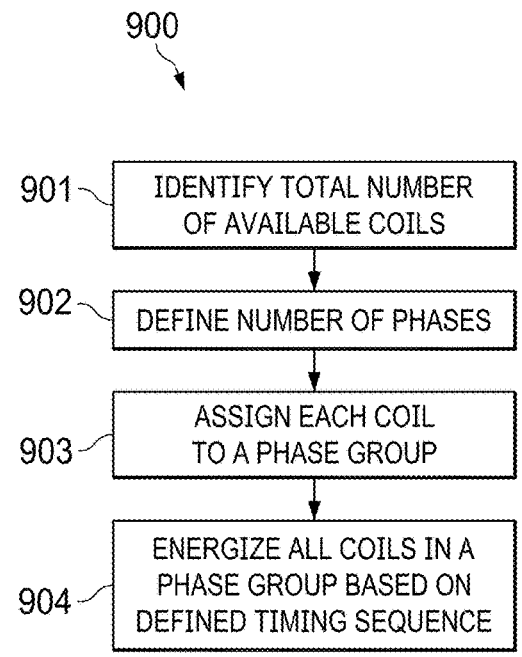
FIG. 9 is a flow chart of a method that may be executed with the brushless motor controller of FIG. 7.

FIG. 9 illustrates one embodiment of a method 900 that may be executed with the brushless motor controller 701. The method 900 uses the ability of the brushless motor controller 701 to separately energize each coil 220 and to group the coils 220 together as desired. Accordingly, in step 1901, the total number of available coils is identified. For purposes of example, there are forty-eight (48) coils. In step 902, the number of desired phases for the current configuration is defined. For example, a six-phase configuration may be desired and therefore defined in step 902, for example as phases A-F. In step 1203, each of the forty-eight coils is assigned to one of the six phase groups A-F. In step 904, all coils in a phase group are energized based on a defined timing sequence. The timing sequence identifies which phase group(s) A-F should be energized at a particular time, with the option to have some or all phase groups simultaneously energized.

An Adaptive Electronic Transmission:

In order to take maximum advantage of various embodiments of the electrical machine 100, a new method of control has also been developed. Although conventional six phase methodologies of supplying power for this machine will work, torque production may be optimized, and torque pulsation may be minimized by using methods described below. Specifically, the software of the brushless motor controller 701 emulates phase firing and changes through the speed range and or by torque demand.

With the electrical machine 100, an adaptive electronic transmission can be used to adjust torque, speed, and loading capabilities. With the ability to continuously adjust the coil firing sequence, firing up to 90% of segments all at once or the adaptive electronic transmission can emulate six-phase, three-phase, two-phase and one-phase windings of conventional motors. In some embodiments, the adaptive electronic transmission can start with twelve or even eighteen-phases, then emulate lower phases.

As previously discussed, in the electrical machine 100, two or more of the coils 220 may fire at the same time. In fact, essentially all coils 220 within the magnetic tunnel segment may fire at the same time. This results in a more output torque compared to conventional brushless electric motor configuration. Therefore, the electrical machine 100 can produce torque values based on the average of five of the six phases that are firing. In other words, the electrical machine 100 may utilize the additive effect of all five coils within the tunnel segment to produce torque. This also results in comparatively smooth acceleration and low torque pulsation.

Figure 10:
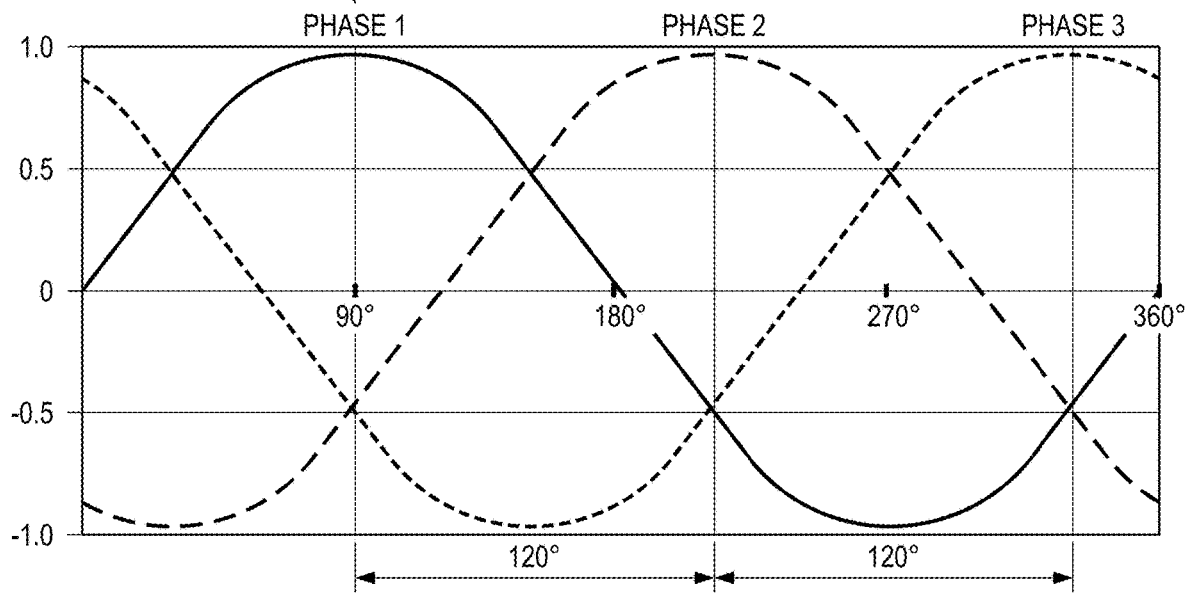
FIG. 10 illustrates a graph of three sinusoidal voltage waveforms as is known in the art.

Turning now to FIG. 10, there is graph illustrating three sinusoidal voltage waveforms as commonly known in the art of a conventional brushless motor configuration. In FIG. 10, the three sinusoidal waveforms are 120 electrical degrees out of phase from each other. As known in the art, this waveform represents a three phase or six phase supply (120 electrical degrees or 60 electrical degrees respectively). As can be inferred from the graph of FIG. 10, at any given instant essentially only one phase is actively providing torque. Differing phase coils cannot be energized concurrently as an optimum rotating magnetic field would not be produced and rotation would cease.

Figure 11A:
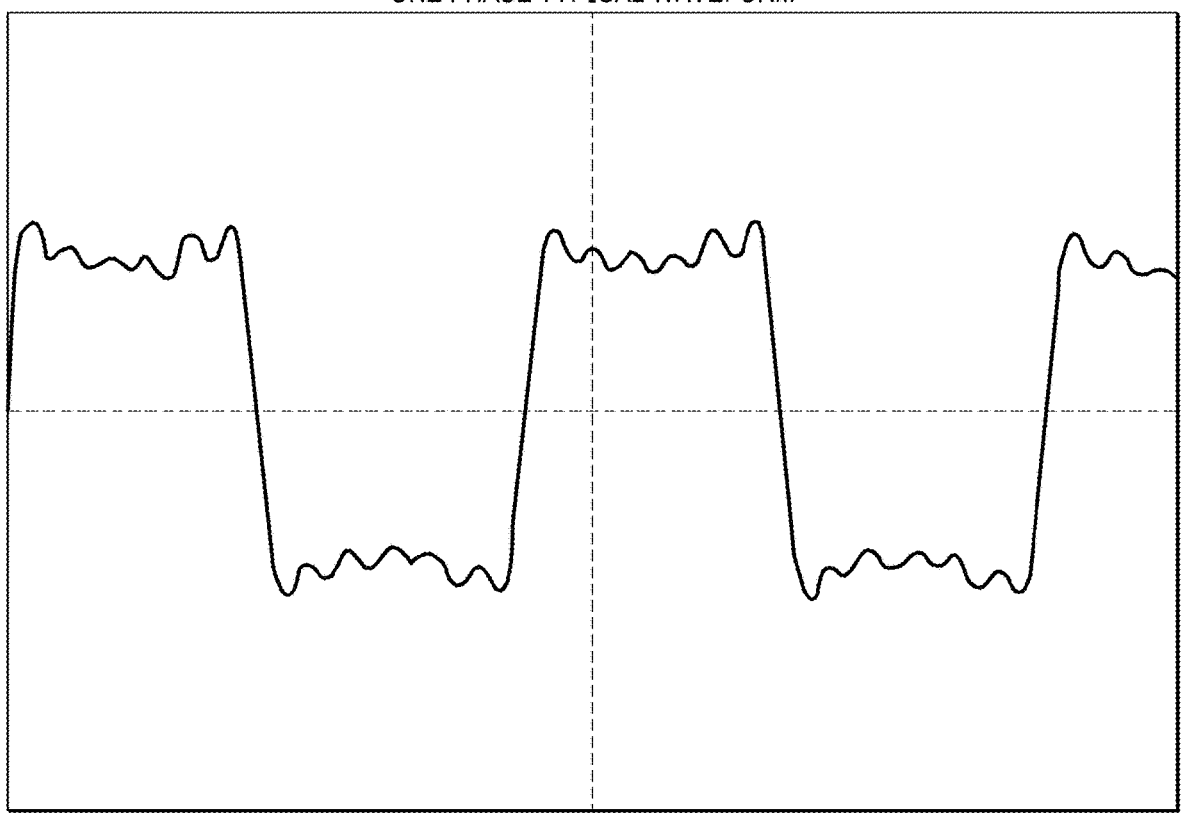
FIG. 11A illustrates a back emf plot of one embodiment of the present invention.

Turning now to FIG. 11A there is a graph illustrating a plot or waveform of the back-emf of a single phase of the electrical machine 100 having a trapezoidal power input. To match the back-emf, every 7.5 degrees a coil/phase enters a 45-degree pole region and is energized for the duration of its travel through the pole region. This is only possible because in this magnetic configuration each coil produces a Lorentz force and a reluctance force that peak simultaneously through the entire 45 degrees of rotation. As there are 8 coils per phase (one for each of the 8 polar regions discussed above) a six-phase supply may provide the greatest torque production and the least torque pulsation.

Figure 11B:
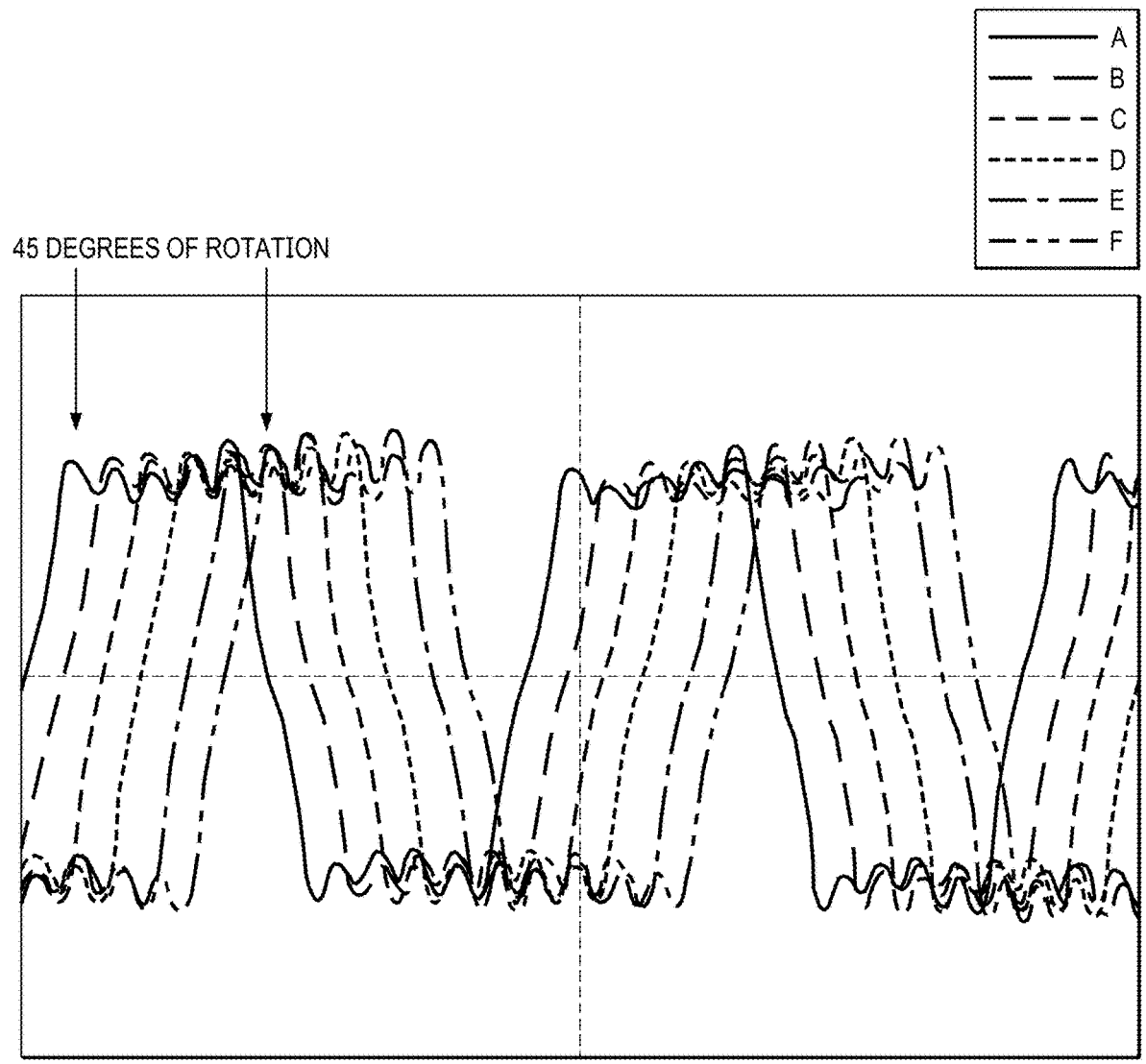
FIG. 11B illustrates a back emf plot of one embodiment of the present invention.

Plots of the back-emf illustrate the trapezoidal nature of the voltage produced for all six phases as illustrated in FIG. 11B. It will be noted that essentially all of the phases are producing torque continuously. This indicates that a high torque and smooth acceleration of the rotor mass is possible when power is input to the phase conductors.

For the brushless electrical machine 100, polarity transition of the coils/phase is only required when a coil is entering the next alternate polarity region. As the timing and polarity of the power inputs may be controlled by an indexed position indicator signal and software it is also possible to change the pole count electronically. The torque produced is an average of the voltage pulses over time. Similarly, the software of the brushless motor controller 701 may also produce an emulated two phase or single-phase grouping of phases.

For instance, to emulate a three-phase motor, software processes in the brushless motor controller 701 can group phase A and B together, group phase C and D together, and group phase E and F together. So, instead of six poles in the motor, the motor acts as if there are three poles. Transitioning from six poles to three poles, acts in part like gear teeth on a manual transmission because as the RPM's get higher, the user shifts to a higher, for example second gear to increase speed. The frequency does not change, but as the pole count transitions from six to three, the rotations per second will increase. With any electric motors, when there is a reduction in pole count and the frequency is kept constant, the speed increases. That is, the poles determine the speed for a given power input.

Then, as the motor continues to accelerate, a transition can occur from the three-phase emulation to a two-phase emulation. For a two-phase emulation, software processes in the brushless motor controller 701 can group the coils A, B, and C to fire at the same time and coils D, E, F, to fire at the same time. Again, this emulation lowers the pole count which results in an increase in speed.

Figure 12A:
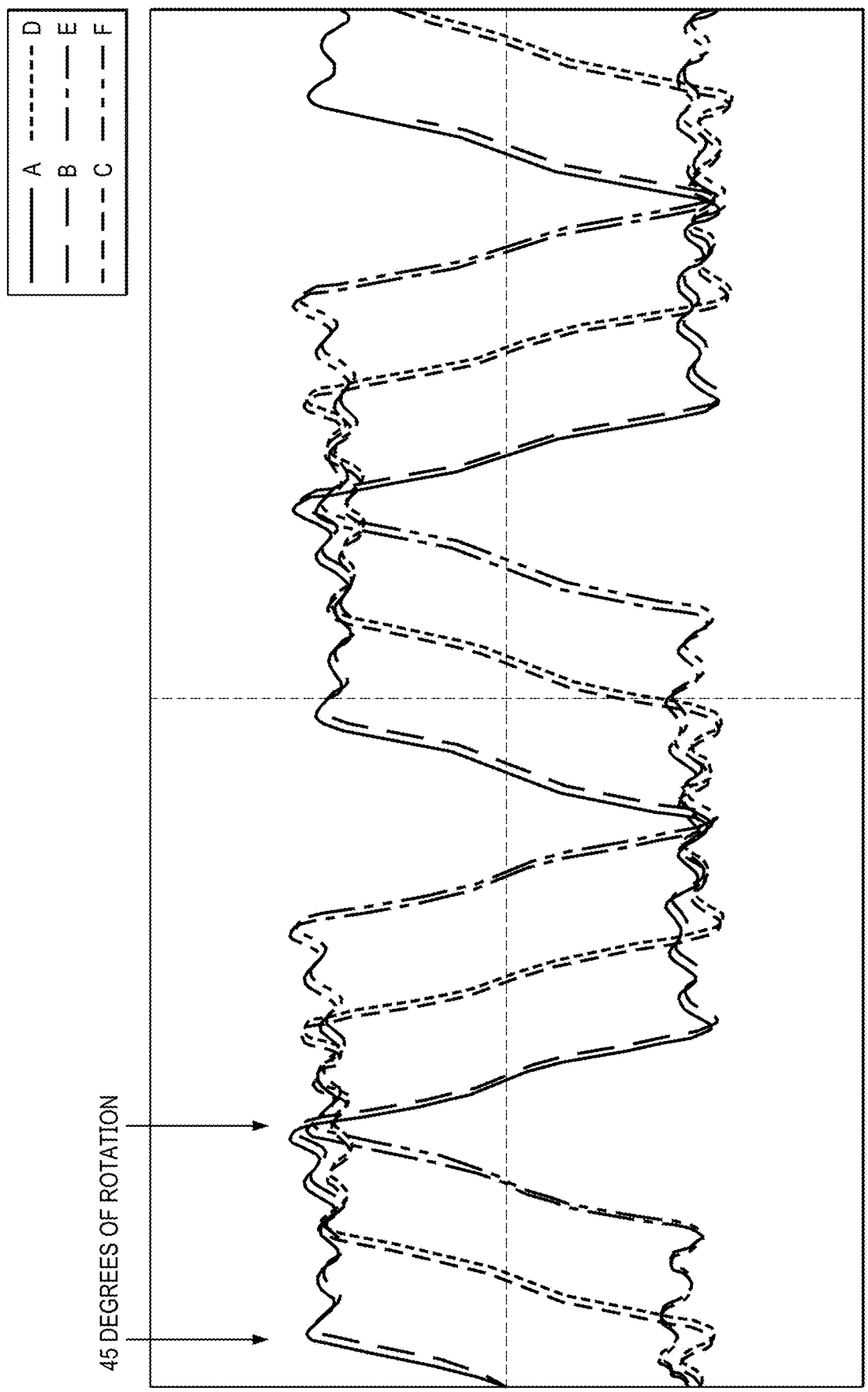
FIGS. 12A and 12B illustrate back emf plots of one embodiment of the present invention.

This method retains all the inherent benefits of the four-rotor circumferential flux technology including continued operation after loss of a phase, emulation of a mechanical gearbox, etc. When a lead position indicator signal is received the coil/phase groupings can be changed to emulate any poly-phase input as desired. For example, if Phase A and Phase B, Phase B and C, and Phases D and E are grouped to energize at the same instant, an emulated lower pole count machine is created. The frequency and timing of polarity changes per revolution can be easily adjusted resulting in an increased rotor speed with no changes to voltage or current inputs. See for instance, the waveforms graphed in FIG. 12A The torque produced is an average of the voltage pulses over time. Similarly, the software of the brushless motor controller 701 may also produce an emulated two phase or single-phase grouping of phases. This method retains all the inherent benefits of the four-rotor circumferential flux technology including continued operation after loss of a phase, emulation of a mechanical gearbox, etc. See for instance, the waveforms graphed in 12B

Figure 12B:
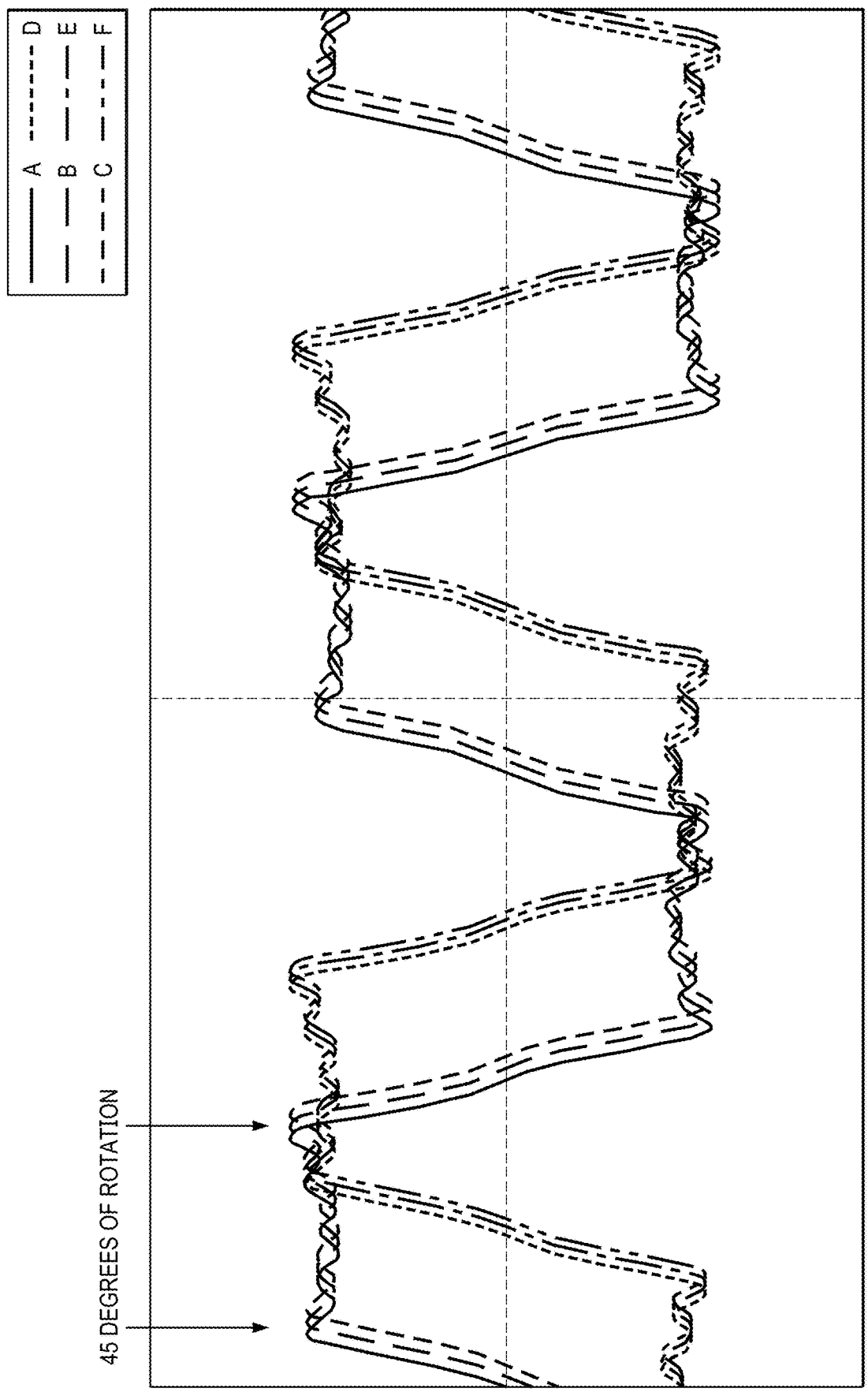
Figure 13:
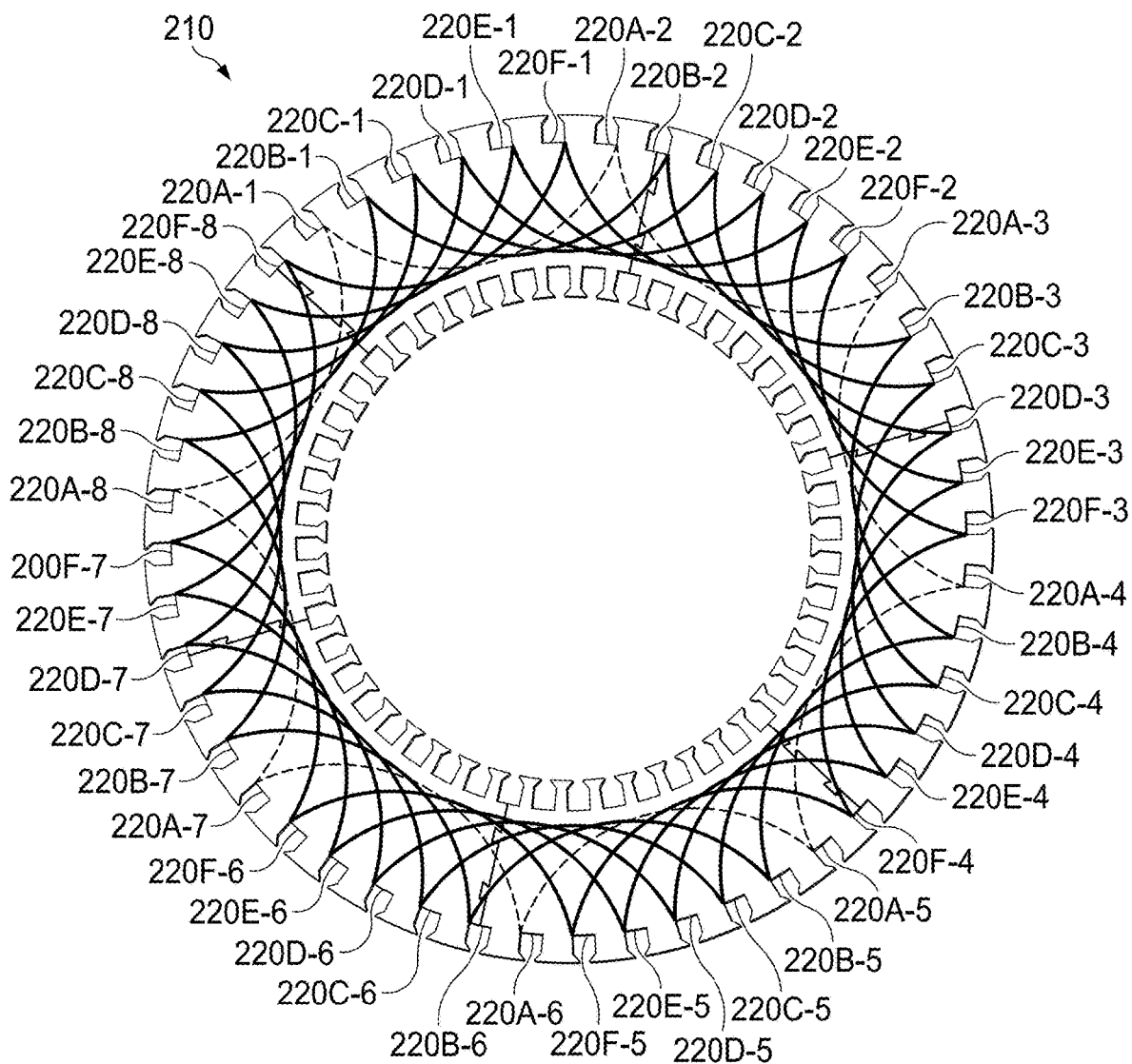
FIG. 13 is one embodiment of a coil assembly illustrating groups of coils in a 6-phase arrangement.

FIG. 13 illustrates one embodiment of the coil assembly 210 with forty-eight (48) individual coils 220 that may be separately energized. Continuing the six-phase coil arrangement of FIGS. 12A and 12B, the coils 220 are divided into six phase groups A-F, with the expectation that all the coils in a phase group will be energized together. In the present example, a particular coil 220 is denoted by its group and a coil number within that group. For example, the first coil in phase A is labeled as 220A-1, the second coil in phase A is labeled as 220A-2, and so on through the last coil of the last group 220E-8. It is understood that this labeling scheme is merely an example and is not intended to be limiting. Furthermore, the labeling of a coil as "first," "second," and so forth is meant for clarity and is not intended to be limiting or to necessarily indicate that there is a particular order within a group.

In some embodiments, to form a six phase winding arrangement using the coil assembly 210 with forty-eight (48) coils 220, the brushless controller 701 may set the eight coils 220A-1 through 220A-8 as phase A coils, the eight coils 220B-1 through 220B-8 as phase B coils, the eight coils 220C-1 through 220C-8 as phase C coils, the eight coils 220D-1 through 220D-8 as phase D coils, the eight coils 220E-1 through 220E-8 as phase E coils, and the eight coils 220E-1 through 220E-8 as phase F coils.

Six-Phase Winding Configuration

While the embodiment of FIG. 13 illustrates the coils 220 of a particular phase group A-F as being distributed evenly around the coil assembly 210 with no adjacent coils being in the same phase group, it is understood that the groupings may be defined differently. For example, in an alternate embodiment (not shown), to form a six phase winding arrangement using the same coil assembly 210 with forty-eight (48) coils 220, the brushless motor controller 701 may set two adjacent coils as phase A coils, the next two adjacent coils as phase B coils, the next two adjacent coils as phase C coils, the next two adjacent coils as phase D coils, the next two adjacent coils as phase E coils, and the next two adjacent coils as phase F coils. This six-phase configuration would then repeat for all individual coils 220 within the coil assembly 210. Accordingly, with the forty-eight coils 220 would be arranged with four (4) pairs of adjacent phase A coils, four (4) pairs of adjacent phase B coils, four (4) pairs of adjacent phase C coils, four (4) pairs of adjacent phase D coils, four (4) pairs of adjacent phase E coils, and four (4) pairs of adjacent phase F coils.

As discussed above, with the brushless electrical machine 100, an adaptive electronic transmission can be used for adjustable torque, speed, and loading capabilities. With the ability to continuously adjust the coil firing sequence, firing up to 90% of segments all at once or the electronic transmission can emulate 6-phase, 3-phase, 2-phase and 1-phase windings of conventional motors.

Six-Phase Winding Coil Firing Sequence

Figure 14A:
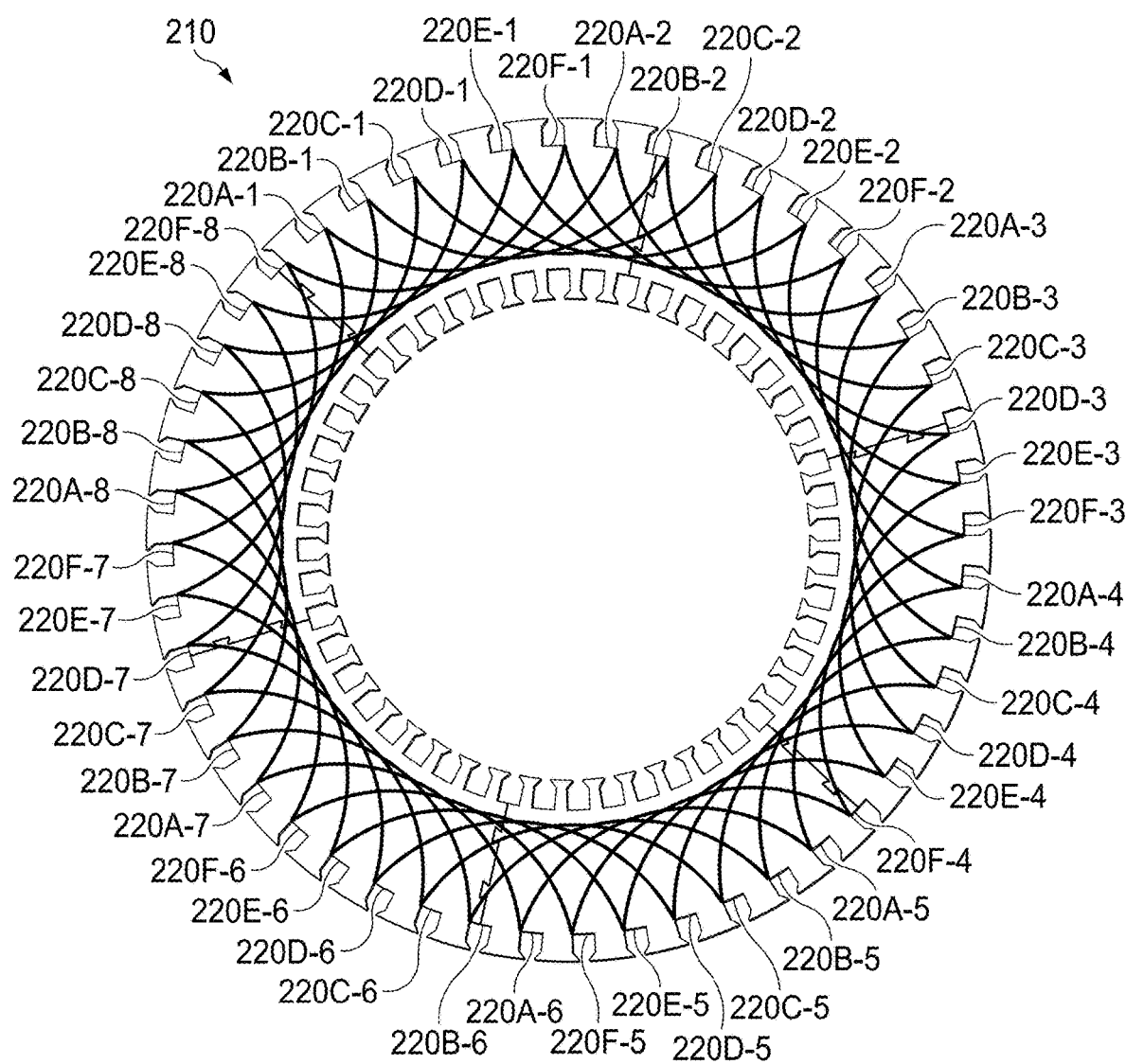
FIGS. 14A through 14L illustrate a coil firing and tunnel segment rotation sequence over time of a six-phase "winding" configuration illustrating one embodiment of the present invention.
Figure 14B:
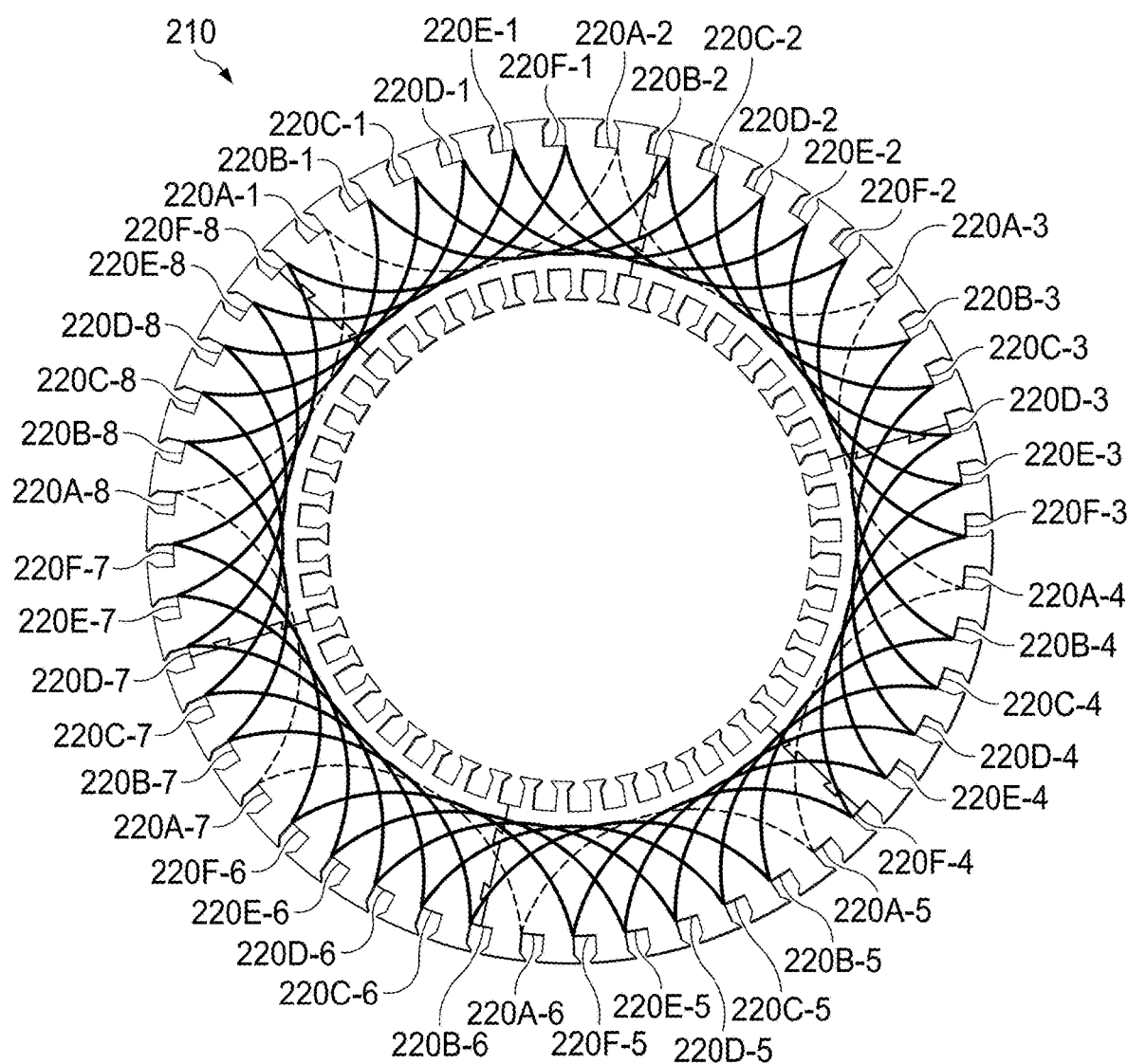
Figure 14C:
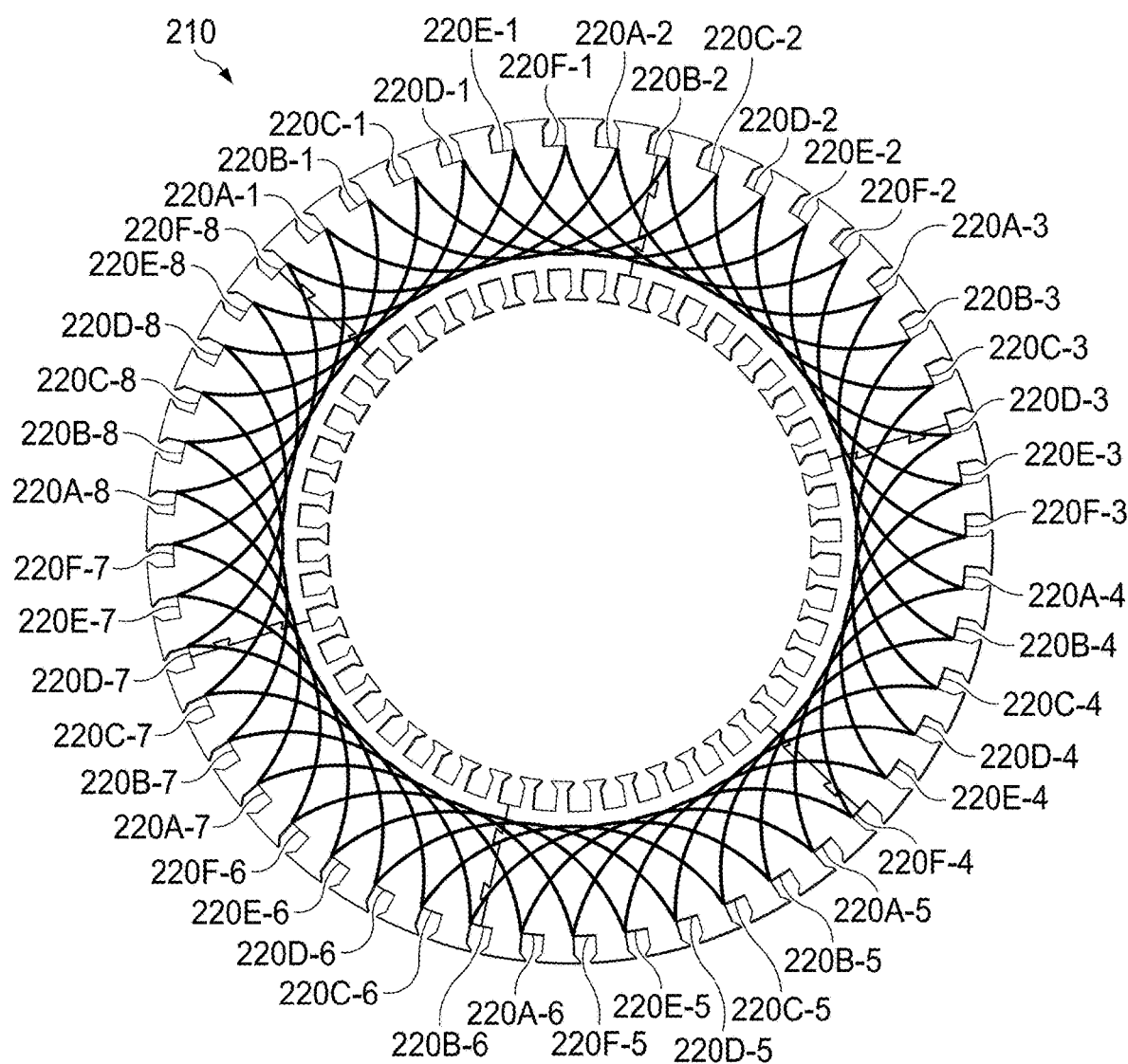

Continuing with the embodiment of FIG. 13, FIGS. 14A through 14L illustrate a coil firing and tunnel segment rotation sequence over time emulating a six phase "winding" configuration illustrating one embodiment of the present invention. (FIGS. 14A, 14C, 14E, 14G18-7, 14I, and 14AK are identical, that is none of the coils in the windings are being energized.) Note, the "off" coils are rotating. In FIG. 14B, the 8 coils in the first phase are firing, for example the eight coils in winding A are energized, and the coils of the other five phases are not being energized. In FIG. 14B, four coils of winding A may be within the four evenly spaced magnetic tunnel segments 400 having a NNNN magnetic pole configuration, as illustrated in FIG. 7D, and four coils of the winding A may be within the four evenly spaced magnetic tunnel segments having a SSSS magnetic pole configuration, as illustrated in FIG. 7D. The eight coils in winding A may be configured, such that, the current flow in the 4 energized coils in the magnetic segment 410 having a NNNN configuration and the current flow in the 4 energized coils in the magnetic segment 410 having a SSSS configuration, generated magnetic forces that are in the same direction as the coil rotates from one adjacent magnetic segment to the other.

Figure 14D:
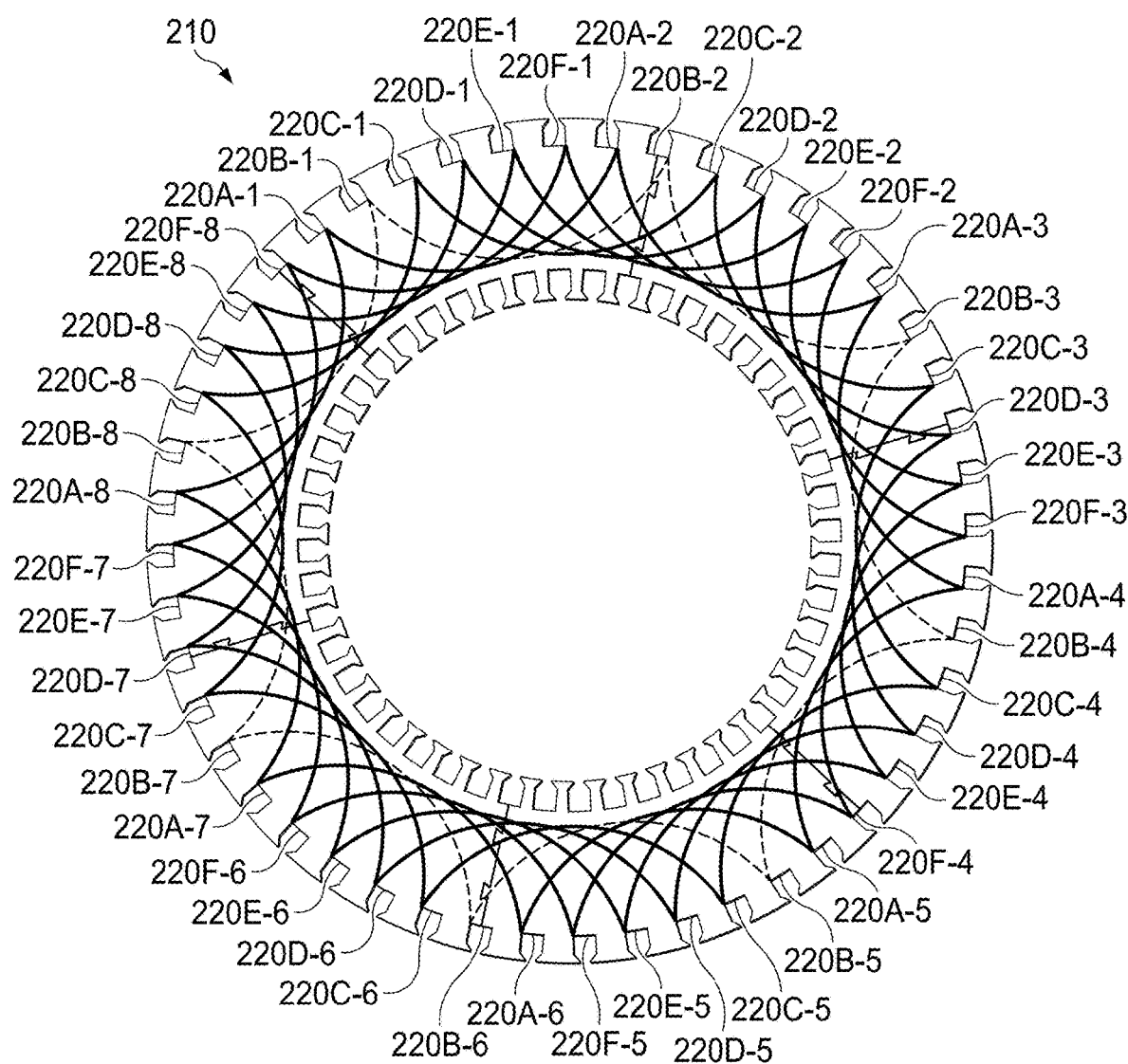
Figure 14E:
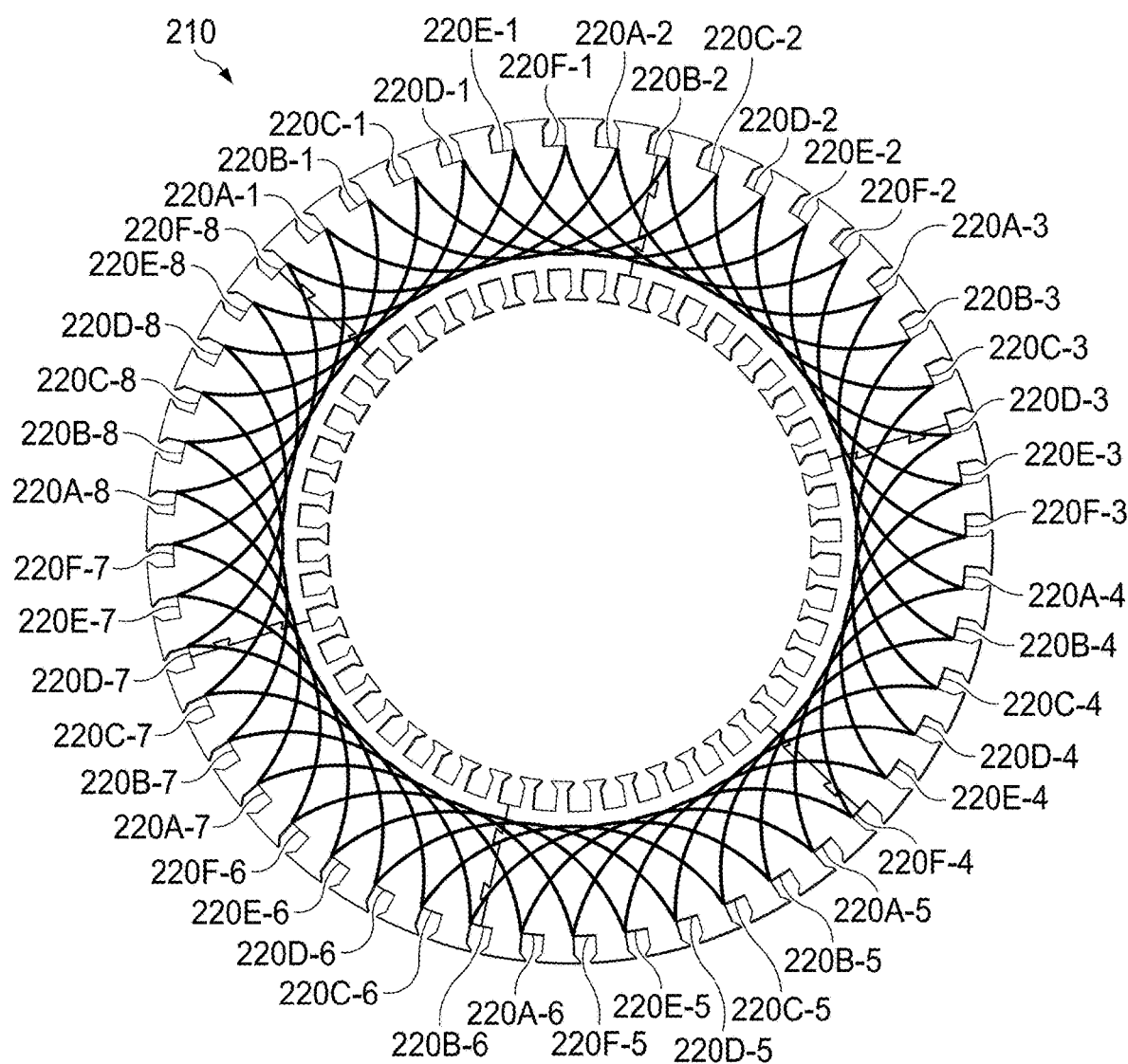
Figure 14F:
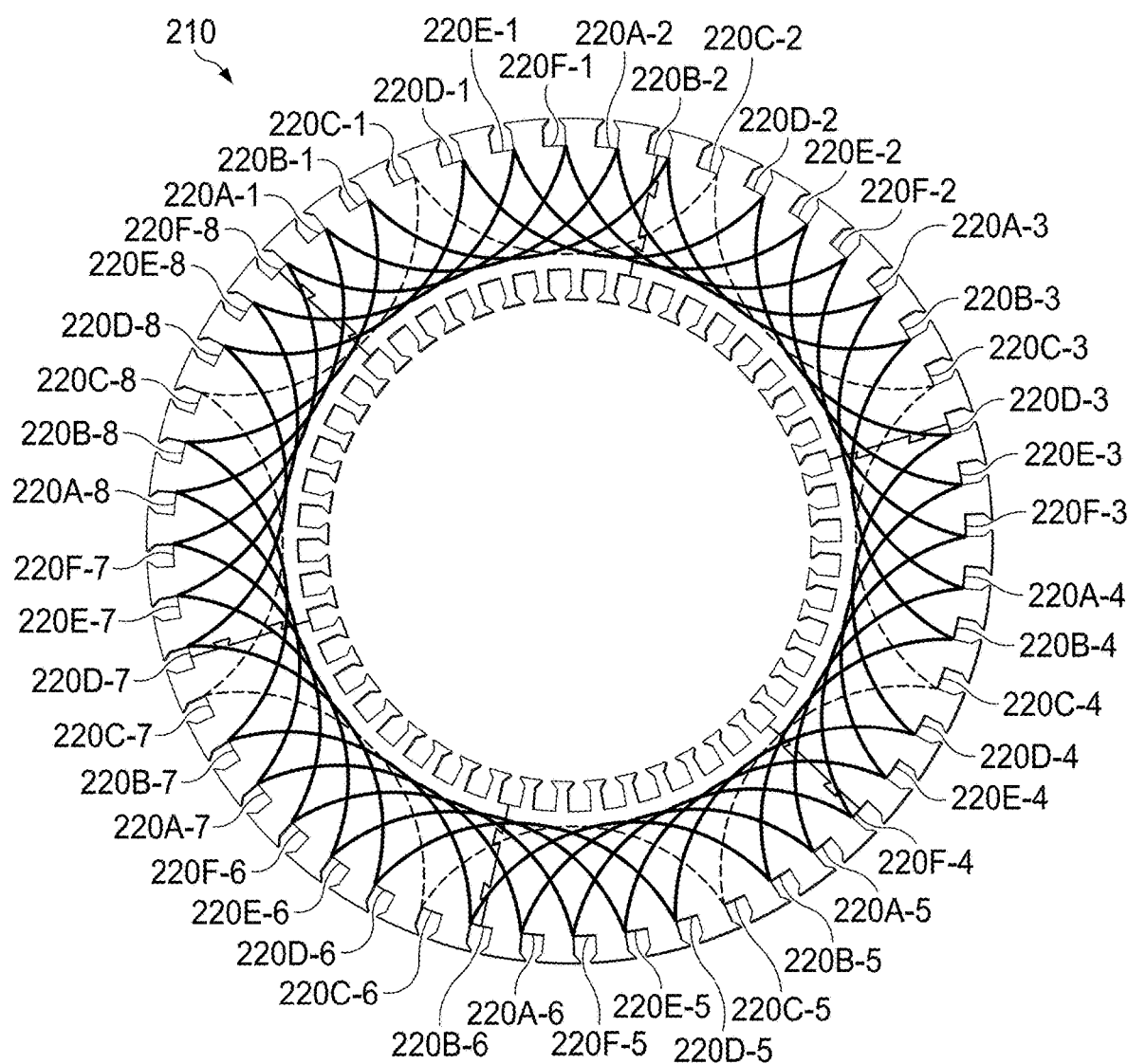
Figure 14G:
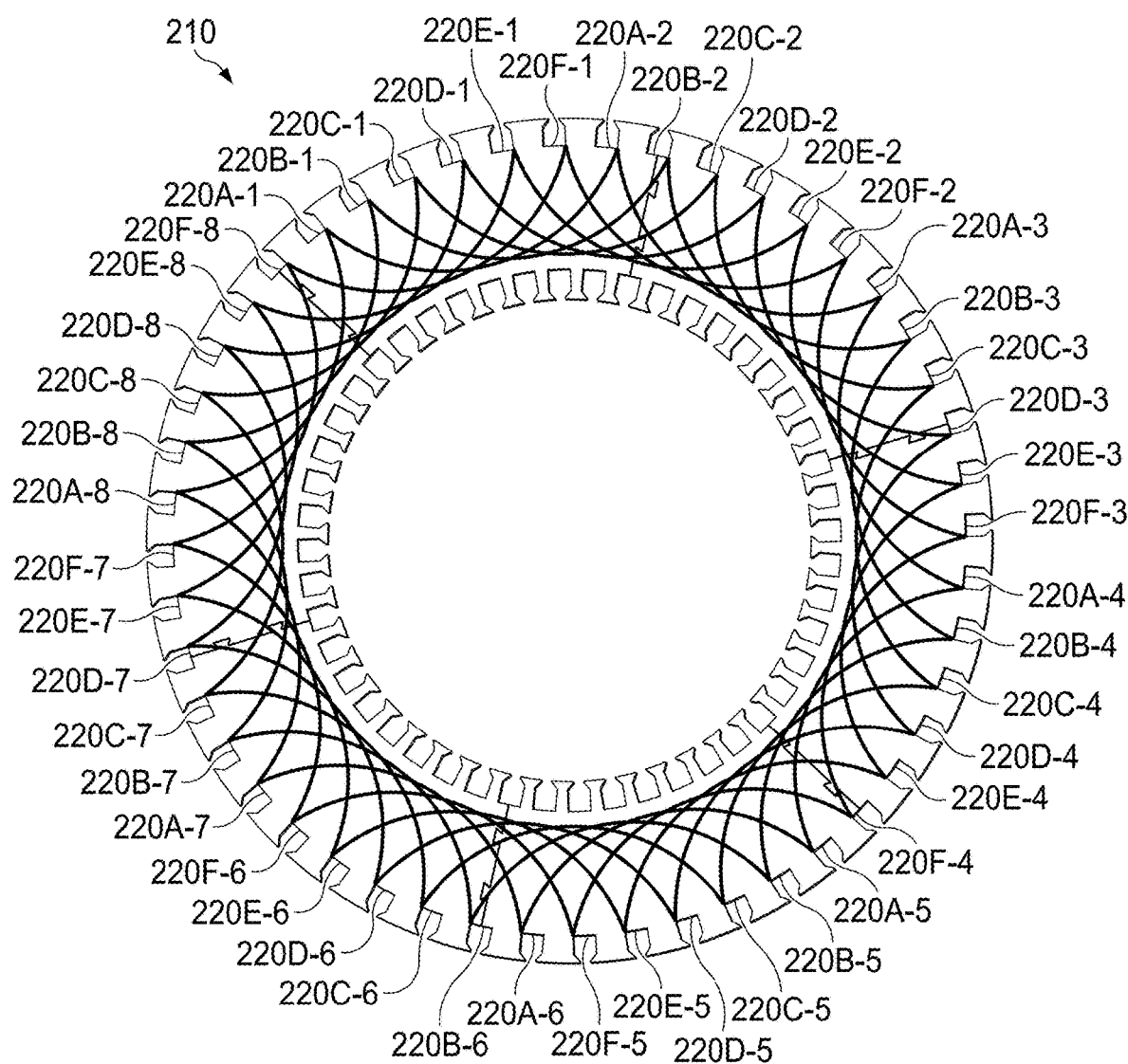
Figure 14H:
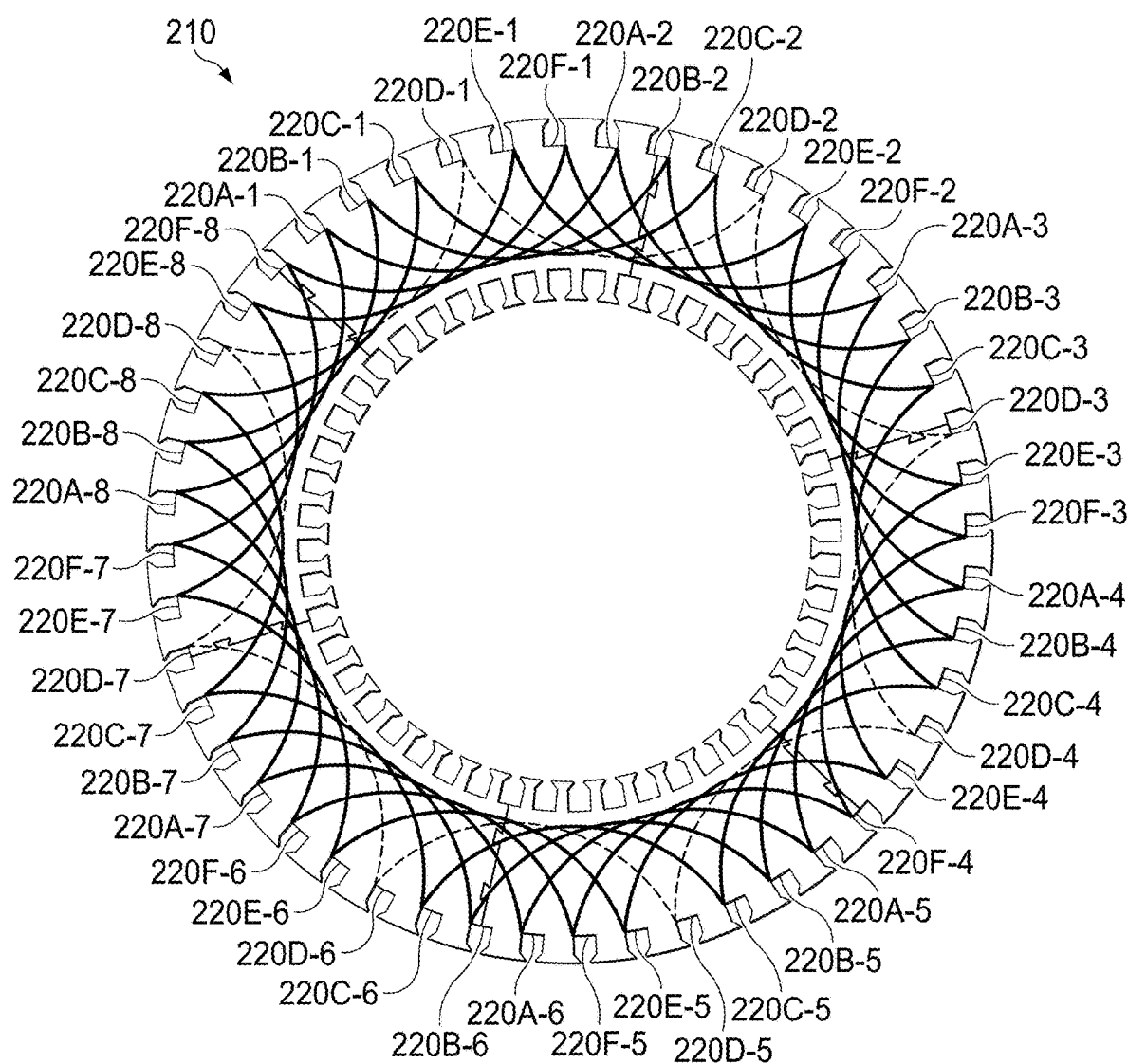
Figure 14I:
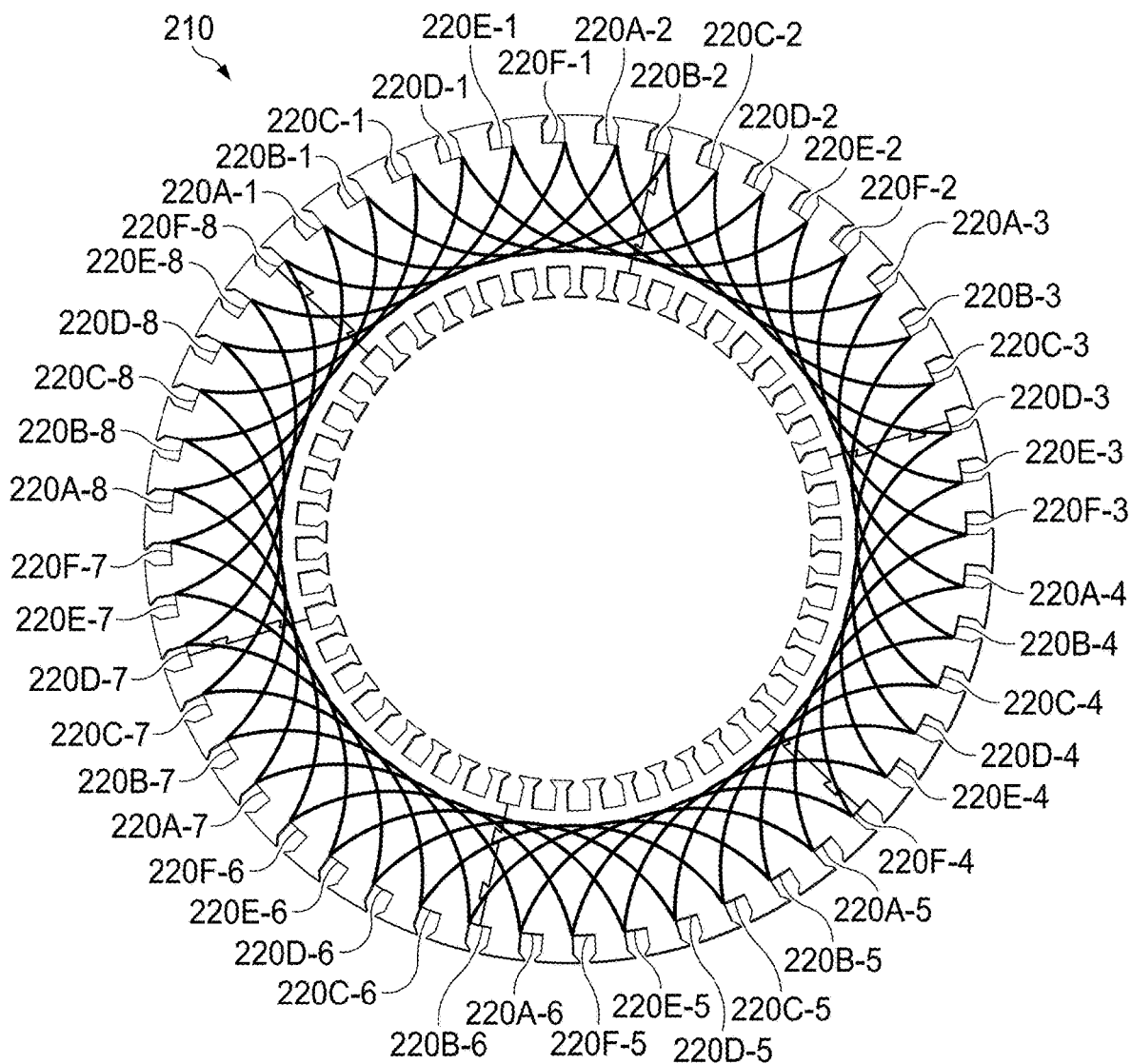
Figure 14J:
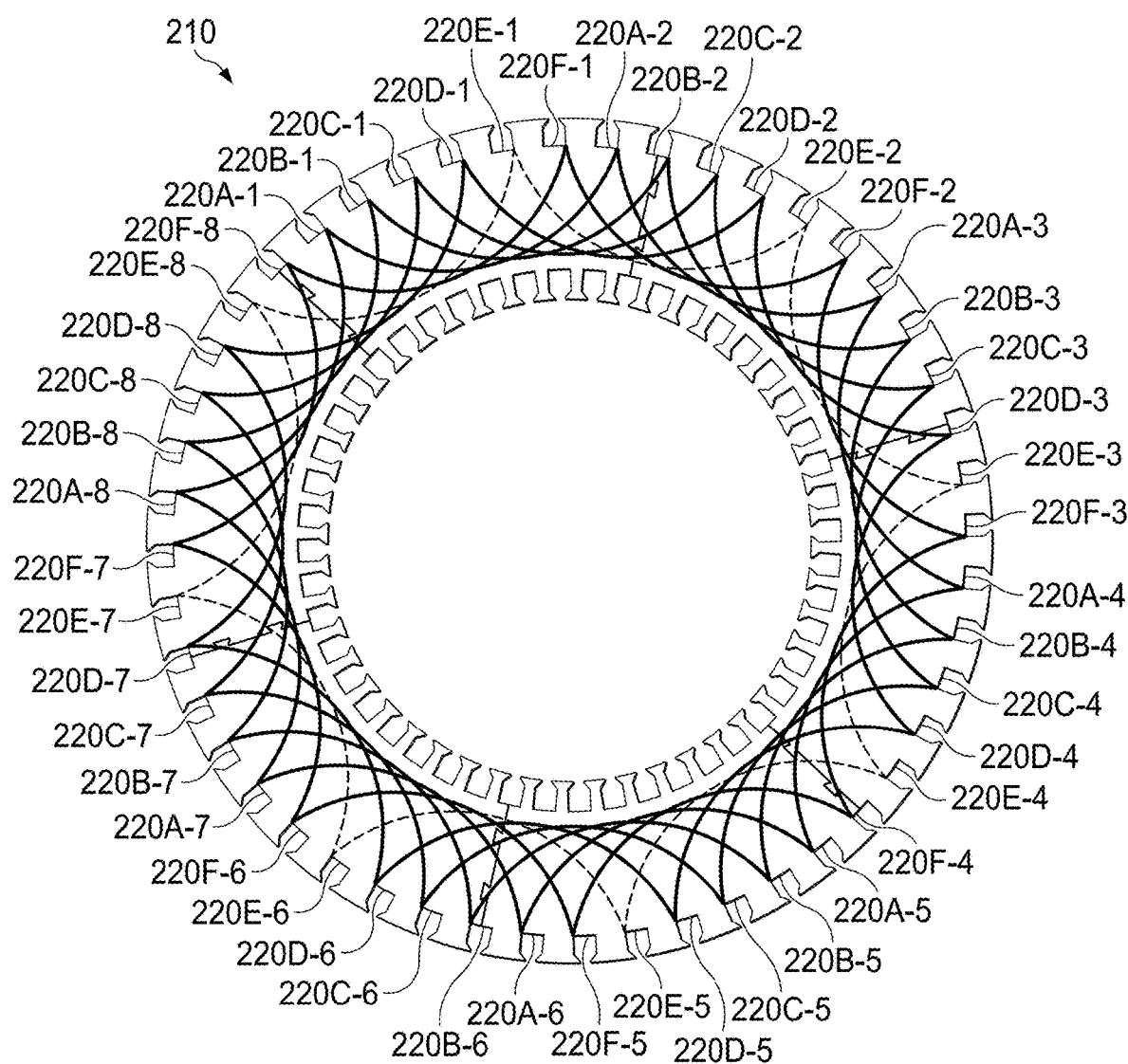
Figure 14K:
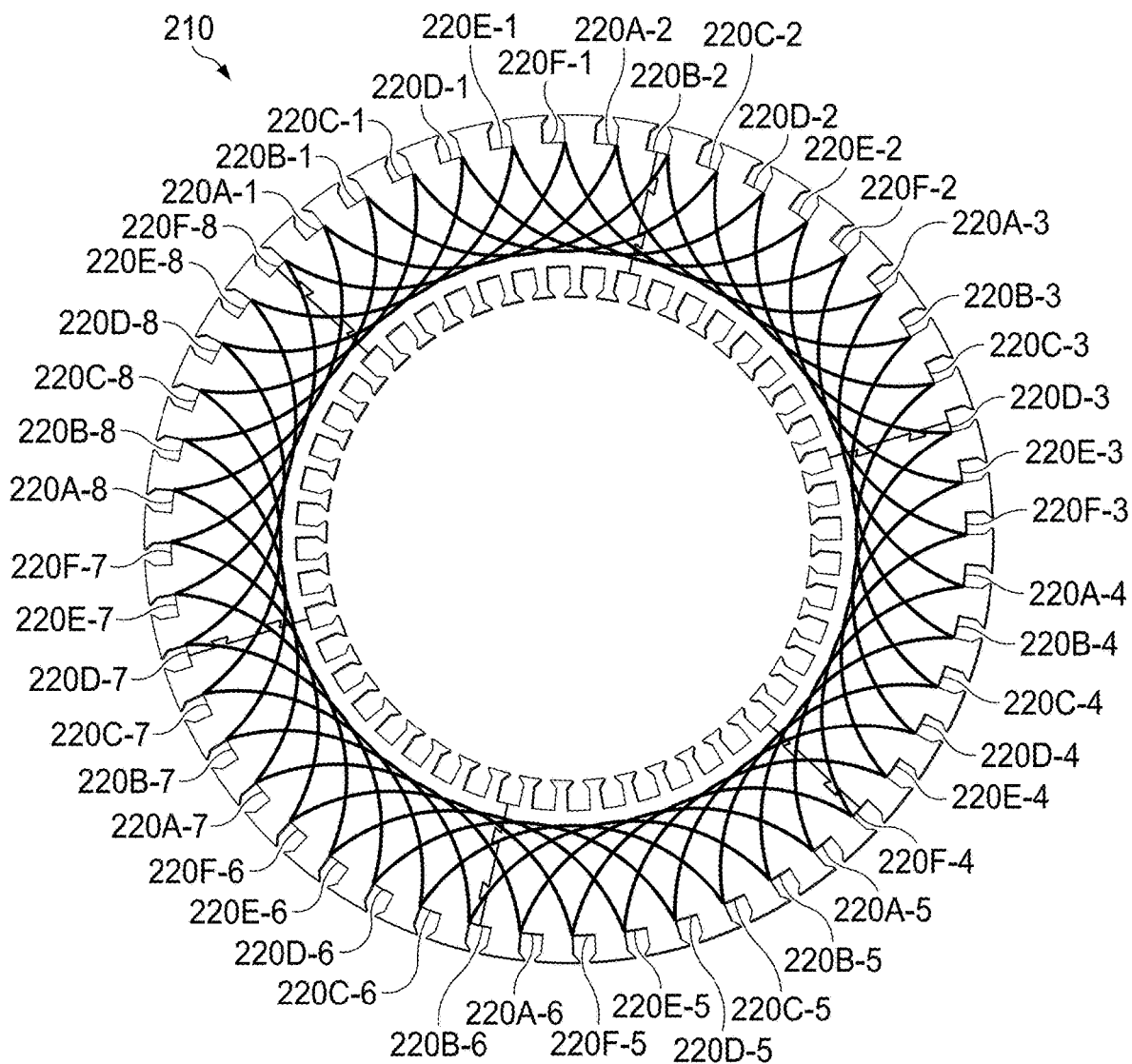
Figure 14L:
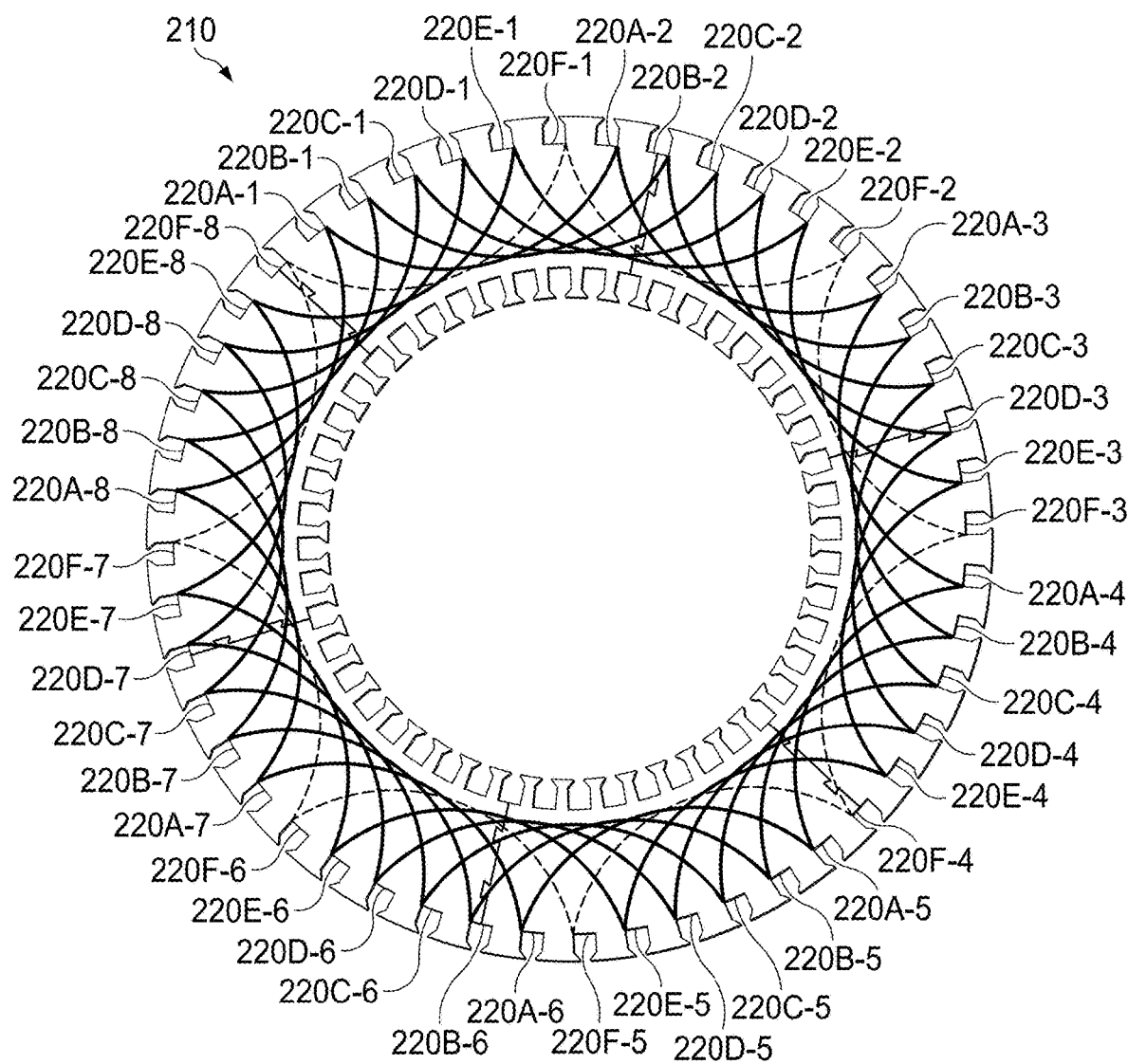

In FIG. 14D, the 8 coils in the second phase are firing, for example the eight coils in winding B are energized, and the coils of the other five phases are off. In FIG. 14F, the 8 coils in the third phase are firing, that is the eight coils in winding C are energized, and the coils in the other five phases are off. In FIG. 14H, the 8 coils in the fourth phase are firing, that is the eight coils in phase D are energized, and the other five phases are off. In FIG. 14J, the 8 coils in the fifth phase are firing, that is the eight coils in phase E are energized, and the coils in other five phases are off. In FIG. 14L, the 8 coils in the sixth phase are firing, that is the eight coils in phase F are energized, and the other five phases are off. When the individual coils of the same winding rotate into an adjacent magnetic tunnel segment with the opposite pole configuration, the brushless motor controller 701 causes the current within the individual coils to flow in the opposite direction.

At some point, as discussed above, there may be need a need to increase the brushless electrical machine 100 speed while reducing the torque produced. For instance, the brushless electrical machine 100 may accelerate to the point where the coil switching mechanism can no longer keep up with the acceleration. In conventional electronic motors, this would be the rotational limit of the motor because the switching mechanism can only switch so fast. However, by using the embodiments of the electronic transmission disclosed herein, the coils can be grouped together, thereby decreasing the number of current switching required per cycle. Thus, the motor can keep accelerating—similar to conventional motor with a manual transmission. When the coils are grouped together, the torque produced by each coil does not change, but the period of time the coil is "on" decreases—which means that average torque drops. So, as the speed of the brushless electrical machine 100 increases, the average torque will drop.

In certain embodiments, an encoder attached to the shaft may provide a control signal to the brushless motor controller 701 so that the brushless motor controller 701 knows when to shift or group the coils together, based on motor speed or a variety of other factors.

Three-Phase Winding

Figure 15:
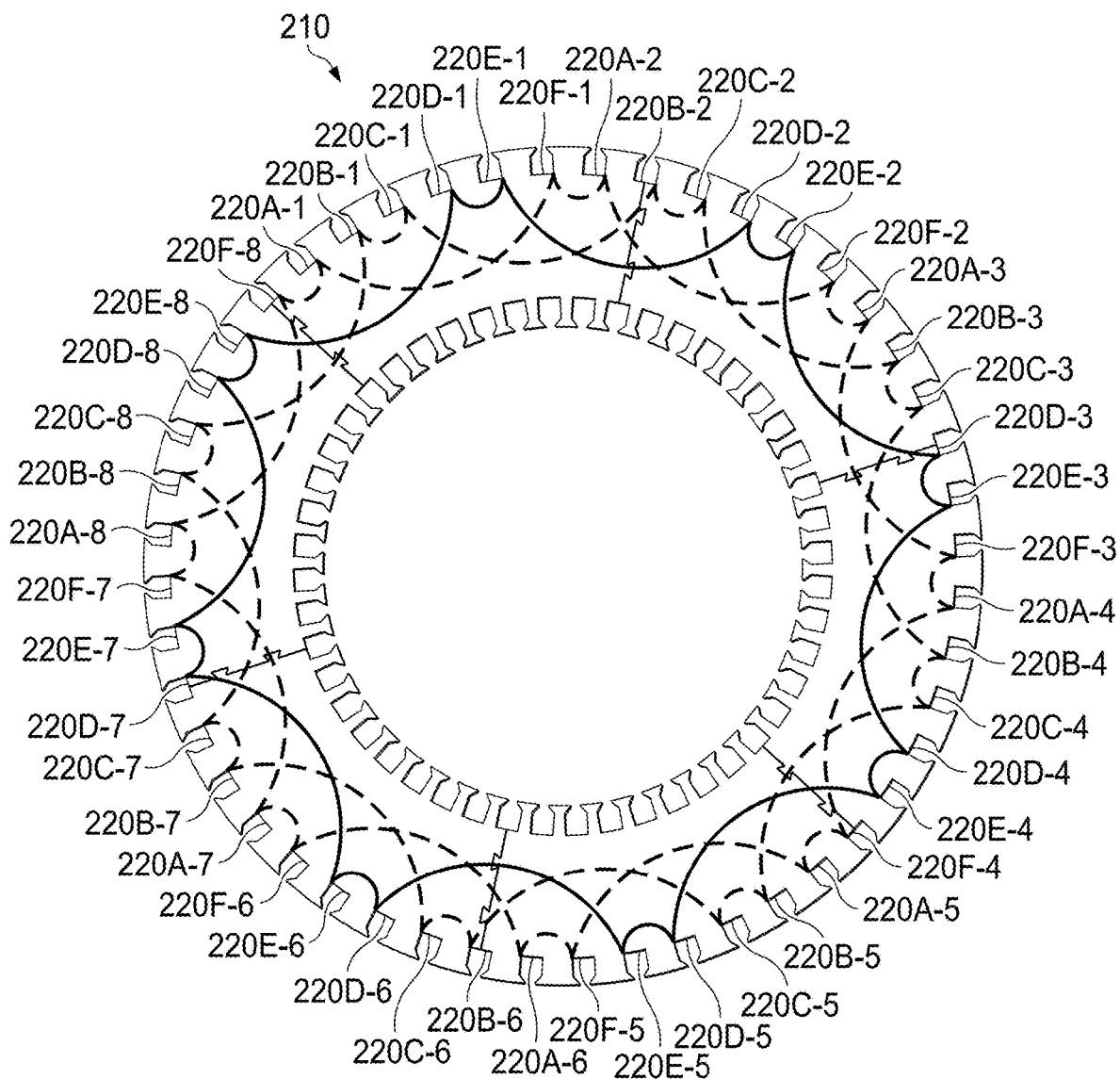
FIG. 15 is one embodiment of a coil assembly illustrating groups of coils in a three-phase arrangement.

FIG. 15 illustrates one embodiment of the coil assembly 210 with forty-eight (48) individual coils 220 that may be separately energized. Continuing the example of FIG. 14A-14L, the coils 220 are divided into six phase groups 220A-220F, with the coils in a phase group being energized together.

In the present embodiment of FIG. 15, the brushless motor controller 701 joins groups together. This means that individual coils do not need to be reassigned to new groups. For example, using the forty-eight coils assigned to phases A-F as described above, the groups may be paired as follows: phases A and B are paired, phases C and D are paired, and phases E and F are paired. The coils in each paired group are then energized together. This effectively reduces the number of phases from six to three without requiring reassignment of individual coils 220 to new groups by the brushless motor controller 701.

It is understood that the pairings need not be sequential as shown. For example, phases A and D may be paired, phases B and E may be paired, and phases C and F may be paired. Furthermore, there are multiple ways to achieve this rearrangement rather than pairing existing phase groups. For example, in another embodiment (not shown), the brushless motor controller 701 may define three new phase groups A-C and then assign each coil 220 to one of the three groups.

While the embodiment of FIG. 15 illustrates the coils 220 of a particular phase group A-F as being distributed evenly around the coil assembly 210 with no adjacent coils being in the same phase group, it is understood that the groupings may be defined differently. For example, in an alternate embodiment (not shown), to form a three phase winding arrangement using the same coil assembly 210 with forty-eight (48) coils 220, the brushless motor controller 701 may set two adjacent coils as phase A coils, the next two adjacent coils as phase B coils, and the next two adjacent coils as phase C coils. This three-phase configuration would then repeat for all individual coils 220 within the coil assembly 210. Accordingly, with the forty-eight coils in the present embodiment, there will be eight (8) pairs of adjacent phase A coils, eight (8) pairs of adjacent phase B coils, and eight (8) pairs of adjacent phase C coils.

Three-Phase Winding Coil Firing Sequence

Figure 16A:
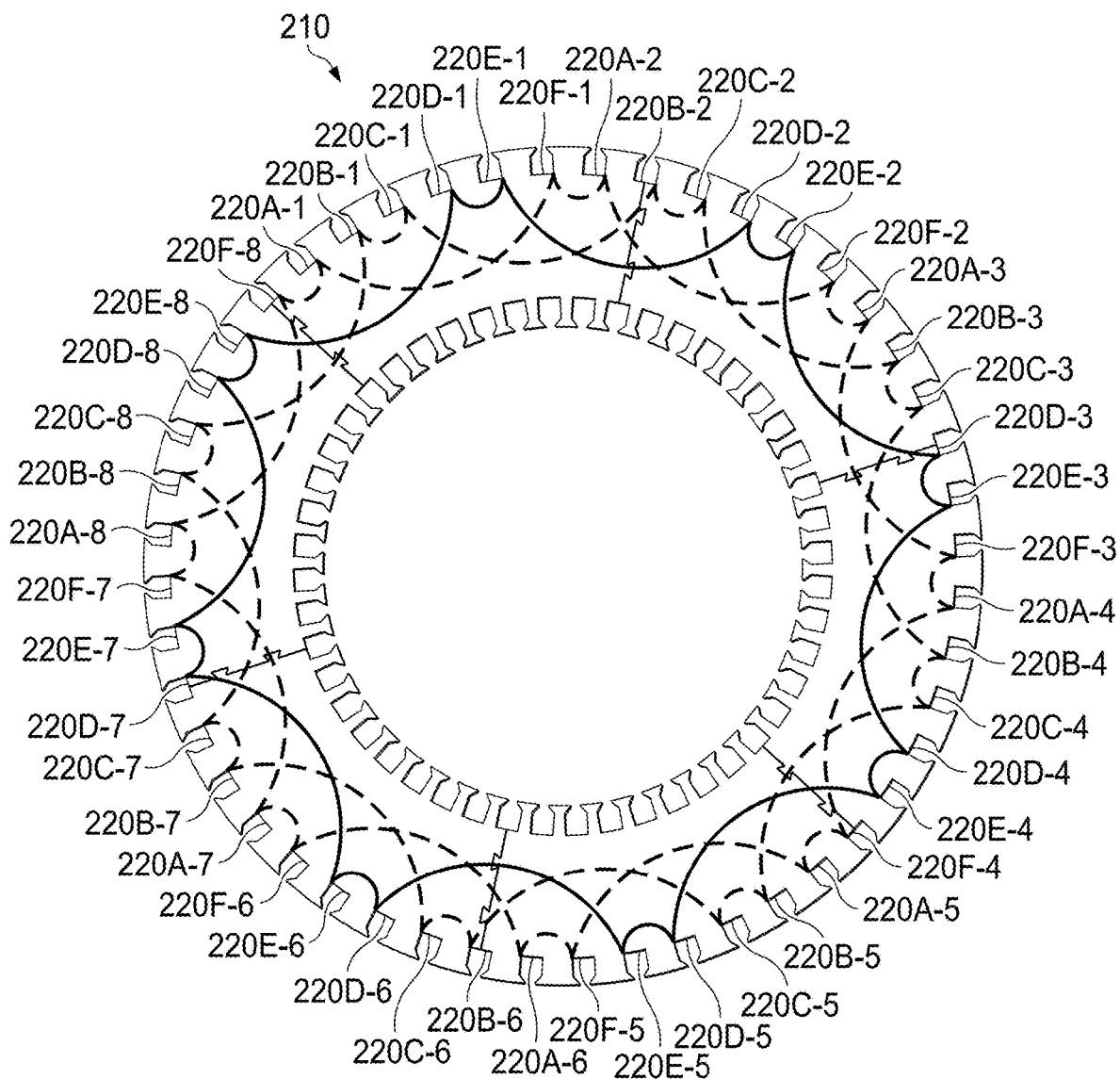
FIGS. 16A through 16F illustrate a coil firing and tunnel segment rotation sequence over time of a three-phase "winding" configuration illustrating one embodiment of the present invention.
Figure 16B:
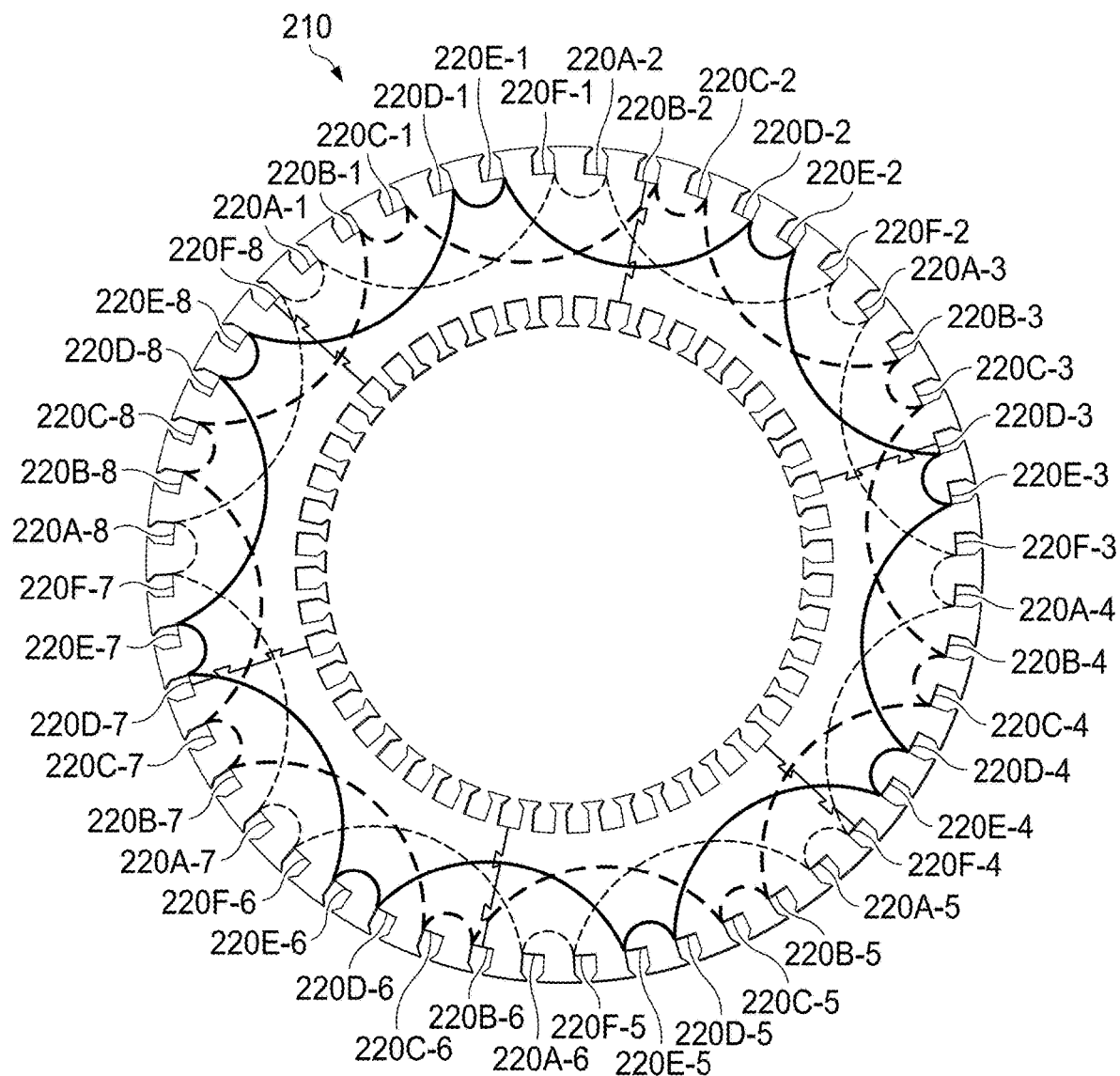
Figure 16C:
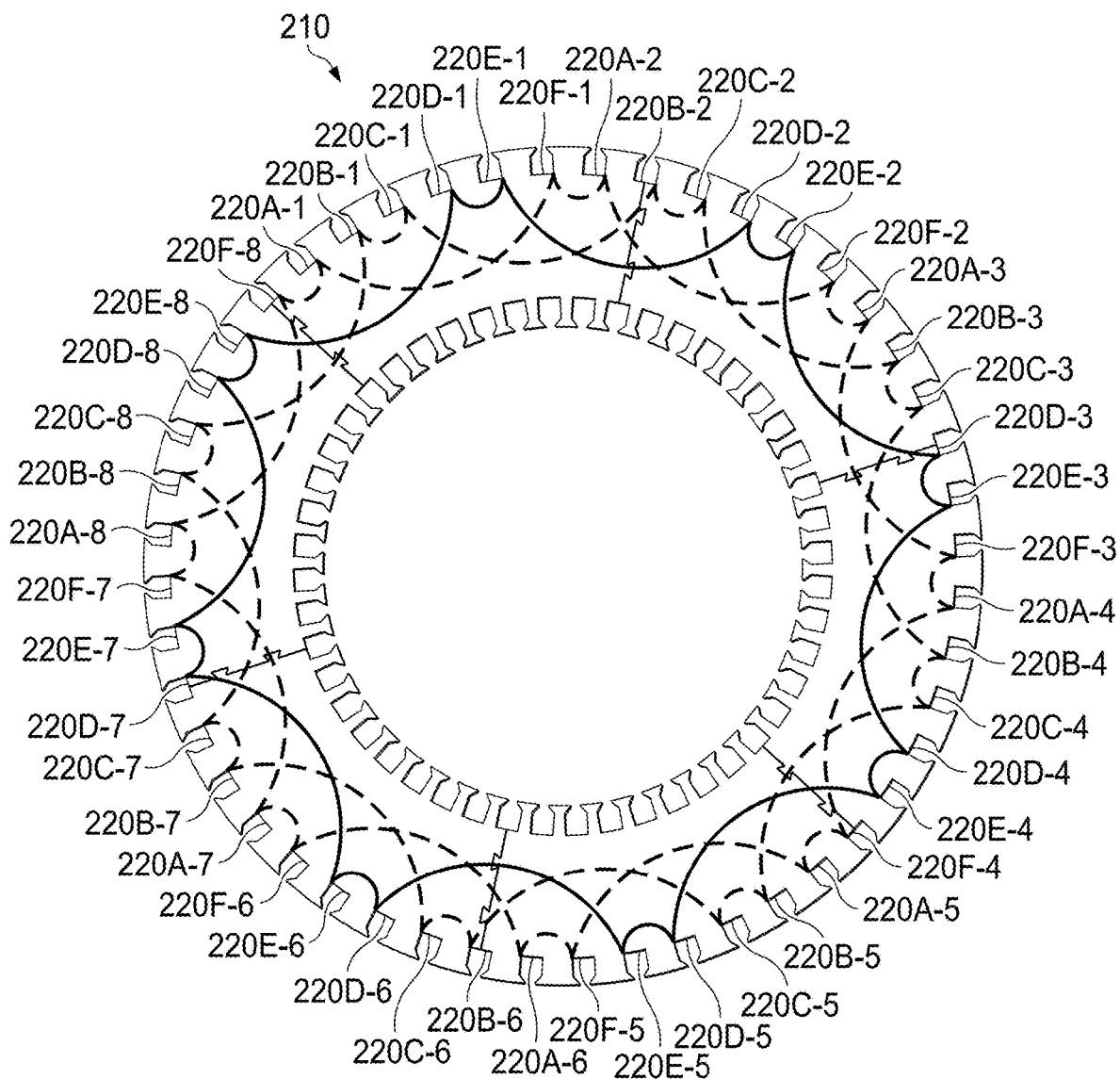
Figure 16D:
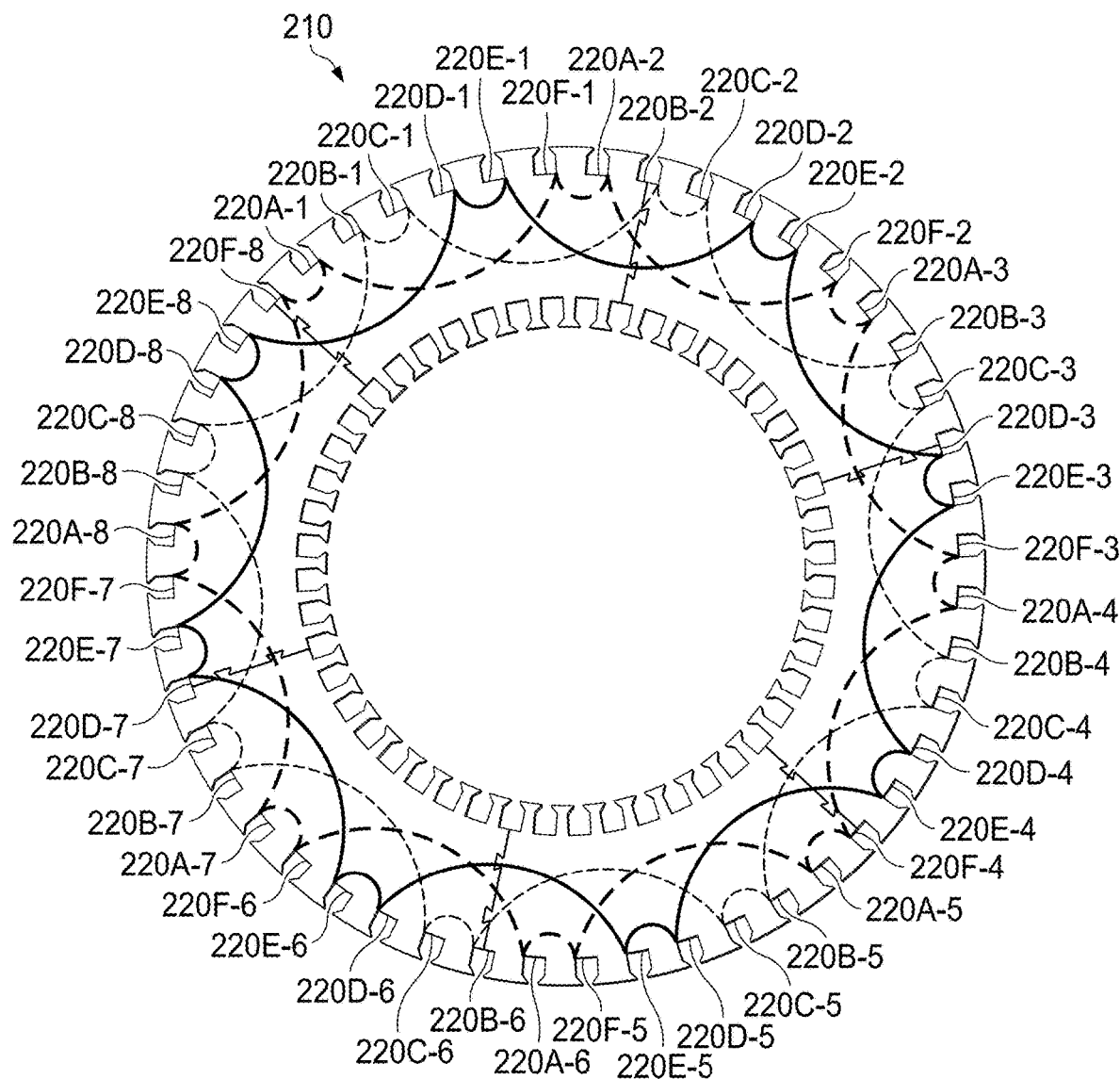
Figure 16E:
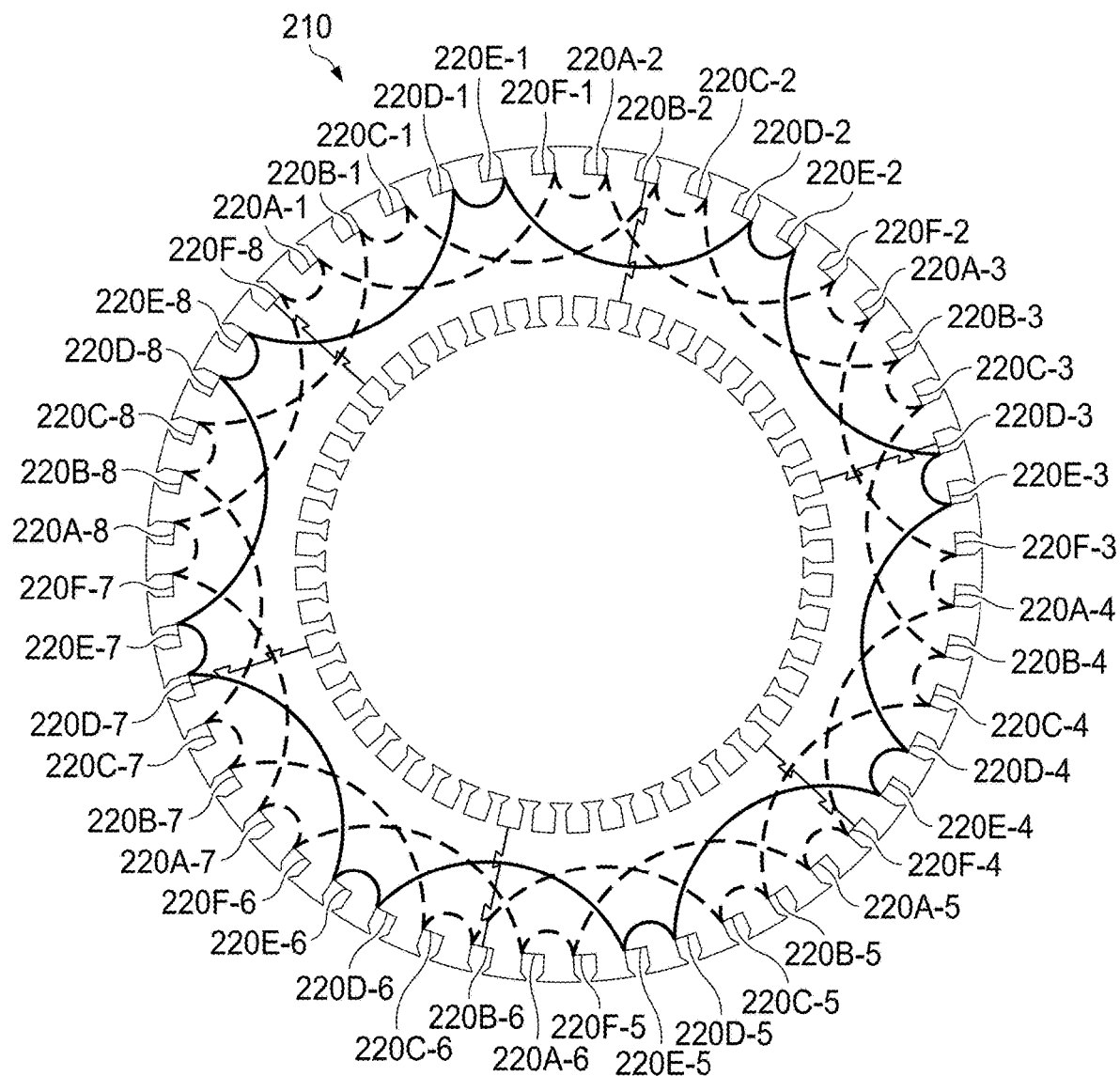
Figure 16F:
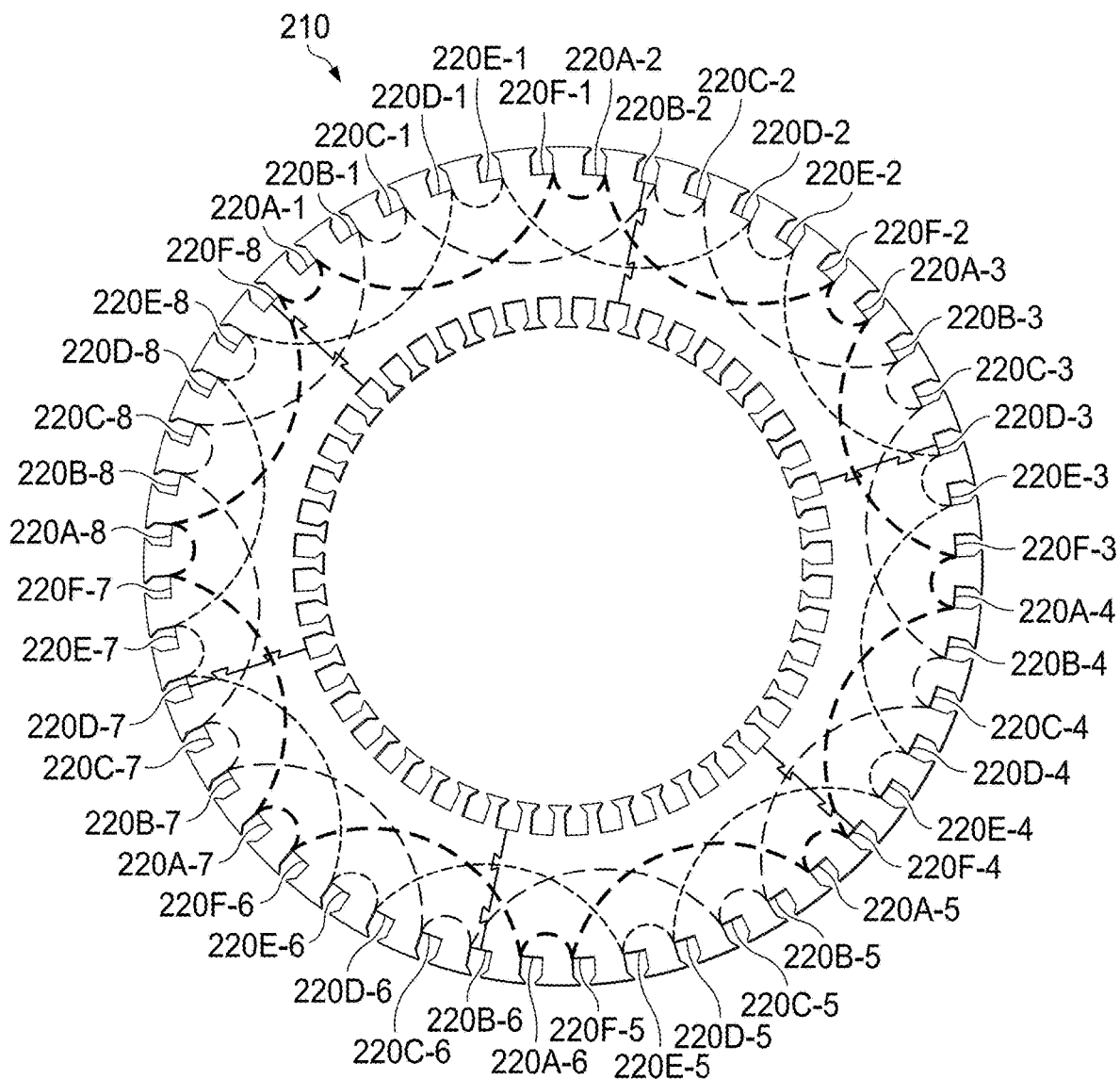

FIGS. 16A through 16E illustrate a coil firing and tunnel segment rotation sequence over time emulating a three phase "winding" configuration illustrating another embodiment of the present invention. (FIGS. 16A, 16C, and 16E are identical, that is none of the in the windings are being energized.) Note, the "off" coils are rotating. In this embodiment, the coils of the 6 individual winding will be energized in pairs. In FIG. 16B, the 16 coils in the first phase are firing, for example the eight coils in winding A are energized and the eight coils in winding B are energized, and the coils of the other four windings are off. That is, the coils in the other four windings are not being energized. In FIG. 16D, the 16 coils in the second phase are firing, for example the eight coils in winding C are energized and the eight coils in winding D are energized, and the other two four winding are off. That is, the coils in the other four windings are not being energized. In FIG. 16F, the 16 coils in the third phase are firing, for example the eight coils in winding E are energized and the eight coils in winding F are energized, and the other two windings are off. Therefore, in this embodiment, windings A and B fire together, windings C and D fire together, and windings E and F fire together so that the electronic transmission of the brushless electrical machine essentially emulates the 3 phase windings of a conventional motor.

At some point, there may be a further need to increase the brushless electrical machine 100 speed while reducing the torque produced. For instance, the brushless electrical machine 100 may accelerate to the point where the coil switching mechanism can no longer keep up with the acceleration of the emulated 3 phase winding of a conventional motor. By using the embodiments of the electronic transmission disclosed herein, the coils can be grouped together to further decrease the number of current switching required per cycle. Thus, the brushless electrical machine 100 can keep accelerating.

Two-Phase Winding

Figure 17:
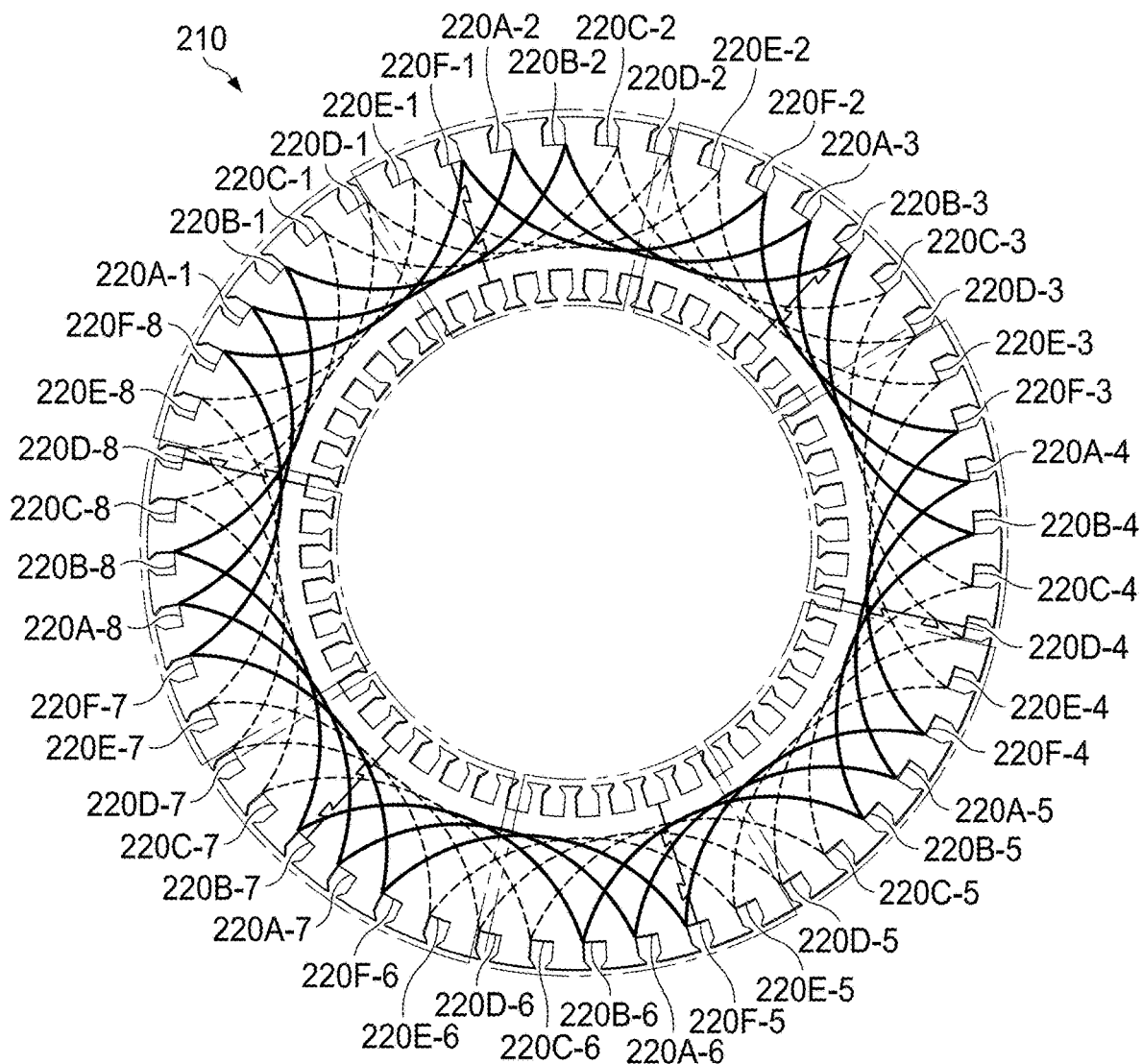
FIG. 17 is a diagram of another coil assembly.

FIG. 17 illustrates another embodiment of the coil assembly 210 with forty-eight (48) individual coils 220 that may be separately energized. Continuing the example of FIG. 13, the coils 220 are divided into six phase groups 220A-220F, with the coils in a phase group being energized together.

In the present embodiment of FIG. 17, the brushless motor controller 701 joins groups together. This means that individual coils do not need to be reassigned to new groups. For example, using the forty-eight coils assigned to phases A-F as described above, the groups may be paired as follows: phases A, B, and C are joined, and phases D, D, and F are joined. The coils in each joined group are then energized together. This effectively reduces the number of phases from six to two without requiring reassignment of individual coils 220 to new groups by the brushless motor controller 701.

It is understood that the groups need not be formed from sequential phases as shown. For example, phases A, C, and E may be grouped, and phases B, D, and F may be grouped. Furthermore, there are multiple ways to achieve this rearrangement rather than joining existing phase groups. For example, in another embodiment (not shown), the brushless motor controller 701 may define two new phase groups A and B and then assign each coil 220 to one of the two groups.

While the embodiment of FIG. 17 illustrates the coils 220 of a particular phase group A-F as being distributed evenly around the coil assembly 210 with no adjacent coils being in the same phase group, it is understood that the groupings may be defined differently. For example, in an alternate embodiment (not shown), to form a two phase winding arrangement using the same coil assembly 210 with forty-eight (48) coils 220, the brushless motor controller 701 may set two adjacent coils as phase A coils and the next two adjacent coils may be set as phase B coils. This two-phase configuration would then repeat for all individual coils 220 within the coil assembly 210. Accordingly, with the forty-eight coils in the present embodiment, there will be twelve (12) pairs of adjacent phase A coils and twelve (12) pairs of adjacent phase B coils.

A phase group may contain no adjacent coils, only adjacent coils, or a mixture of adjacent and non-adjacent coils. Furthermore, the brushless motor controller 701 may vary the control process based on factors such as the particular configuration of the coil assembly 210 and/or the desired output of the electrical machine 702. The particular coil pattern executed by the brushless motor controller 701 at a given time may be preset and/or may be based on dynamically changing inputs. For example, the brushless motor controller 701 may emulate a mechanical transmission by eliminating torque pulsation during low speed-high torque operation and enabling high speed operation with little torque drop-off, and the particular pattern of energized coils may depend on the need to "shift" as defined by one or more inputs received by the brushless motor controller 701.

It is understood that the phase groupings may be defined in different ways and may vary based on the total number of coils 220, the physical wiring of the coils 220 (e.g., whether each coil is individually selectable), the desired number of phases and the configuration of those phases, and/or other criteria. For example, in some embodiments, multiple coils may be physically connected to form a group and may be controllable only as a group rather than individually. In another example, a motor that is only expected to provide a one or two-phase arrangement may be wired differently than a motor that is expected to provide six, three, and two-phase arrangements. While some configurations may provide less flexibility, overall costs and/or complexity may be reduced compared to a coil assembly 210 with individually selectable coils 220. The brushless motor controller 701 may be designed to work regardless of the constraints of a particular coil assembly 210 and desired electrical machine parameters. Accordingly, the brushless motor controller 701 is intended to be highly flexible and configurable to adapt to a variety of electrical machine configurations.

Two-Phase Winding Coil Firing Sequence

Figure 18A:
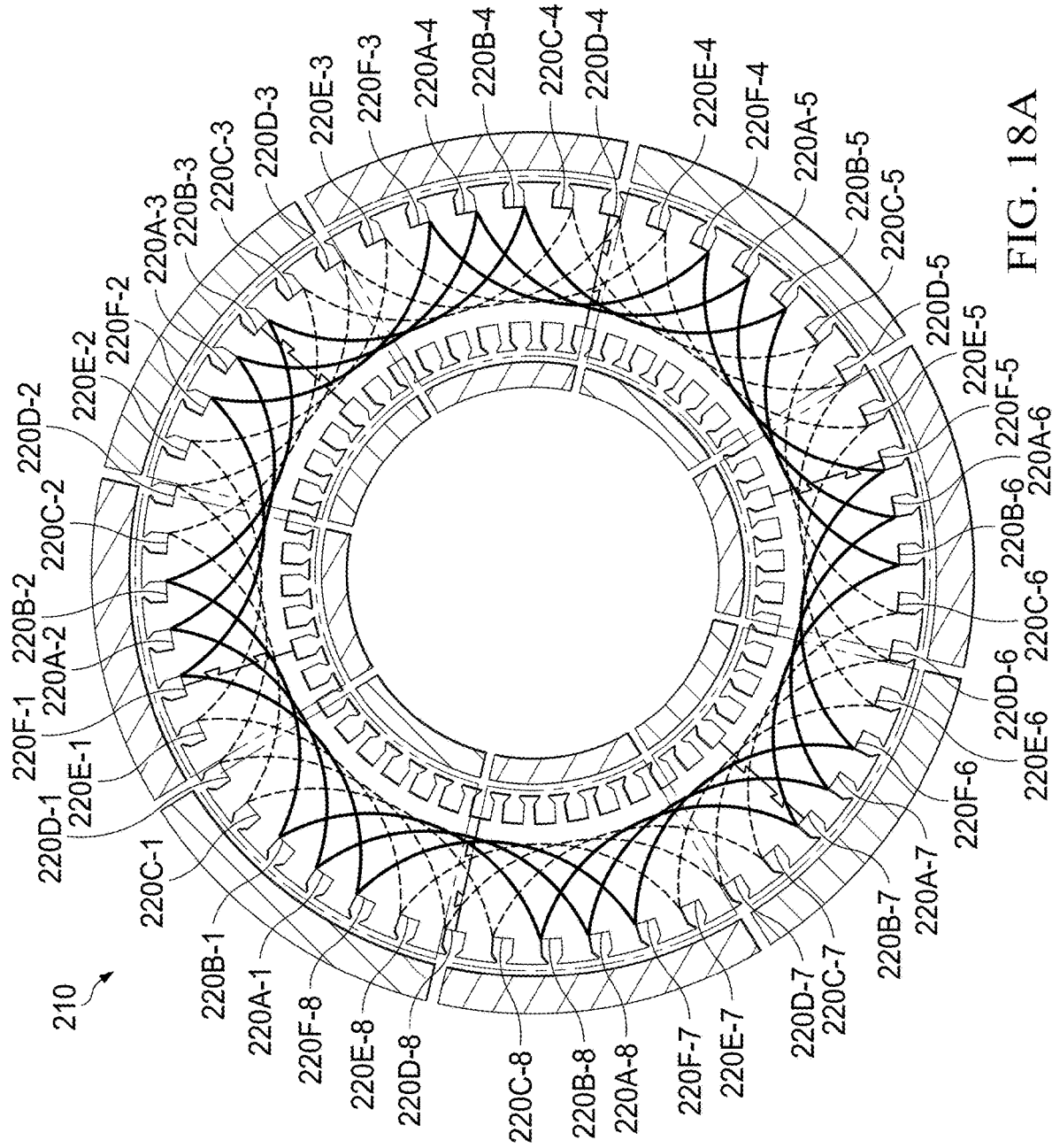
FIGS. 18A through 18G illustrate a coil firing and tunnel segment rotation sequence over time of a two-phase "winding" configuration illustrating one embodiment of the present invention.
Figure 18B:
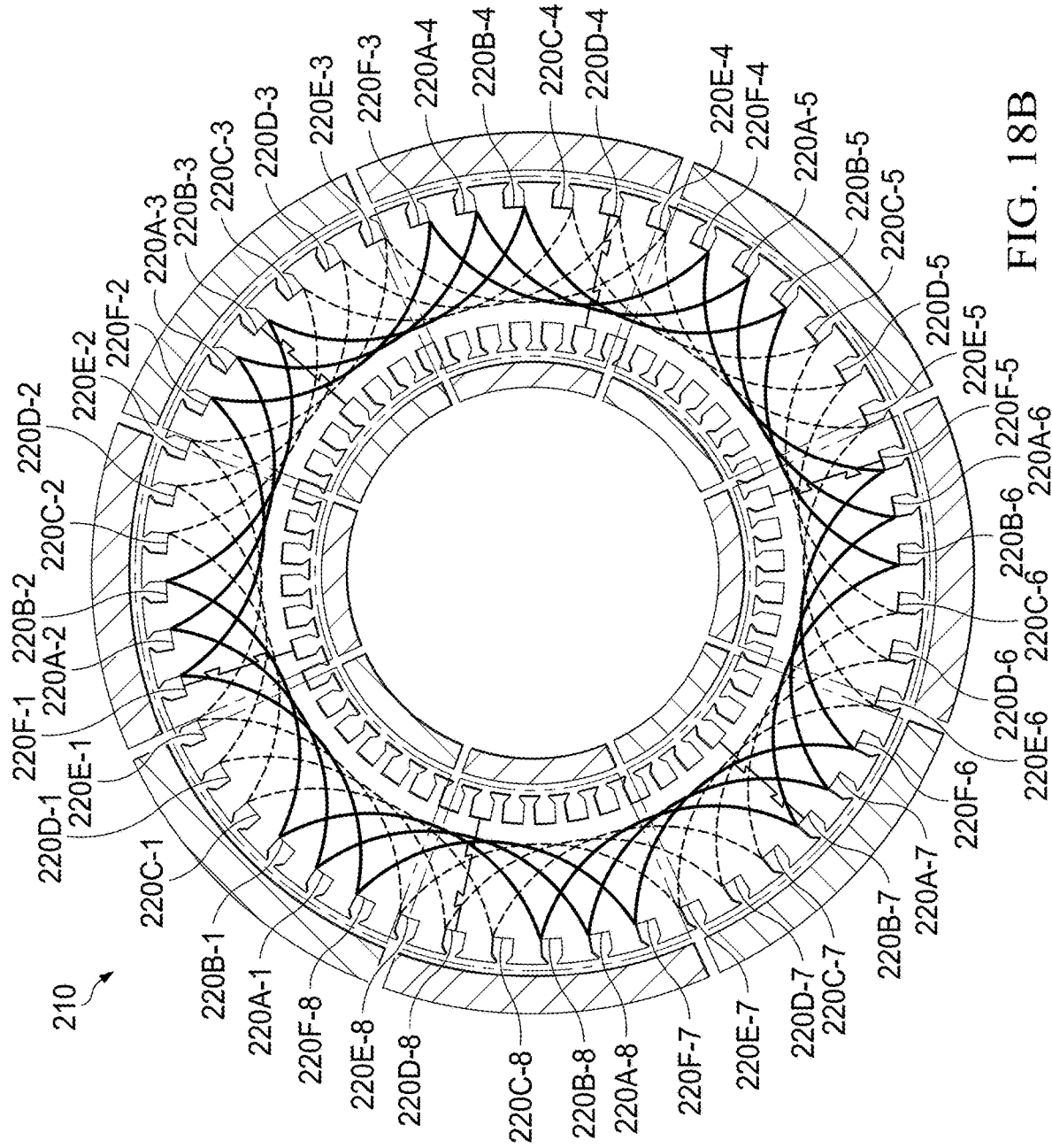
Figure 18C:
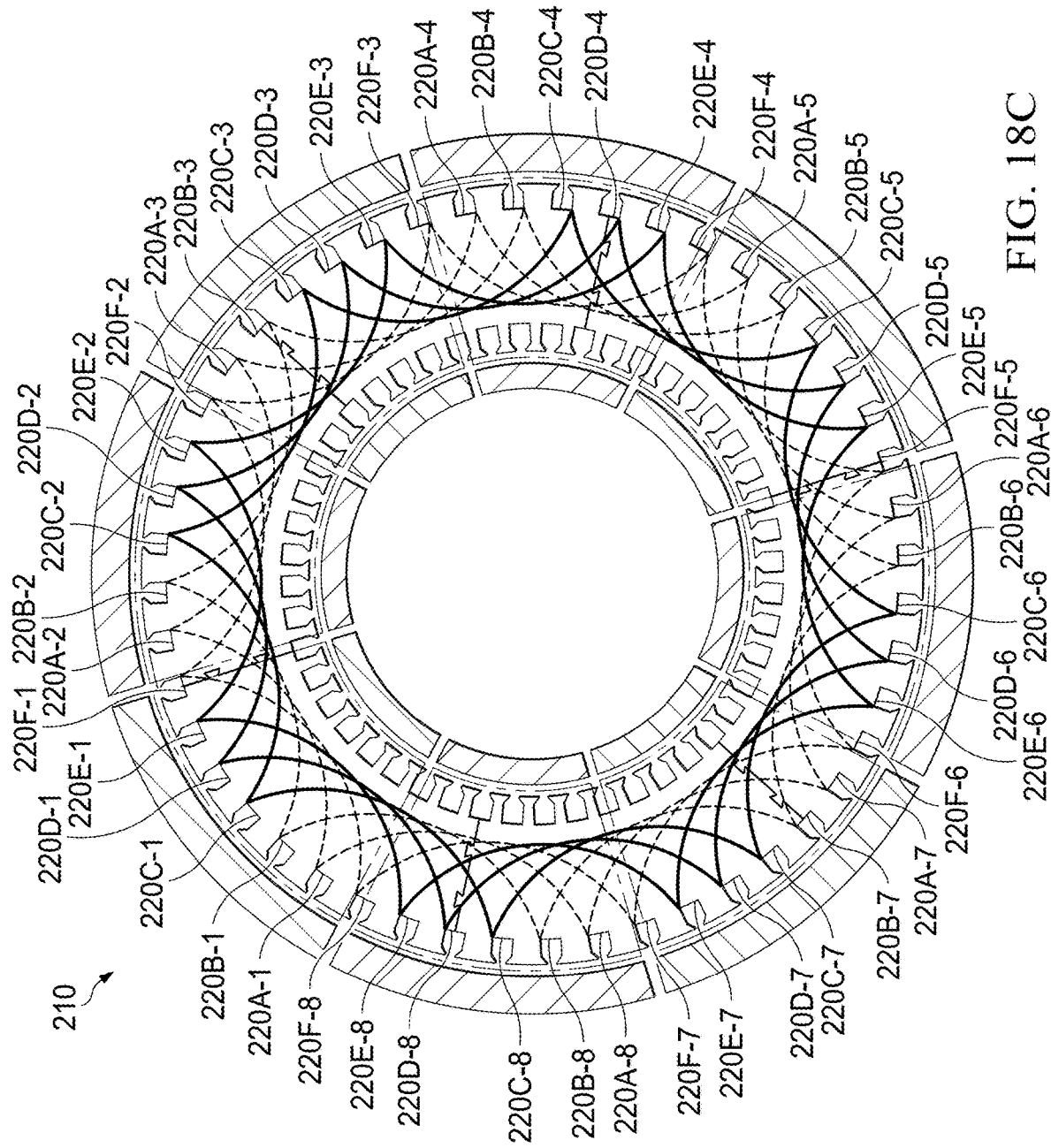
Figure 18D:
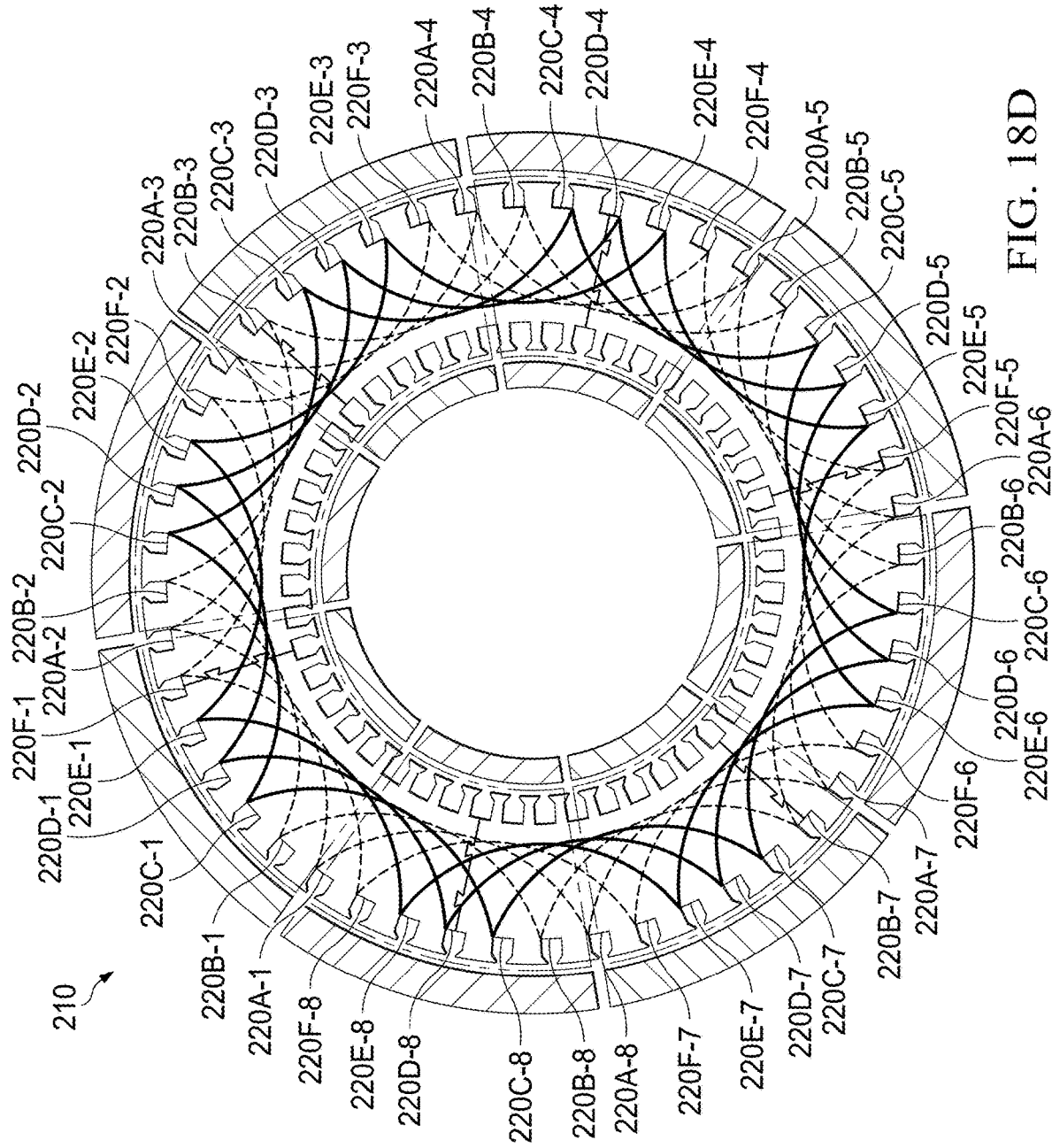
Figure 18E:
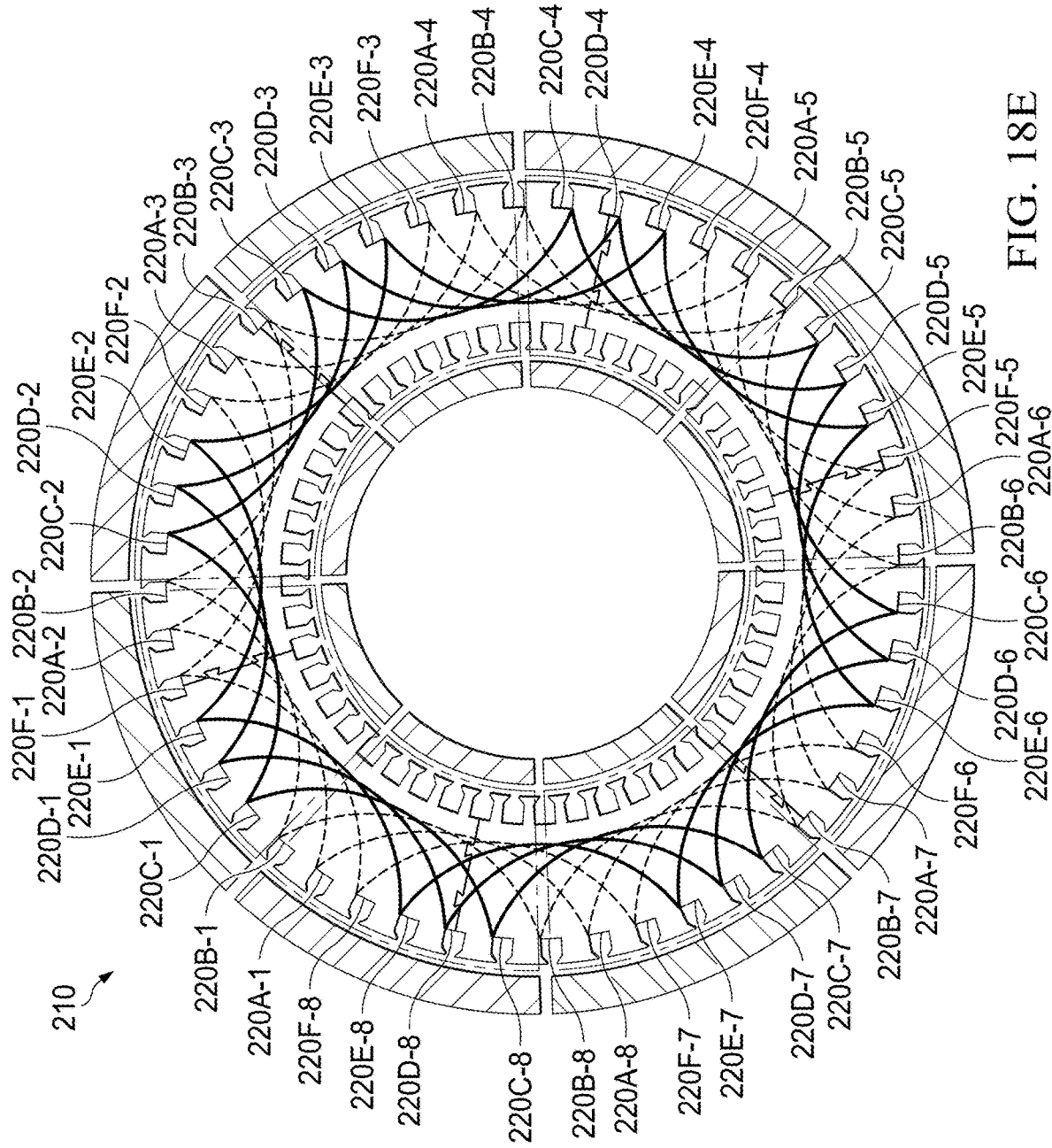
Figure 18F:
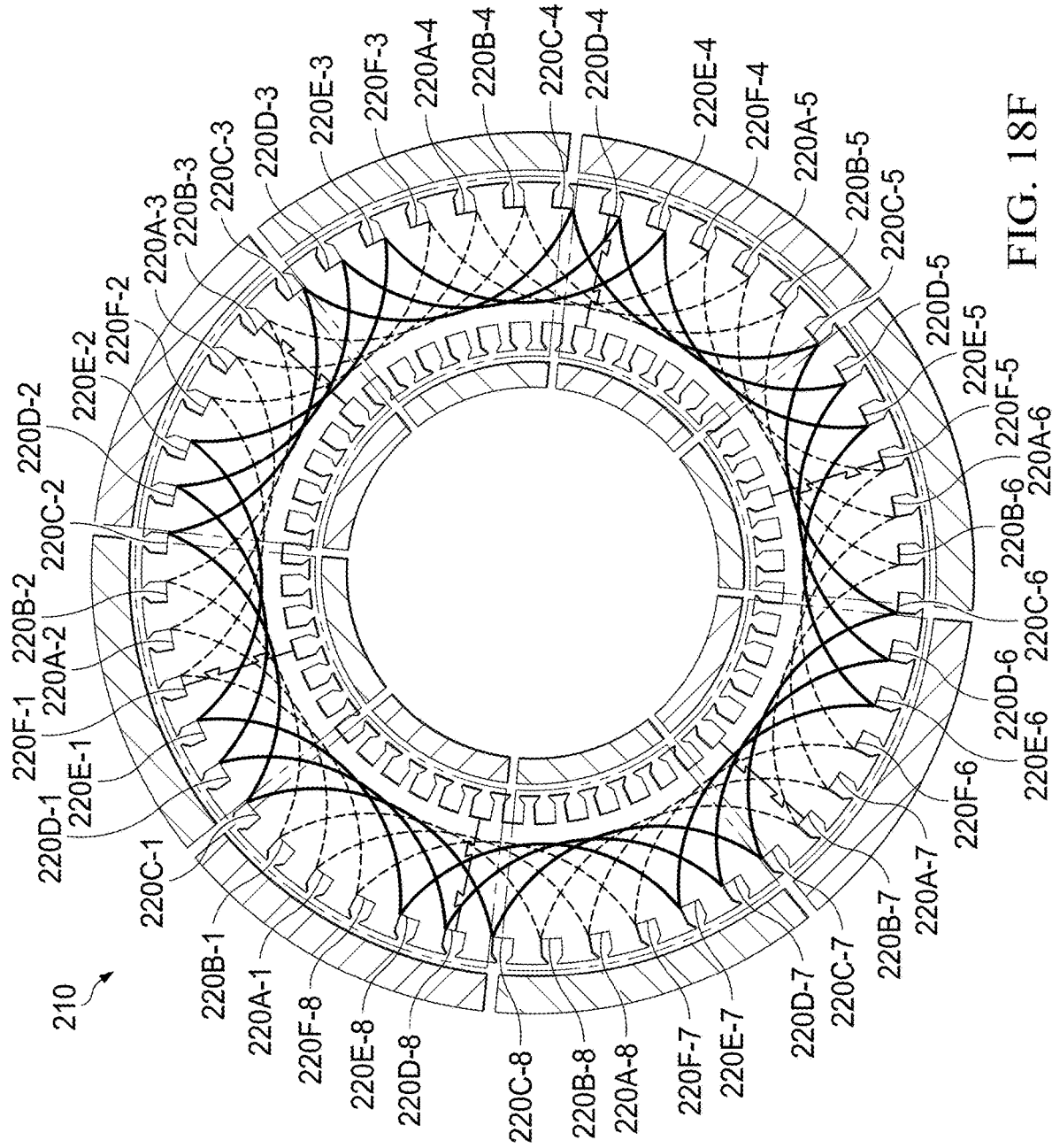
Figure 18G:
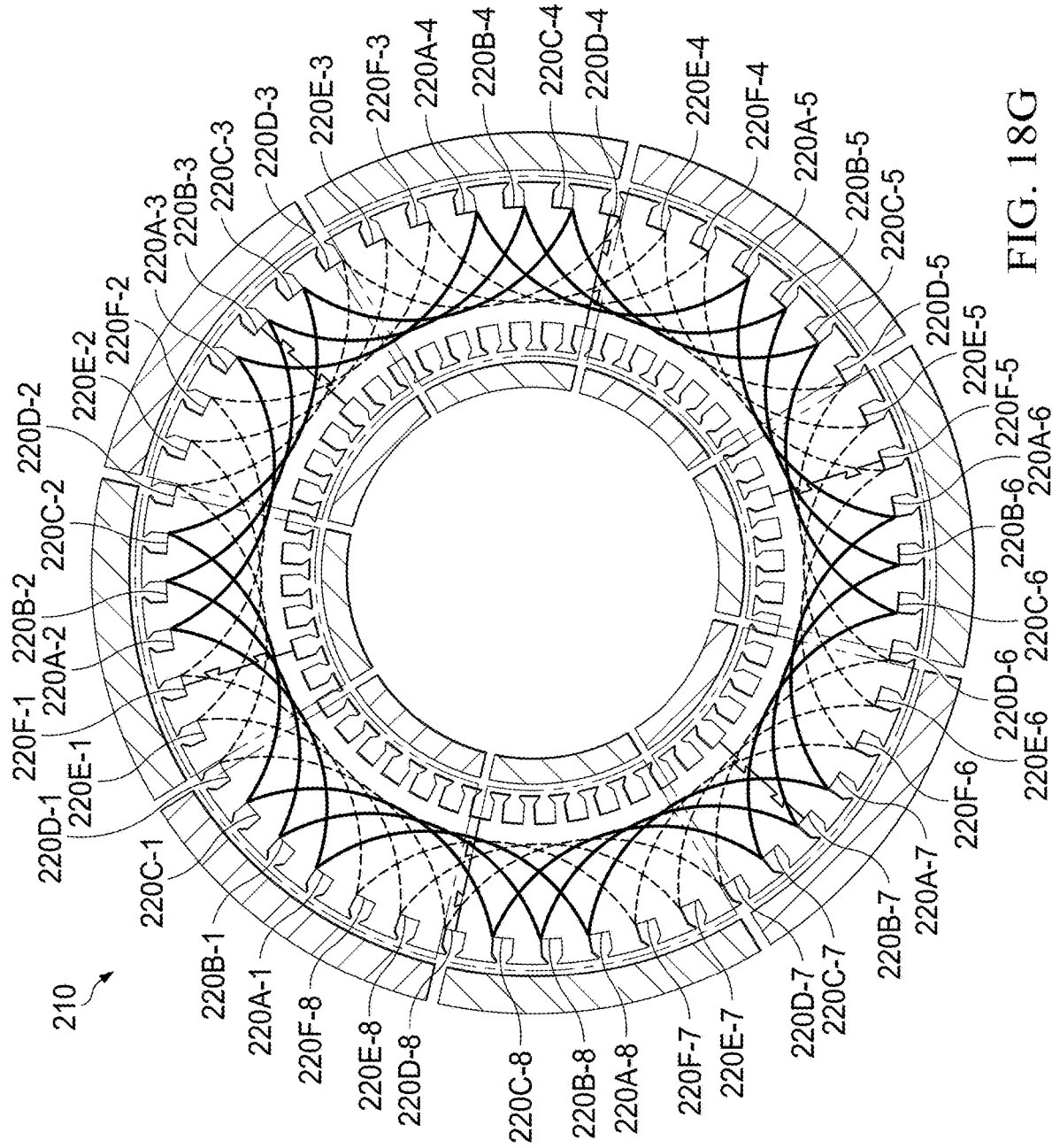

FIGS. 18A through 18G illustrate a coil firing and tunnel segment rotation sequence over time emulating a two phase "winding" configuration illustrating one embodiment of the present invention. In this embodiment, the coils of the 6 individual windings will be energized three at a time. In FIGS. 18A and 18B, the 24 coils in the first phase are firing, for example the eight coils in winding A are energized, the eight coils in winding B are energized, the eight coils in winding C are energized, and the coils in the other three windings are off. That is, the coils in the other three windings are not being energized. In FIG. 18B, the rotor has rotated clockwise one coil width with respect to FIG. 16A. In FIG. 18C the rotor has rotated clockwise a further coil width with respect to FIG. 18B and the coils in the second phase are now firing. For example, the eight coils in winding D are energized, the eight coils in winding E are energized, the eight coils in winding F are energized, and the coils in the other three windings are off. That is, the coils in the other three windings are not being energized. In FIGS. 18C through 16F, the coils of the second phase are energized and the rotor continues to rotate clockwise. In FIG. 18G the coils of the first phase are again firing and the coils in the second phase are again off. The firing sequence continues to repeat itself as the rotor continues to rotate clockwise.

Figure 19:
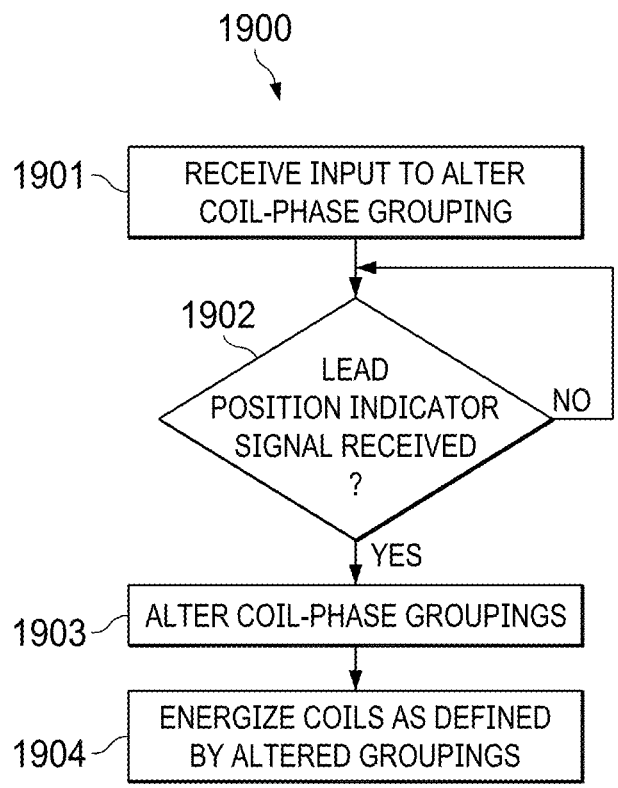
FIG. 19 is a flow chart of a method that may be executed with the brushless motor controller of FIG. 7.

FIG. 19 illustrates one embodiment of a method 1900 that may be executed with the brushless motor controller 701. The method 1900 enables the brushless motor controller 701 to modify the operation of the brushless motor 702 by modifying the manner in which the coils 220 are energized. This enables the brushless motor controller 701 to dynamically modify the phase to provide the multi-phasic capability of the motor 702 and electronically reduce or increase the motor's pole count. Accordingly, in step 1901, the brushless motor controller 701 receives input that indicates the brushless motor controller 701 should modify the current phase arrangement.

In step 1902, a determination is made as to whether a lead position indicator signal has been received recently or since the input was received in step 1901. The lead position indicator signal provides an index indicator that enables the brushless motor controller 701 to determine when to change the phase arrangement. More specifically, polarity transition of the coils/phase may occur when a coil is entering the next alternate polarity region. The brushless motor controller 701 can modify the timing and polarity of the power inputs based on the lead position indicator signal in order to change the pole count electronically.

If the lead position indicator signal has not been received recently, the method 1900 may repeat step 1902 until the lead position indicator signal is received. Once the lead position indicator signal is received, the method 1900 moves to step 1903, where the brushless motor controller 701 alters the coil and/or phase groupings. An example of this is described in greater detail below. In step 1904, the brushless motor controller 701 energizes the coils based on the altered grouping arrangement.

Controller

Figure 20:
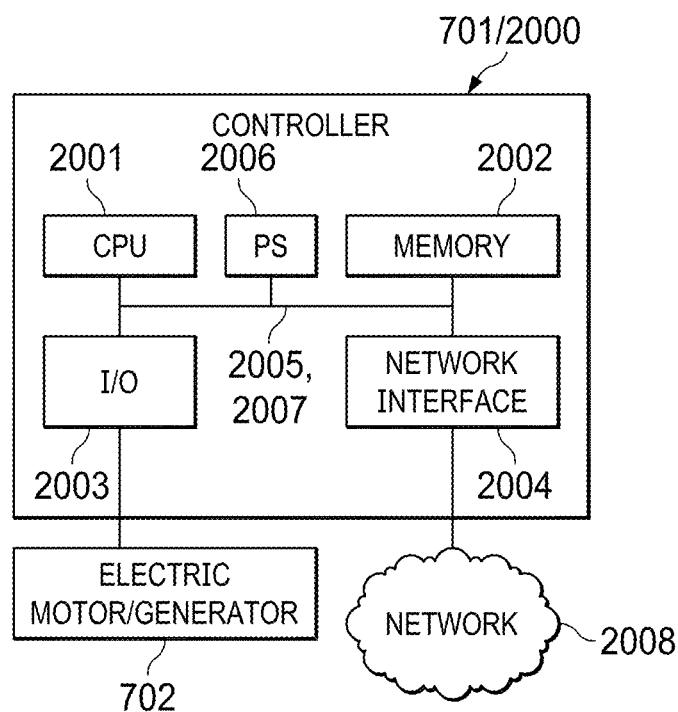
FIG. 20 is a diagram of one embodiment of a system illustrating a more detailed embodiment of a brushless motor controller.

Referring to FIG. 20, one embodiment of a controller 2000 is illustrated. The brushless motor controller 701 is one possible example of a portion or all of the brushless motor controller 701 of FIG. 7. The brushless motor controller 701 may include a processor/central processing unit ("CPU")) 2001, a memory unit 2002, an input/output ("I/O") interface 2003, and a network interface 2004. The components 2001, 2002, 2003, and 2004 are interconnected by a data transport system (e.g., a bus) 2005. A power supply (PS) 2006 may provide power to components of the brushless motor controller 701 via a power transport system 2007 (shown with data transport system 2005, although the power and data transport systems may be separate).

It is understood that the brushless motor controller 701 may be differently configured and that each of the listed components may actually represent several different components. For example, the CPU 2001 may actually represent a multi-processor or a distributed processing system; the memory unit 2002 may include different levels of cache memory, main memory, hard disks (including solid state), and remote storage locations; the I/O interface 2003 may include monitors, keyboards, and the like, and/or interfaces to such devices; and the network interface 2004 may include one or more network cards or chips providing one or more wired and/or wireless connections to a network 2008. Therefore, a wide range of flexibility is anticipated in the configuration of the brushless motor controller 701, which may range from a single physical platform configured primarily for a single user or autonomous operation to a distributed multi-user platform such as a cloud computing system.

The brushless motor controller 701 may use any operating system (or multiple operating systems), including various versions of operating systems provided by Microsoft (such as WINDOWS), Apple (such as Mac OS X), UNIX, and LINUX, and may include operating systems specifically developed for handheld devices (e.g., iOS, Android, Blackberry, and/or Windows Phone), personal computers, servers, and other computing platforms (including vehicle specific platforms) depending on the use of the brushless controller 701. The operating system, as well as other instructions (e.g., for performing some or all of the methods described herein), may be stored in the memory unit 2002 and executed by the processor 1902. For example, the memory unit 2002 may include instructions for dynamically managing the coil assembly 210 in order to provide the multi-phasic capabilities described in previous embodiments.

The network 2008 may be a single network or may represent multiple networks, including networks of different types, whether wireless or wireline. For example, the brushless motor controller 701 may be coupled to external devices via a network that includes a cellular link coupled to a data packet network, or may be coupled via a data packet link such as a wide local area network (WLAN) coupled to a data packet network or a Public Switched Telephone Network (PSTN). In some embodiments, the I/O interface 2003 and/or the network interface 2004 may couple the controller 701 to a vehicle bus, such as a Controller Area Network (CAN), Local Interconnect Network (LIN), Avionics Full-Duplex Switched Ethernet, and/or other specialized types of vehicle networks. Accordingly, the brushless motor controller 701 may be configured to communicate using any needed communication protocol(s), and many different network types and configurations may be used to couple the controller 701 with external devices.

Driver Adaptive Electronic Transmission

Figure 21:
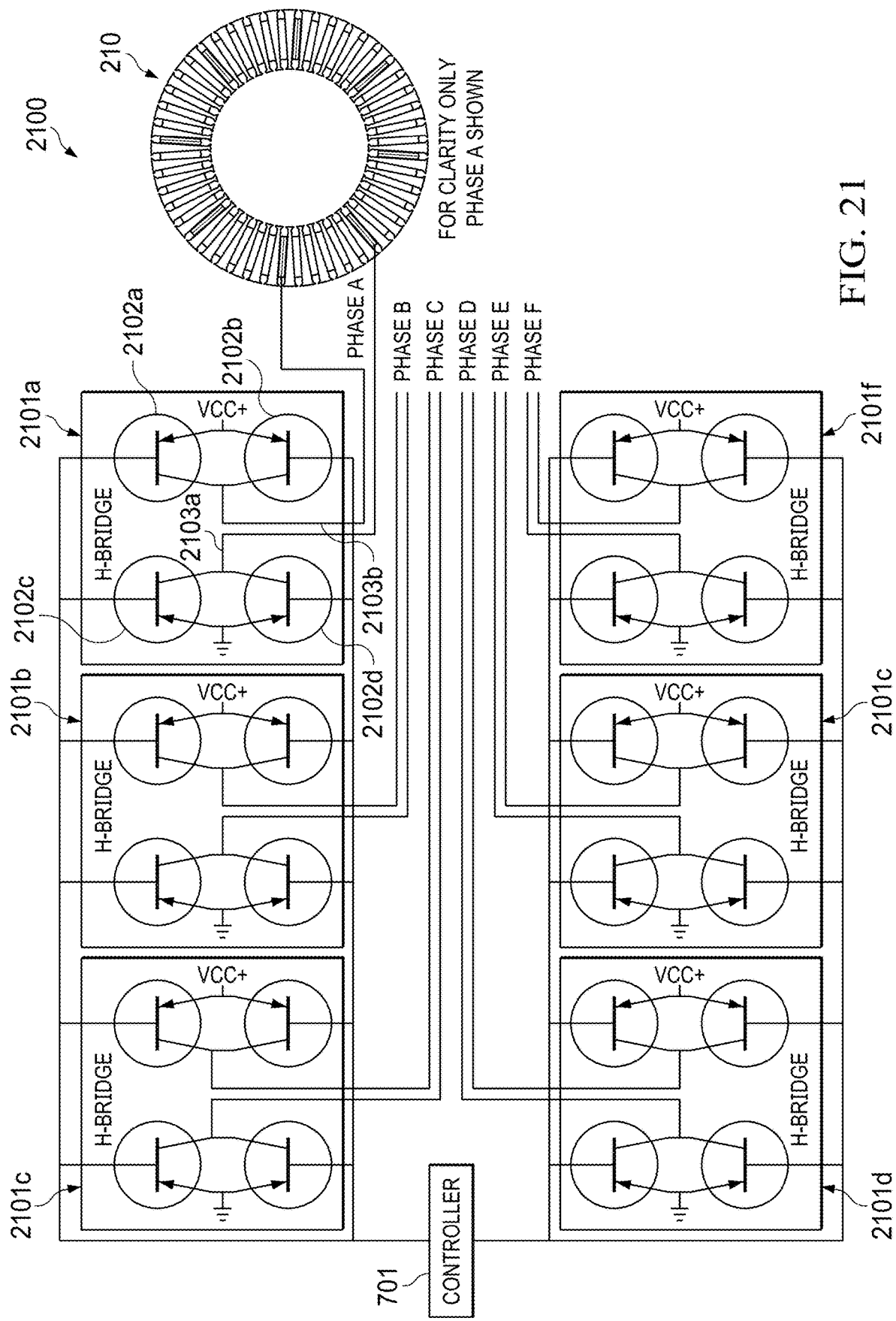
FIG. 21 is a diagram of one embodiment of a system illustrating how a brushless motor controller may be coupled to a coil assembly having six winding phases via H-bridges.

FIG. 21 illustrates one embodiment of a system 2100 illustrating how a brushless motor controller 701 may be coupled to a coil assembly 210 having six individual coil windings, phase A-F, with multiple H-bridges 2101a-2101f. The multiple H-bridges 2101a-2101f may form the driver portion of the adaptive electronic transmission described herein. That is, the brushless motor controller 701 may control the firing sequence of the H-bridges 2101a-2101f, as illustrated in the embodiments of FIGS. 15 through 18, to emulate the 6 phase, 3 phase, 2 phase, or 1 phase windings of conventional motors. In the present example, H-bridge 2101a is used to control the firing of the phase A coils. H-bridge 2101b is used to control the firing of the phase B coils, H-bridge 2101c is used to control the firing of the phase C coils, H-bridge 2101d is used to control the firing of the phase D coils, H-bridge 2101e is used to control the firing of the phase E coils, and H-bridge 2101f is used to control the firing of the phase F coils. Each H-bridge may comprise four switches connected as two independent half-H-bridge outputs or channels. In the present example, the two half-H-bridge outputs of H-bridge 2101 are connected to each end of phase A coils, the two half-H-bridge outputs of H-bridge 2304 are connected to each end of the phase A coils etc. in one embodiment; the two switches of the half-H-bridge output may be a pair of N-channel power MOSFETS 2102 connected in series between the supply rails. That is; a high-side MOSFET and low-side MOSFET, where the center connection between the high-side MOSFET and low-side MOSFET is the output of each half-H bridge. The output of each half-H-bridge may be driven (switched) high, low, or configured as a high impedance output stage by the brushless motor controller 701, For instance, the outputs of the half-H-bridge(s) 2101 may be configured as high impedance when a brushless motor 702 coast function is implemented by the brushless motor controller 701. In another instance, all the outputs the half-H-bridge(s) 2101 may be driven low when a brushless motor 702 brake function is implemented by the brushless motor controller 701.

The brushless motor controller 701 may be coupled to the H-bridges 2101a-2101f-via the I/O interface 2003 and/or the network interface 2004, depending on the configuration of the system 2100. It is understood that the system 2100 is only an example and many possible combinations of hardware and/or software may be used to implement such a system and connect the brushless motor controller 701 with the coil assembly 210.

In some embodiments, a current-sense resistor may be place in one or more of the low-side MOSFET connection(s) to ground to provide current sensing of one of more of the phase windings. In certain embodiments, a current-sensing MOSFET may be use for one or more of the low-side MOSFETS. The voltage across the sense resistor(s) may be compared with a reference voltage to provide overcurrent protection of the MOSFETs by the brushless motor controller 701. In some embodiments, the local voltage supply for brushless motor controller 701 may include a low value decoupling capacitor to suppress the high frequency noise associated with the high slew rate switching MOSFETs. In one instance, the value of the decoupling capacitor(s) 0.01 μF to 0.001 μF.

In certain embodiments, the brushless motor controller 701 includes a thermal shutdown function for the power MOSFETS based on the input from an external temperature sensor and a programmable thermal shutdown threshold. In one embodiment, the brushless motor controller 701 includes a current limit on each low side MOSFET, that is, the brushless motor controller 701 may limit the current through a MOSFET by removing the gate drive and/or modifying the duty cycle of the drive waveform. In certain embodiments, the brushless motor controller 701 includes protection on both the high-side and low-side MOSFETs, that is, a short to ground, a short to supply, or a short across the motor winding.

As previously discussed, with the ability of the adaptive electronic transmission to continuously adjust the coil firing sequence the adaptive electronic transmission can emulate a plurality of conventional motors having different winding configurations. For instance, the adaptive electronic transmission can emulate a conventional motor having a six-phase winding configuration, and a different conventional motor having a three-phase winding configuration, and a different conventional motor having a two-phase winding configuration, and different conventional motor having a 1-phase winding. That is, a single brushless electrical machine 100 having an adaptive electronic transmission can emulate a plurality of conventional motors having different winding configurations. Further, with the ability of the adaptive electronic transmission to continuously adjust the firing coil firing sequence to emulate the windings of different conventional motors allows the adaptive electronic transmission can emulate the optimum conventional winding in dynamically. For instance, the adaptive electronic transmission can emulate a conventional six-phase winding, for torque performance at low speed, and then emulate a conventional two and/or three phase winding for improved high-speed performance than a conventional six-phase winding.

Figure 22:
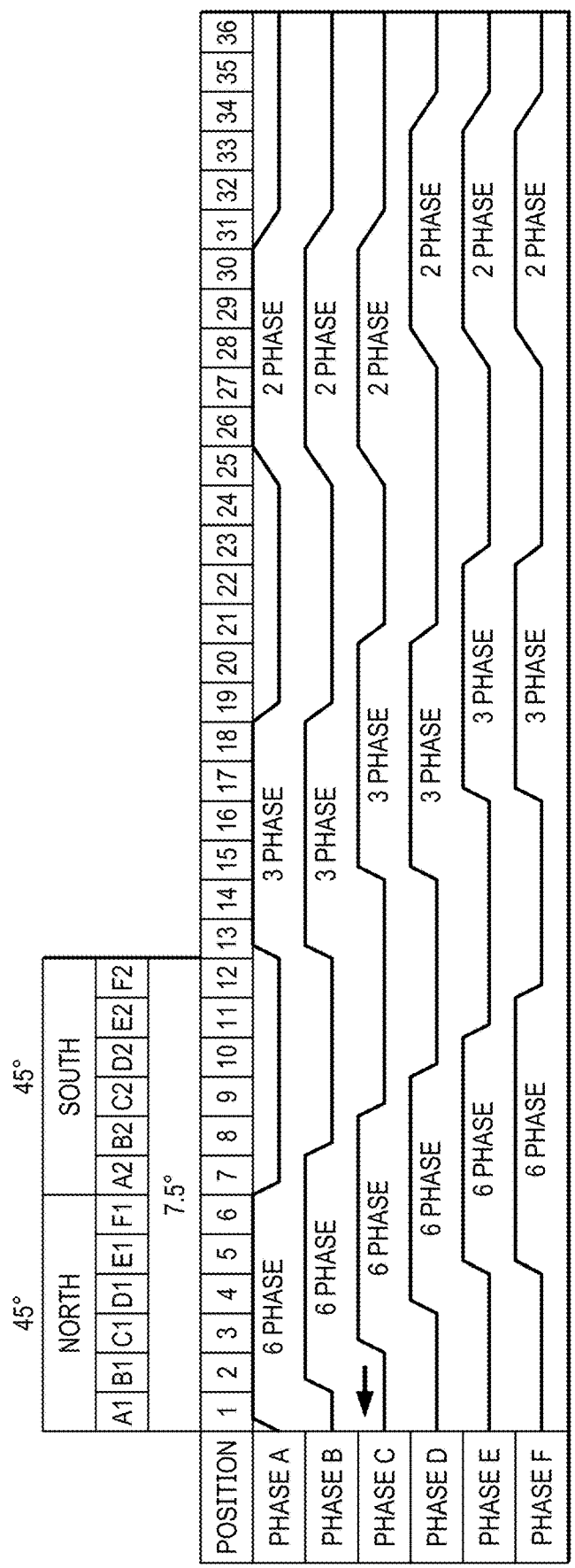
FIG. 22 illustrates an adaptive electronic transmission adjusting a coil firing sequence to transition from emulating a six-phase winding, to a three-phase winding, and then to two-phase winding of a conventional motor illustrating one embodiment of the present invention.

FIG. 22 illustrates one embodiment of an adaptive electronic transmission adjusting a coil firing sequence to transition from emulating a six-phase winding, to a three-phase winding, and then to two-phase winding of a conventional motor. Continuing with the example of FIG. 13 the coil assembly 210 having a rotor with eight (8) magnetic tunnels or motor poles, and a stator having forty-eight (48) individual coils 220 is illustrated. Each magnetic tunnel forms a 45-degree pole region and each individual coil 220 forms a 7.5-degree stator region. Thus, each magnetic tunnel may surround 6 of the 48 coils. The 48 coils are divided into six phase groups A-F, with the expectation that the 8 coils in a phase group will be energized together. Thus, 4 coils of winding A, four coils of winding B, and the like, may be within the four evenly spaced magnetic tunnel segments 400 having a NNNN magnetic pole configuration, as illustrated in FIG. 5, and four coils of winding A, four coils of winding B, and the like, may be within the four evenly spaced magnetic tunnel segments 410 having a SSSS magnetic pole configuration, as illustrated in FIG. 5. The eight coils in winding A may be configured, such that, current flow in the 4 coils in the magnetic segment having a NNNN configuration and the current flow in the 4 energized coils in the magnetic segment 410 having a SSSS configuration, generate magnetic forces that are in the same direction, such that the coils rotates from one adjacent magnetic segment to the other using the multiple H-bridges 22101a-2191f of illustrated embodiment of FIG. 21.

For clarity, only a representative quarter (¼) segment the coil assembly 210, that is, 12 winding coils are illustrated. The waveforms are sliding from right to left, that is, the waveforms at position 1, collectively transition to the waveforms shown at position 2, at position 3 and the like. As will be understood by persons of ordinary skill in the relevant art the transitions may speed up as the adaptive electronic transmission adjusts the coil firing sequence emulate conventional motors having a lower number of phases.

In the illustrative example of FIG. 22, the adaptive electronic transmission is emulating the six-phase winding of a conventional motor in positions 1 through 12. As the rotor of the brushless electrical machine 100 rotates a coil/phase enters a 45-degree pole region and is energized to match the back-emf every 7.5 degrees. For instance, at position 1, coil 220A-1 of phase A may enter a magnetic segment 410 having a NNNN configuration. Continuing with the example of FIG. 19, the brushless motor controller 701 may configure H-bridge 2101a to drive a current to energize coil 220A-1. Specifically, H-bridge 2101a comprises two half H-bridges and the output of one half H-bridge will be driven high, supply, and the output of the other half H-bridge will be driven low, ground, causing current to flow through coil 220A-1 and a force to act on the coil perpendicular to both the directions of the current flow and the magnetic field of the magnetic segment 400 having a NNNN configuration. The shaded region is representative of drive waveform for H-bridge 2201. The coils in the coil assembly 210, are configured, such that, the current flow in the 220A-1 coil entering the magnetic segment 400 having a NNNN configuration and the current flow in the corresponding 220A-2 coil entering the magnetic segment 410 having a SSSS configuration, generated magnetic forces that are in the same direction, such that, the coils rotates from one magnetic segment to the adjacent magnetic segment with a single DC pulse. The black line is representative of the direction of current flow in coil 220A-1 and illustrates the slew rate, change in current over time, of the H-bridge 2101a output.

As the rotor of the brushless electrical machine rotates through an additional 7.5 degrees coil 220B-1 of phase B enters the magnetic segment 400 having a NNNN configuration and coil 220B-2 enters the magnetic segment 410 having a SSSS configuration. The brushless motor controller 701 configures H-bridge 2101b to drive a current to energize coils 220B-1 and 220B-2 and continues to energize coils 220A-1 and 220A-2 using H-bridge 2103f which are still within their respective pole regions. This is illustrated by the waveforms at position 2. At position 2, two winding phases, phase A and phase B are on at the same time, and four phases are off.

As the rotor rotates through each additional 7.5 degrees the coils of phase C at position 3, the coils of phase D at position 4, the coils of phase E at position 5, and the coils of phase F at position 6 are also energized by their respective H-bridges. At position 6, the coils of all 6 phases are being energized at the same time.

At position 7, coil 220A-1 of phase A may leave the Magnetic segment 410 having a NNNN configuration and enter an adjacent Magnetic segment 410 having a SSSS configuration. The brushless motor controller 701 may reconfigure the two half H-bridges of H-bridge 2101a to reverse the direction of current flow in the energized coil 220A-1. That is, the flow of current through coil 220A-1 at position 7 is in the opposite direction to that at position 1.

As the rotor rotates through each additional 7.5 degrees the direction of current in the phase B coils at position 8, the direction of current in the phase C coils at position 9, the direction of current in the phase D coils at position 10, the direction of current in the phase E coils at position 11, and the direction of current in the phase F coils is also reversed. At position 12, the coils of all 6 phases are being energized at the same time.

At position 13, coil 220A-1 of phase A may leave the magnetic segment 400 having a SSSS configuration and enters an adjacent magnetic segment 400 having a NNNN configuration. In the illustrative embodiment of FIG. 22, the adaptive electronic transmission adjusts the coil firing sequence to emulate the three-phase winding of a conventional motor at this transition. In certain embodiments, the adaptive electronic transmission may adjust the coil firing sequence to emulate the three-phase winding of when the rotor is in a different position with respect to coil 220A-1. For instance, the adaptive electronic transmission may adjust the coil firing sequence to emulate the three-phase winding of a conventional motor when coil 220A-1 is about to enter an adjacent magnetic segment 410 having a SSSS configuration. In another instance, the adaptive electronic transmission may adjust the coil firing sequence to emulate the three-phase winding of a conventional motor base on the position of coil 220A-1 within one of the pole regions. In yet another instance, the adaptive electronic transmission may adjust the coil firing sequence to emulate the three-phase winding of a conventional motor base on, at least in part, the relative positions of coil 220B-1, 220C-1, 220D-1, 220E-1, or 220E-1 and one of the pole regions.

Continuing with the example of FIG. 22, at position 13 the brushless motor controller 701 reconfigures the two half H-bridges of H-bridge 2101a to reverse the direction of current flow in the energized coil 220A-1. The brushless motor controller 701 further reconfigure the two half H-bridges of H-bridge 2101b to reverse the direction of current flow in the energized coil 220B-1 thereby synchronizing the firing of phase B coils with the firing of the phase A coils. That is, the energizing of the phase A coils and the phase B coils is now occurring at the same time thereby emulating a single-phase winding. Since, the firing of the phase B coils is now occurring at the same time as the firing of the phase A coils the current in coil 220B-1 will be reversed prior to it leaving the magnetic segment 400 having a NNNN configuration and entering an adjacent magnetic segment 410 having a SSSS configuration. Further, the slew rate will change, that is the transition of current flow will take longer compared to the six-phase configuration.

At position 14, the rotor has rotated through an additional 7.5 degrees and coil 220B-1 leaves the magnetic segment 410 having a SSSS configuration and enters the magnetic segment 400 having a NNNN configuration.

At position 15, the rotor has rotated through an additional 7.5 degrees and coil 220C-1 leaves the magnetic segment 400 having a SSSS configuration and enters an adjacent NNNN pole region. The brushless motor controller 701 reconfigures the two half H-bridges of H-bridge 2203 to reverse the direction of current flow in the energized coil 220C-1. The brushless motor controller 701 further reconfigures the two half H-bridges of H-bridge 2101*d* to reverse the direction of current flow in the energized coil 220D-1 thereby synchronizing the firing of the phase D coils with the firing of the phase C coils to emulate a single phase winding.

At position 16, the rotor has rotated through an additional 7.5 degrees and coil 220D-1 leaves the magnetic segment 410 having a SSSS configuration and enters the NNNN pole region.

At position 17, the rotor has rotated through an additional 7.5 degrees and coil 220E-1 leaves the magnetic segment 410 having a SSSS configuration and enters an adjacent NNNN pole region. The brushless motor controller 701 reconfigures the two half H-bridges of H-bridge 2101*e* to reverse the direction of current flow in the energized coil 220E-1. The brushless motor controller 701 further reconfigures the two half H-bridges of H-bridge 2412 to reverse the direction of current flow in the energized coil 220E-1 synchronizing the firing of the phase F coils with the firing of the phase E coils to emulate a single phase winding. The adaptive electronic transmission has now modified the coil firing sequence of phase A, B, C, D, E, and F to emulate the three-phase winding of a conventional motor.

Continuing with the example of FIG. 22, at position 25 the brushless motor controller 701 reconfigures the two half H-bridges of H-bridge 2101*a* and H-bridge 2101*b* to reverse the direction of current flow in the energized coil 220A-1 and 220B-1. The brushless motor controller 701 further reconfigure the two half H-bridges of H-bridge 2101*c* to reverse the direction of current flow in the energized coil 220C-1 thereby synchronizing the firing of phase C coils with the firing of the phase A coils. That is, the energizing of the phase A coils, the phase B, and the phase C coils is now occurring at the same time thereby emulating a single-phase winding. The brushless motor controller 701 further 701 further modifies the firing sequence of the phase D so that it is no longer synchronized to phase C coils.

In the illustrative embodiment of FIG. 22, the adaptive electronic transmission adjusts the coil firing sequence to emulate the two-phase winding of a conventional motor as coil 220A-1 of phase A leaves the magnetic segment 410 having a SSSS configuration and enters an adjacent NNNN pole region. In certain embodiments, the adaptive electronic transmission may adjust the coil firing sequence to emulate the two-phase winding of when the rotor is in a different position with respect to coil 220A-1. For instance, the adaptive electronic transmission may adjust the coil firing sequence to emulate the two-phase winding of a conventional motor when coil 220A-1 is about to enter an adjacent magnetic segment 410 having a SSSS configuration. In another instance, the adaptive electronic transmission may adjust the coil firing sequence to emulate the two-phase winding of a conventional motor when coil 220A-1 is within one of the pole regions. In yet another instance, the adaptive electronic transmission may adjust the coil firing sequence to emulate the two-phase winding of a conventional motor base on, at least in part, the relative positions of coil 220B-1, 220C-1, 220D-1, 220E-1, or 220E-1 with respect to one of the pole regions.

At position 28 the brushless motor controller 701 reconfigures the two half H-bridges of H-bridge 2101*d* to reverse the direction of current flow in the energized coil 220D-1. The brushless motor controller 701 further reconfigure the two half H-bridges of H-bridge 2101*e* and H-bridge 2101*f* to reverse the direction of current flow in the energized coil 220E-1 and the energized coil 220E-1 thereby synchronizing the firing of phase E and F coils with the firing of the phase D coils. That is, the energizing of the phase D coils, the phase E, and the phase F coils is now occurring at the same time thereby emulating a single-phase winding. Further, the slew rate will change, that is the transition of current flow will take longer compared to the three-phase configuration. The adaptive electronic transmission has now modified the coil firing sequence of phase A, B, C, D, E, and F to emulate the 2-phase winding of a conventional motor.

In the illustrative example of FIG. 22, the adaptive electronic transmission sequentially transitions from emulating the six-phase winding of a convention, to emulating the three-phase winding of a conventional motor, to emulating the two-phase winding of a conventional. This was for clarity and is not intended to be limiting or to necessarily indicate that there is a particular order within the group. As will be understood by persons of ordinary skill in the relevant art the adaptive electronic transmission has the ability to dynamically adjust torque, speed, and loading capabilities of the brushless electrical machine 100 as needed by adjusting the coil firing sequence.

Figure 23:
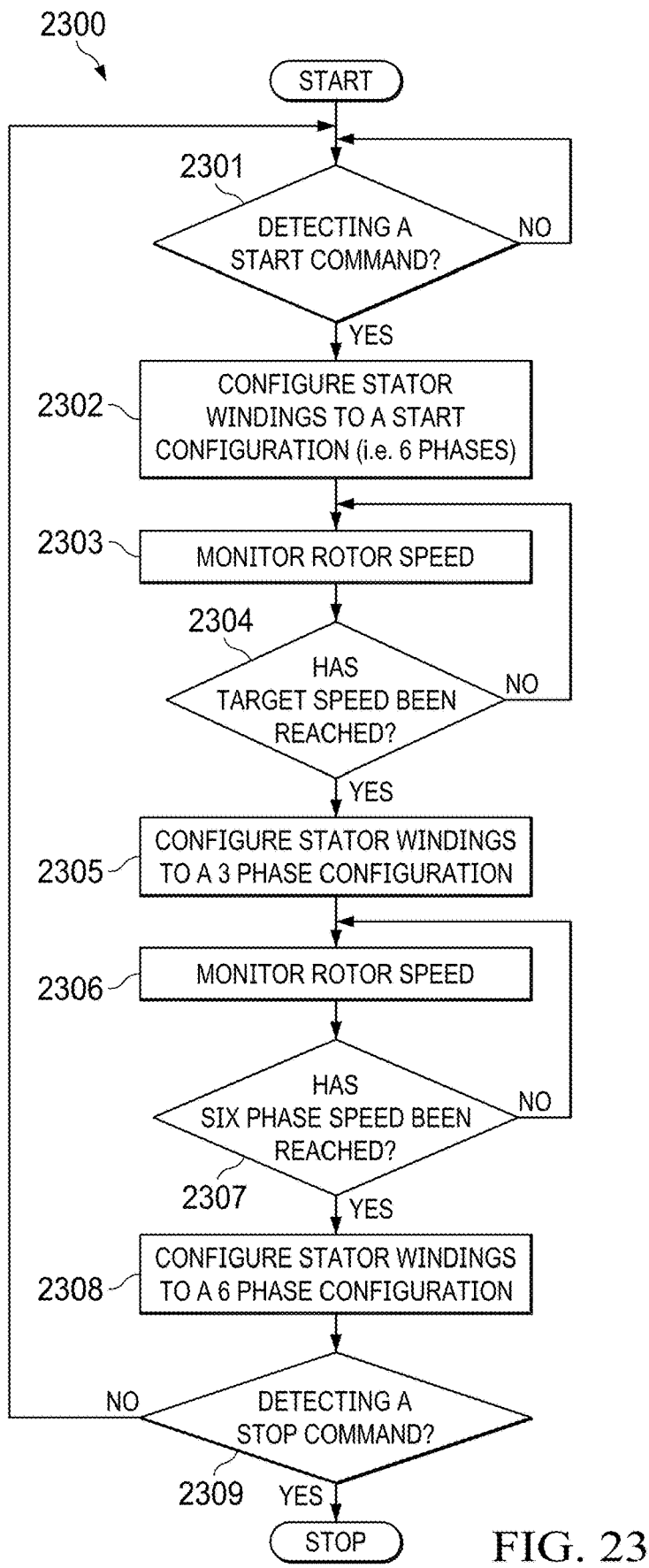
FIG. 23 is a are flow chart illustrating a method that may be executed with the brushless motor controller of FIG. 7 to emulate an adaptive electronic transmission adjusting a coil firing sequence to emulate a six-phase winding and a three-phase winding of a conventional motor.

FIG. 23 illustrates one embodiment of a method 2300 that may be executed a brushless motor controller 701 to emulate an adaptive electronic transmission by adjusting a coil firing sequence to emulate a six-phase winding and a three-phase winding of a conventional motor. The method 2300 uses the ability of the brushless motor controller 701 to separately energize coil windings.

In step 2301, the brushless motor controller 701 detects a start command. In some embodiments, the brushless motor controller 701 is configured to receive the start command in the form of an analogy input. For example, the start command may be an analog input voltage corresponding to a speed greater than zero for the system. That is, the target speed. In certain embodiments, the brushless motor controller 701 is configured to receive the start command in the form of a PWM waveform. For example, the start command may be a PWM waveform having a duty cycle corresponding to a speed greater than zero. In one embodiment, the processor is configured to receive the start command via a data bus. For example, an I²C (Inter-integrated Circuit) data bus, which is a synchronous, multi-master, multi-slave, packet switched, single-ended, serial computer bus.

In step 2302, responsive to the detection of the start command, the processor configures the stator windings of the brushless electrical machine 100 in the start configuration. In certain embodiments, the stator windings of the brushless electrical machine 100 are energized in the six-phase configuration at startup, because this configuration provides more torque at low speeds than the corresponding three-phase configuration. In one embodiment, rotor position sensors are connected to the brushless motor controller 701 enable the proper timing of the rotating magnetic field in the stator required to initiate and maintain the rotation of the rotor at low speed. In certain embodiments, different rotor position sensors are used for the six-phase configuration and the three-phase configuration. Subsequently, the brushless motor controller 701 in block, configures rotor to accelerate by synthesizing a six-phase rotating magnetic field in the stator windings.

In step 2303, the brushless motor controller 701 monitors the rotor speed of the accelerating brushless electrical machine 100 to determine whether the target speed has been reached. Responsive to the target speed being reached, the brushless motor controller 701 synthesizes a six-phase rotating magnetic field in the stator windings to maintain the target speed. In one embodiment, the stator windings of the brushless electrical machine 100 are energized in the three-phase configuration to reduce current and improve efficiency at the target speed. That is, the brushless motor controller 701 synthesizes a three-phase rotating magnetic field in the stator winding to maintain the target speed. Thereafter, the configuration process is ended since there is no longer a need to accelerate the brushless electrical machine 100, and the speed of the motor brushless electrical machine 100 is maintained at the target speed. Otherwise, the brushless motor controller 701 continues to monitor the speed of the accelerating rotor having a six-phase configuration.

In step 2304, the brushless motor controller 701 continues to monitor the rotor speed of the accelerating brushless electrical machine 100 to determine whether the six-phase speed threshold has been reached. The 6-speed threshold is the predetermined speed above which the higher speed, but lower torque, performance of the three-phase emulation is used. Responsive to the six-phase speed threshold being reached, the stator windings of the brushless electrical machine 100 are energize with the three-phase configuration and the brushless motor controller 701 synthesizes a three-phase rotating magnetic field in the stator winding to accelerate the rotor.

When the speed of the rotor is determined to be below the six-phase speed threshold value, the speed of the rotor is continually checked until either the six-phase speed threshold has been reached or the desired target speed is reached.

In step 2304 the loop is repeated starting with step 2303

Advantages of Certain Embodiments

In sum, certain disclosed embodiments have several advantages when compared to conventional motors and generators. Surrounding the coils with magnets as described above creates more flux density and the forces are now all in the direction of motion which may create more torque, minimize vibration, and minimize noise—as compared to conventional electric motors where forces may try to pull the coil downwards or push it upwards (depending on the polarity), not in the direction of motion. As discussed above, most of the magnetic fields generated are in the direction of motion so there is little, if any, wasted field structure. Continuous torque and continuous power, therefore, are greatly increased. Furthermore, continuous torque density, continuous power density by volume, and continuous power density by weight are also increased when compared to conventional electric motors.

In certain embodiments, the equivalent full torque is available at start with no locked rotor current losses. The permanent magnet configuration has reduced inrush current at start.

In certain embodiments, the coil assembly may be compact and yet the coils are easily cooled because they are surrounded by an effective heat sink. Because there is no reason to overlap the coil windings, there is little, if any unwanted field induction—which also contributes to a more efficient design. One of the advantages of this configuration over conventional electric motors is that the end turns (in this case the radial section of the coils) are part of the "active section" of the invention. In conventional electric motors, the axial length of the copper conductor is the section that produces power. The end turns are a penalty, adding weight and losses, but not producing power because the end region fields are not effectively linking the end windings. However, in the above disclosed embodiments, the entire coil winding is effectively used to produce torque due to the side wall or axial magnets which are axially magnetized—efficiently utilizing the copper windings.

In the "DC" configuration, the motor may run independent of power line frequency or manufactured frequencies reducing the need for expensive pulse width modulated drive controllers or similar controllers.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other wall portion, components or features and still be within the scope of the present invention, for instance:

In one embodiment, there may be a method of producing a current, the method characterized by: forming an area of magnetic concentration within a first radial segment defined in section by an outer magnetic cylinder wall portion having a first longitudinal length, an inner magnetic cylinder wall, a first magnetic side wall portion having a first radial length, and a second magnetic side wall portion having a second radial length, each wall portion having their like magnetic poles facing an interior of the first radial segment and the first longitudinal length is greater than either the first radial length or the second radial length, forming a second area of magnetic concentration within a second radial segment defined by an second outer magnetic cylinder wall portion having a first longitudinal length, a second inner magnetic cylinder wall portion, a third magnetic side wall portion having a first radial length, and a fourth magnetic side wall portion having a second radial length, each wall portion having their like magnetic poles facing away from an interior of second radial segment, positioning a coil within a slot formed by adjacent teeth of a coil assembly, rotating a shaft coupled to the coil assembly, rotating the coil through the first segment and extracting current in a first direction from the coil, rotating the coil through the second segment and extracting current in a second direction from the coil.

A method of producing a current, the method characterized by: forming an area of magnetic concentration within a first radial segment defined by an outer magnetic cylinder wall portion having a first longitudinal length, an inner magnetic cylinder wall, a first magnetic side wall portion having a first radial length, and a second magnetic side wall portion having a second radial length, each wall portion having their like magnetic poles facing an interior of the first radial segment and the first longitudinal length is greater than either the first radial length or the second radial length, forming a second area of magnetic concentration within a second interior cavity defined by an second outer magnetic cylinder wall portion having a first longitudinal length, a second inner magnetic cylinder wall portion, a third magnetic side wall portion having a first radial length, and a fourth magnetic side wall portion having a second radial length, each wall portion having their like magnetic poles facing away from an interior of the second radial segment, positioning a coil within a slot formed by adjacent teeth of a coil assembly, rotating a shaft coupled to the first radial segment and the second radial segment such that the first radial segment is rotated about the coil and current of a first direction is extracted from the coil, the second radial segment is rotated about the coil and current of a second direction is extracted from the coil.

Additionally, undescribed embodiments which have interchanged components are still within the scope of the present invention. It is intended that the scope of the invention be limited not by this detailed description, but rather by the claims or future claims supported by the disclosure.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112(f). Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC 112(f).

The invention claimed is:

1. An electric machine comprising:
   a toroidal magnetic cylinder including:
   a first magnetic tunnel segment having a NNNN magnetic pole configuration,
   a second magnetic tunnel segment having a SSSS magnetic pole configuration positioned circumferentially adjacent to the first magnetic tunnel,
   a coil assembly positioned within the toroidal magnetic cylinder, the coil assembly including a plurality of coils wherein the first or second magnetic tunnel segment surrounds a first number of coils of the coil assembly, wherein the coil assembly is configured for the first number of coil phases and the plurality of coils is divided to create a subgroups of coils wherein each subgroup of coils is assigned to one of the first number of coil phases;
   a controller in electrical communication with the coil assembly and the plurality of parameter detection sensors, the controller including a processor and a memory coupled to the processor, the memory containing instructions for:
   monitoring a parameter value of the electric machine;
   determining if the parameter value has reached a first target value; if not, continue to monitor the parameter value;
   if the parameter value has reached the first target value, emulating a second number of coil phases for the coil assembly by simultaneously energizing a first subgroup of coils and a second subgroup of coils such that the first subgroup of coils and second subgroup of coils to act as members of a single coil phase group.

2. The electric machine of claim 1, wherein the memory further contains instructions for:
   monitoring the parameter value of the electric machine;
   determining if parameter value has reached a second target value; if not, continue to monitor the parameter value;
   if the parameter value has reached the second target value, emulating a third number of (two) coil phases for the coil assembly by simultaneously energizing a third subgroup of coils with the first subgroup of coils and the second subgroup of coils to act as members of the single coil phase group.

3. The electric machine of claim 1, wherein the memory further contains instructions for:
   monitoring the parameter value of the electric machine;
   determining if the parameter value has reached a first lower target parameter; if not, continue to monitor the parameter value of the toroidal magnetic cylinder;
   if the parameter value has reached the first lower target parameter, removing one subgroup of coils from the group of coils that are being simultaneously energizing together to act as members of the single coil phase group.

4. The electric machine of claim 1, wherein coils in the first subgroup of coils are positioned adjacent to coils in the second subgroup of coils.

5. The electric machine of claim 1, wherein the parameter is the rotational speed of the magnetic cylinder relative to the coil assembly.

6. The electric machine of claim 1, wherein the parameter is the rotational speed of the magnetic cylinder relative to the coil assembly.

7. The electric machine of claim 1, wherein the coils assigned to one of the first number of coil phases are electrically coupled together.

8. The electric machine of claim 1, wherein the coils in the first subgroup and the second subgroup are electrically coupled together.

9. The electric machine of claim 1, further comprising a plurality of parameter detection sensors positioned within the electric machine.

10. A method of controlling electric machine comprising:
    monitoring a parameter value of the electric machine having
    a toroidal magnetic cylinder which includes a first magnetic tunnel segment having a NNNN magnetic pole configuration, and a second magnetic tunnel segment having a SSSS magnetic pole configuration positioned circumferentially adjacent to the first magnetic tunnel,
    a coil assembly positioned within the toroidal magnetic cylinder, the coil assembly including a plurality of coils wherein the first or second magnetic tunnel segment surrounds a first number of coils of the coil assembly, wherein the coil assembly is configured for the first number of coil phases and the plurality of coils is divided to create a subgroups of coils wherein each subgroup of coils is assigned to one of the first number of coil phases;

determining if the parameter value has reached a first target value; if not, continue to monitor the parameter value;

if the parameter value has reached the first target value, emulating a second number of coil phases for the coil assembly by simultaneously energizing a first subgroup of coils and a second subgroup of coils such that the first subgroup of coils and second subgroup of coils to act as members of a single coil phase group.

11. The method of claim 10, further comprising:

monitoring the parameter value of the electric machine;

determining if parameter value has reached a second target value; if not, continue to monitor the parameter value;

if the parameter value has reached the second target value, emulating a third number of (two) coil phases for the coil assembly by simultaneously energizing a third subgroup of coils with the first subgroup of coils and the second subgroup of coils to act as members of the single coil phase group.

12. The method of claim 10, further comprising:

monitoring the parameter value of the electric machine;

determining if the parameter value has reached a first lower target parameter; if not, continue to monitor the parameter value of the toroidal magnetic cylinder;

if the parameter value has reached the first lower target parameter, removing one subgroup of coils from the group of coils that are being simultaneously energizing together to act as members of the single coil phase group.

13. The method of claim 10, further comprising positioning the coils in the first subgroup of coils adjacent to coils in the second subgroup of coils.

14. The method of claim 10, wherein the parameter is the rotational speed of the magnetic cylinder relative to the coil assembly.

15. The method of claim 10, wherein the parameter is the rotational speed of the magnetic cylinder relative to the coil assembly.

16. The method of claim 10, further comprising electrically coupling the coils assigned to one of the first number of coil phases together.

17. The method of claim 10, further comprising electrically coupling the coils in the first subgroup to the coils in the second subgroup.

\* \* \* \* \*